United States Patent [19]

Masumoto et al.

[11] Patent Number: 5,734,233
[45] Date of Patent: Mar. 31, 1998

[54] DIGITAL CONVERGENCE APPARATUS

[75] Inventors: Junji Masumoto, Ibaraki; Hideyuki Go; Yasuaki Sakanishi, both of Takatsuki, all of Japan

[73] Assignee: Matsushita Electric Industrial Co., Ltd., Osaka, Japan

[21] Appl. No.: 684,190

[22] Filed: Jul. 19, 1996

[30] Foreign Application Priority Data

| Jul. 19, 1995 | [JP] | Japan | 7-181994 |
| Aug. 22, 1995 | [JP] | Japan | 7-213217 |
| Jan. 10, 1996 | [JP] | Japan | 8-001987 |
| May 22, 1996 | [JP] | Japan | 8-126759 |

[51] Int. Cl.$^6$ .................................................. H01J 29/51
[52] U.S. Cl. ................................... 315/368.12; 348/807
[58] Field of Search ....................... 315/368.12, 368.13, 315/368.23; 348/807

[56] References Cited

U.S. PATENT DOCUMENTS

| 5,382,984 | 1/1995 | Tsujihara et al. | 346/746 |
| 5,398,083 | 3/1995 | Tsujihara et al. | 348/807 |
| 5,596,248 | 1/1997 | Hosoi et al. | 315/368.18 |

FOREIGN PATENT DOCUMENTS

| 64-65992 | 3/1989 | Japan . |
| 3-76396 | 4/1991 | Japan . |
| 5-14912 | 1/1993 | Japan . |

Primary Examiner—Theodore M. Blum
Attorney, Agent, or Firm—Ratner & Prestia

[57] ABSTRACT

The invention presents a digital convergence apparatus of high precision, relating to a digital convergence apparatus applicable to a color display device for displaying various image information in various signal formats, and capable of correcting convergence at high precision to correct color deviation of color image, comprising frequency detecting means for detecting frequency of synchronizing signal included in input signal in every input signal entered from outside, digital convergence correction data operating means for operating digital convergence correction data for display means for displaying the input signal as image, corresponding to the frequency detected by the frequency detecting means, using horizontal synchronizing signal or vertical synchronizing signal of the synchronizing signal as timing signal, and pattern signal generating means for generating a convergence adjusting pattern corresponding to the digital convergence correction data from the correction data operating means, wherein the digital convergence of the image displayed by the display means is corrected by using the digital convergence correction data and convergence correcting pattern corresponding to the output of the frequency detecting means.

29 Claims, 42 Drawing Sheets

Sampling points

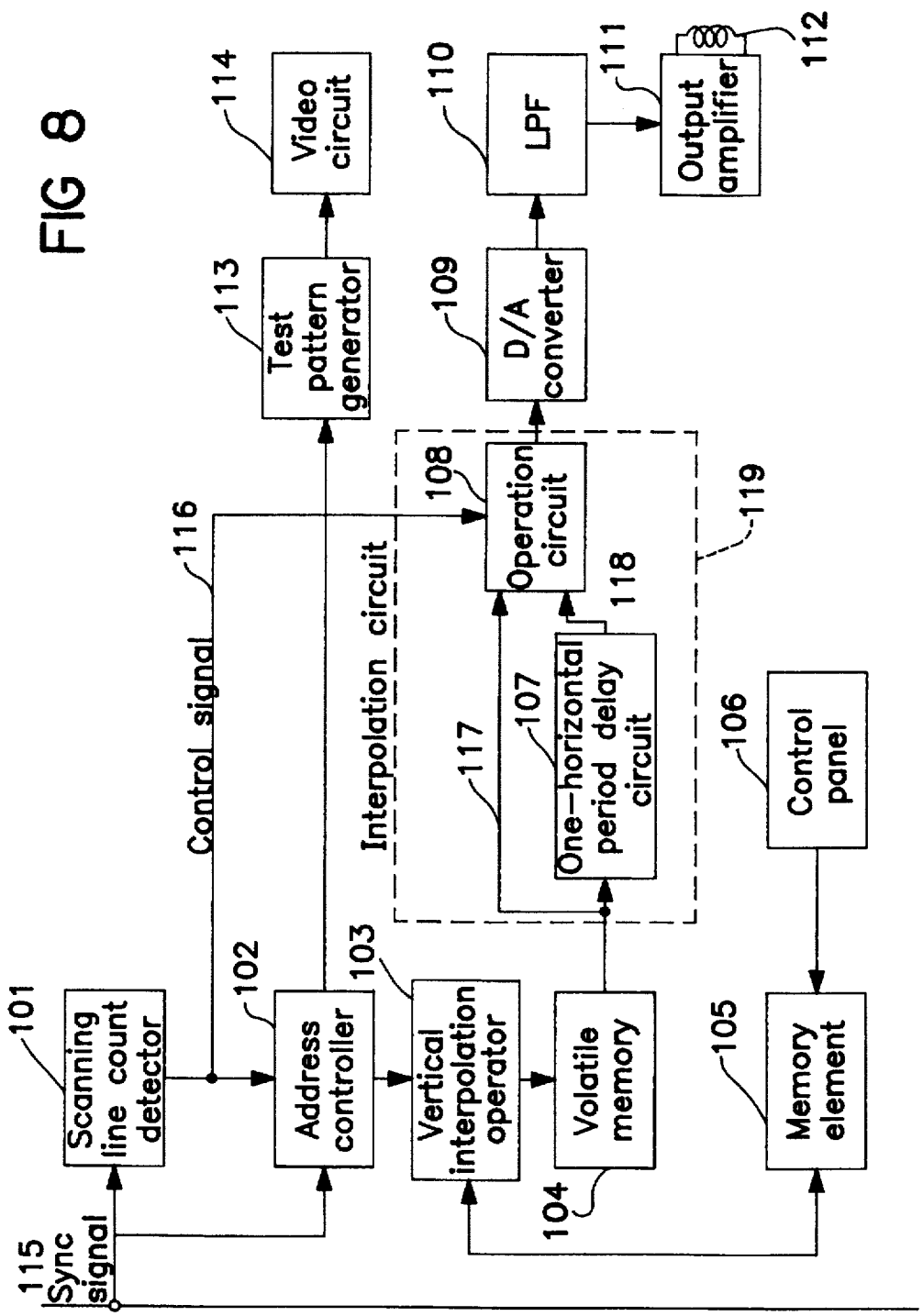

Output of D/A converter 3

Output of low pass filter 39
($f_c = f_c'$)

Output of D/A converter 3

Output of low pass filter 39
($f_c << f_c'$)

Output of low pass filter 39
($f_c >> f_c'$)

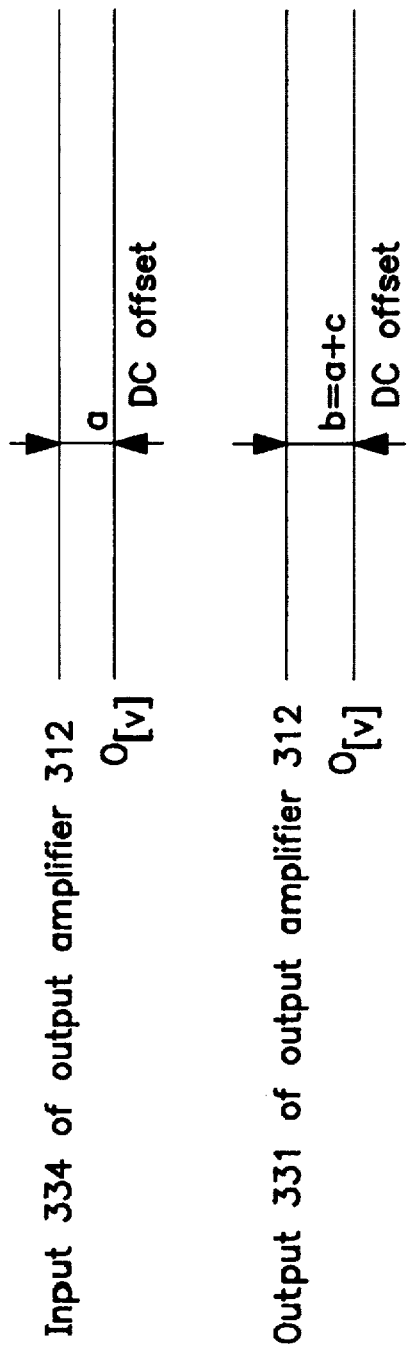
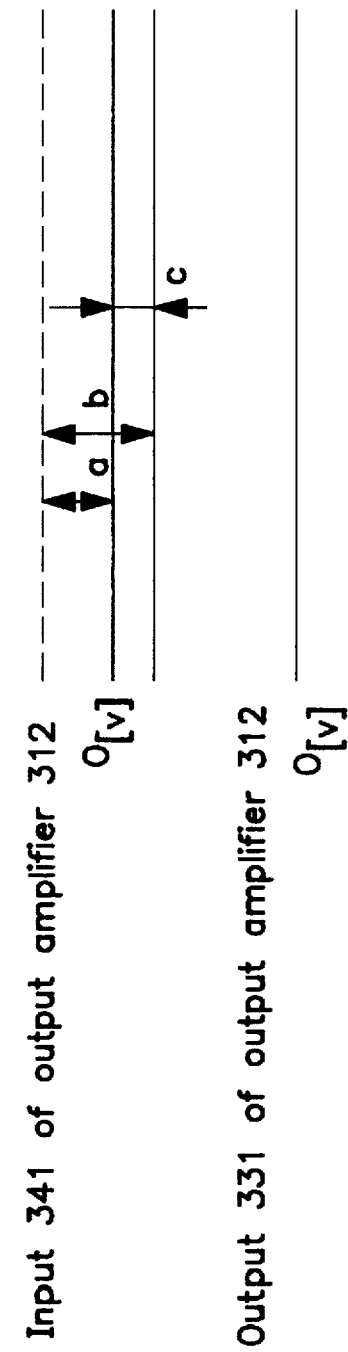
FIG. 42A PRIOR ART
FIG. 42B PRIOR ART

DIGITAL CONVERGENCE APPARATUS

BACKGROUND OF THE INVENTION

The present invention relates to a digital convergence apparatus capable of keeping high precision of convergence correction in image display, even in the case of input signals different in horizontal or vertical synchronizing signals, such as multiscan compatible color receiver capable of displaying images differing in the number of scanning lines per frame, and number of frames per unit time.

Today, thanks to advancement in information related technology, exchange of information between different appliances is easy, and so-called multimedia compatible appliances are developed widely.

Accordingly, in various appliances having video display functions, such as television receiver, display of personal computer, and display of network terminal devices, it is required to have functions for displaying the information securely if various video data are entered in various signal formats.

The invention relates to a digital convergence apparatus applied in a color display apparatus for displaying video information in various signal formats, being capable of correcting the convergence at high precision to avoid color deviation of color image.

More particularly, it is intended to present a digital convergence apparatus capable of correct at high precision for video signals having synchronizing signal at any frequency, including enhancement of convergence correction adjustment precision inside and outside of an effective screen, reduction of time-course changes of convergence, and lessening of mutual interference of convergence correction data.

Generally, in a display device using a cathode-ray tube (CRT), having three electron guns, because of color display by color CRT emitting three primaries by three electron beams, color deviation occurs because the color projection angles of electron beams for projecting on the screen of CRT display are different. This color deviation is revised by convergence correction.

In a projection type color receiver for magnifying and projecting on a screen by using three projecting tubes, the incident angles of rays from projecting tubes of three primaries on the screen are different, and a color deviation occurs on the screen. In this case, too, in order to match the images of three primaries correctly, that is, to achieve convergence, a convergence coil is installed around the CRT, and an analog convergence correction current synchronized in the horizontal and vertical scanning period is passed, and the size and shape of the current waveform are changed to adjust the convergence.

As one of the methods for enhancing the convergence correction precision, a digital convergence apparatus bas been proposed. For example, a digital convergence apparatus is proposed in Japanese Laid-open Patent 60-13028.

Several prior arts for enhancement of convergence correction precision of the digital convergence apparatus, especially prior arts corresponding to different formats of input signals are described below, while referring to the drawings, together with problems.

(1) First is described a basic constitution for passing correction current into a convergence coil by smoothing with LPF after D/A conversion of digital correction data.
Prior art 1

Prior art 1 is shown in FIG. 34. Using horizontal and vertical pulses synchronized with a deflection current for driving the CRT, the problems are solved by generating an adjusting pattern or generating the address of convergence correction point. As a result, the convergence can be corrected independently on every adjusting point in various signal sources.

For convergence correction in CRT, however, it is necessary to correct by passing an analog signal in the convergence coil, which always requires D/A converter 3 and LPF 39. It is difficult to optimize to each frequency of LPF.
Prior art 2

As its countermeasure, FIG. 36 shows a constitution of other conventional digital convergence apparatus for selecting from plural LPFs such as LPF 39, 40, 41 having different cut-off frequencies.

This constitution comprises multiple low pass filters having different cut-off frequencies in order to adjust the convergence precisely in a wide range of synchronizing signal frequencies, and multiple LPFs are needed, the circuit scale is increased, and hence there is a limitation.

(2) Next is described a case of corresponding to the number of scanning lines of input video signal.
Prior art 3

FIG. 37 shows a constitution of a different digital convergence apparatus for detecting the number of scanning lines, and storing the data of the adjusting points corresponding to the number of scanning lines in a volatile memory.

In such constitution, however, the volatile memory 104 is required to have a memory capacity corresponding to the number of scanning lines of the video signal source entered from outside. To cope with various video signal sources having various numbers of scanning lines, a very large memory capacity is demanded in the volatile memory 104.

To solve such problem, hitherto, when a video signal source with a great number of scanning lines is entered from outside, the number of scanning lines is detected by a scanning line count detector 101, and the interval of the convergence correction data in the horizontal direction of an address controller 102 is controlled on the basis of the result of detection. It, however, involved another problem of reduction of precision of convergence correction.

(8) The relation with the generation of adjusting pattern, such as cross hatch pattern used in convergence correction is explained.
Prior art 4

In FIG. 40, the related action of correction data generator and adjusting pattern generator is described as prior art 4.

In this case, in various video signal sources, similarly, the convergence can be corrected independently in each adjusting point, but a same clock is used for driving the adjusting pattern generator 207 and correction data generator 208, and the batch width of the cross hatch pattern of the adjusting pattern is thick, and the precision of convergence adjustment is poor.

(4) The direct-current drift is considered in precision enhancement.
Prior art 5

FIG. 41 shows a prior art for detecting the direct-current component generated in a convergence coil.

In this case, in addition to processing depending on the number of scanning lines, the digital correction data is converted into analog quantity, and in the process of reaching up to the convergence coil 313, a direct-current drift component is superposed on the convergence correction waveform originally applied to the convergence coil 313, due to effects of time course changes and temperature changes, which is detected by a direct-current detecting circuit 329, thereby enhancing the precision.

This example is disclosed in Japanese Laid-open Patent 3-76396.

In the conventional constitution shown in FIG. 41, by correcting and operating in a vertical interpolation operator 303, it is as if direct-current drift component were not superposed on the convergence coil 313, so that static drift component can be suppressed. However, the convergence correction data is changed, and the dynamic range is narrowed.

Thus, in the conventional digital convergence apparatuses, if attempted to maintain the convergence precision corresponding to various input signals, there were problems in the points relating to (1) to (4).

Concerning (1), although the convergence can be corrected independently in each adjusting point in various video signal sources, in the case of multiscan application, it is difficult to optimize the cut-off frequency of the LPF 39 for smoothing the output of the D/A converter 3, for the frequency of the horizontal synchronizing signal of the input signal source S, and sufficient correction precision is not maintained for desired convergence adjustment for all signal sources by one convergence apparatus alone.

Concerning (2), in the constitution of prior art 3 shown in FIG. 37, if the increase of memory capacity of the volatile memory 104 can be suppressed, it leads to another problem of lowering of precision of each convergence correction.

Moreover, when the video signal source entered from outside is interlaced scanning, hitherto, the digital convergence correction data synchronized with the vertical synchronizing signal of the video signal source was directly issued to the D/A converter 109 in a later stage, and hence, as shown in FIG. 39, same convergence correction data is issued in the first frame and second frame of the image.

In such a case, if a smooth convergence correction is done in the vertical direction in each frame, on the actual screen, as shown in FIG. 39, it appears that a stepwise convergence correction be done in the vertical direction, and it results in uneven brightness of the scanning line.

Concerning (3), although independent convergence correction can be done in each adjusting point, since the clock for driving the adjusting pattern generator (cross hatch generator) and the clock for driving the correction data generator are identical, the hatch width of the adjusting pattern becomes thick unless some measure is considered, and the precision of convergence adjustment is poor. Since the hatch width of adjusting pattern depends on the number of adjusting points, a measure for increasing the number of adjusting points may be considered, but since the number of convergence adjusting points is increased in this case, the convergence adjusting time becomes long.

When the digital convergence apparatus is used in multiscan application, in the conventional constitution, the frequency range of VCO oscillation is limited, and hence the frequency range applicable for the digital convergence apparatus was also limited.

If attempted to use the digital convergence apparatus at a frequency beyond the VCO oscillation frequency range, a frequency divider may be used to vary the dividing ratio of the frequency divider depending on the frequency, or the VCO may be composed in multiple stages so as to change over depending on the frequency.

In the former case, since the number of adjusting points varies with the frequency, the adjustment precision fluctuates depending on the corresponding signal source.

In the latter case, a control circuit is required for changing over the VCO, and also changeover of the constant of the LPF may occurs, which increases the number of causes for deterioration of performance as the PLL circuit (jitter, response speed fluctuation).

Concerning (4), to suppress static drift, the convergence correction data stored in the volatile memory 304 is changed. It involved the following problems.

In the constitution as shown in FIG. 41, as shown in the example in FIG. 40, while the center of the dynamic range of convergence correction data is "10000000," it is necessary to shift (in this case, "01111000") the center of the convergence correction data for suppressing the static drift, and it consequently narrowed the dynamic range of the digital convergence apparatus.

Still more, since the direct-current drift component is detected from the convergence correction waveform 331 applied to the convergence coil 313, in the conventional constitution, if it is possible to cancel the static drift appearing in the output 331 of the output amplifier 312, it was not possible to cancel the direct-current drift component superposed on the correction waveform of the input 334 to the output amplifier 312.

Accordingly, in the digital convergence apparatus in which the output amplifier 312 of large amplitude operation and other circuits are composed of different substrates, in the case of maintenance of replacement of substrates, when replacing either circuit substrate, in the conventional constitution, it was necessary to set again the convergence correction data stored in the volatile memory 304 at the site.

SUMMARY OF THE INVENTION

To solve the problems, the invention presents a digital convergence apparatus comprising frequency detecting means for detecting the frequency of synchronizing signal included in an input signal in every input signal entered from outside, digital convergence correction data operating means for operating a horizontal synchronizing signal or vertical synchronizing signal of the synchronizing signal as timing signal from digital convergence correction data for display means for displaying the input signal as picture, corresponding to the frequency detected by the frequency detecting means, and pattern signal generating means for generating a convergence adjusting pattern corresponding to the digital convergence correction data from the correction data operating means, wherein digital convergence correction of the picture displayed in the display means is effected by using the digital convergence correction data and digital convergence correction pattern corresponding to the output of the frequency detecting means.

Accordingly, in input video signal of any frequency, the convergence correction data operating means issues the result of operation capable of forming an optimum waveform when converting into analog signal, and the pattern signal generating means issues an adjusting pattern not lowering the correction precision on the basis of the synchronizing frequency of input video signal, so that digital convergence correction of high precision is achieved.

In particular, the digital convergence apparatus as set forth in claims 2 to 6 of the invention relates to a digital convergence apparatus having features in the convergence correction data operating means, and it is characterized by multiplying the triangular wave on the basis of the synchronizing signal and the data by latching the correction data by two sampling circuits differing in the sampling points.

That is, the constitution comprises a digital correction data generator for issuing digital convergence correction data as the digital signal for convergence correction on the basis of the synchronizing signal included in the signal source from outside, a first D/A converter for converting the digital convergence correction data issued from the digital correction data generating circuit into analog signal, a first sample hold circuit for latching the analog signal issued from the first D/A converter according to a first sampling clock of which period is specified on the basis of the synchronizing signal, a second sample hold circuit for latching the analog signal issued from the first D/A converter according to a second sampling clock different from the first sampling clock, a triangular wave generator for issuing digital triangular wave data which is a digital data corresponding to a triangular wave on the basis of the synchronizing signal, a:second D/A converter for converting the digital triangular wave data issued from the triangular wave generator into analog signal, a first LPF for removing high frequency components from the analog signal issued from the second D/A converter, a third D/A converter for converting the data by inverting each bit of the digital triangular wave data issued from the triangular wave generator into analog signal, a second LPF for removing the high frequency components from the analog signal issued from the third D/A converter, a first analog multiplier for multiplying the output of the first sample hold circuit and the output of the first LPF, a second analog multiplier for multiplying the output of the second sample hold circuit and the output of the second LPF, an analog adder for summing the output of the first analog multiplier and the output of the second analog multiplier, an output amplifier for amplifying the analog convergence correction signal which is the result of addition by the analog adder, and a convergence coil for deflecting scanning of image on the basis of the amplified signal from the output amplifier.

The waveform issued by the first analog multiplier as the product of the analog convergence Correction signal output of the first sample hold circuit and the analog triangular wave output of the first LPF, and the waveform issued by the second analog multiplier as the product of the analog convergence correction signal output of the second sample hold circuit and the analog triangular wave output of the second LPF become triangular waves of double period of each sampling clock, and their amplitude depends on the digital convergence correction data output of the digital correction data generator.

By summing the outputs of the first and second analog multipliers by the analog adder, a desired convergence correction data waveform is obtained at an interval of sampling period T on the basis of the interval of the adjusting points on the screen, regardless of the frequency of the input synchronizing signal.

In particular, the digital convergence apparatus as set forth in claims 7,8, 9, 10, 11, 12, 13, 14, 15, and 16 is further characterized by the correction data operating means, and is designed to interpolate by the delay means for delaying the convergence correction data by one horizontal period, and operating means for vertically interpolating its delay output. As a result, it is compatible to multiscan application without lowering the convergence precision even when the memory capacity is constant.

That is, even when the number of scanning lines of the video signal source entered from outside is greater than the maximum number of corresponding scanning lines limited by the memory capacity of the volatile memory, by feeding the convergence correction data stored in the volatile memory in the interpolation circuit composed of one-horizontal period delay circuit for delaying one horizontal period, that is, one scanning line period, and the operating circuit, it is possible to compensate for the shortage memory capacity of the volatile memory 104, so that it is applicable without increasing the memory capacity of the volatile memory 104.

According to the invention, regardless of the number of scanning lines of the video signal source from outside, it is possible to present easily the digital convergence apparatus, without lowering the convergence correction precision or without increasing the memory capacity of the volatile memory.

In the digital convergence apparatus of the invention, the digital convergence correction operation data in the vertical direction is produced by the interpolation circuit for compensating for the shortage memory capacity of the volatile memory, but if discontinuous point in convergence correction data occurs, the discontinuous point may be easily removed by adding a digital filter circuit in a later stage of the interpolation circuit.

Further according to the invention, in the case of video signal source from outside being interlaced scanning, the conventional problem caused by output of identical convergence correction data regardless of the frame can be easily solved.

More specifically, the digital convergence apparatus for correcting convergence deviation of color image comprises memory means for storing the digital convergence correction data for video signal sources having various numbers of scanning lines, and detecting means for detecting various numbers of scanning lines, wherein the quantity of data of the number of scanning lines of the input video signal source and the memory capacity of the memory means are compared, and when the data quantity of the number of scanning lines of the input video signal source is greater than the memory capacity of the memory means, secondary correction data is further prepared from the digital convergence data in the unit of $2^n$ times (n=1, 2, 3...) of the digital convergence correction data, thereby performing convergence correction, so that the number of corresponding scanning lines to the external video signal source can be extended without increasing the memory capacity of the memory means.

Moreover, the invention presents a digital convergence apparatus comprising a scanning line count detector for receiving a synchronizing signal synchronized with deflection current period, an address controller for receiving the synchronizing signal and controlling by the scanning line count detector, a test pattern generator for controlling by the address controller, a video circuit for receiving the output of the test pattern generator, a memory element for storing and controlling convergence correction data by a control panel, a vertical interpolation operator for performing vertical interpolation on the basis of the convergence correction data stored in the memory element controlled by the address controller, a volatile memory for temporarily holding the data interpolated by the vertical interpolation operator, a one-horizontal period delay circuit for receiving the digital convergence correction data stored in the volatile memory, an operating circuit for receiving the one of the convergence correction data stored in the volatile memory and controlling the output of the one-horizontal period delay circuit by the scanning line count detector receiving the other, a D/A converter for converting the digital convergence correction data output of the operating circuit into analog quantity, an LPF for receiving the output of the D/A converter, an output amplifier for receiving the output of the LPF, and a convergence coil driven by the output amplifier, wherein the number of corresponding scanning lines of external video signal source can be extended without increasing the memory capacity of the volatile memory.

Especially in claims 17, 18, and 19, relating to the correction data operating means and pattern generating means, the frequency divider is composed in two stages, and a frequency automatic judging device is incorporated, and thereby the convergence adjustment precision is enhanced without increasing the adjusting points, so that the convergence correction precision stable even in multiscan application can be achieved.

More specifically, the constitution comprises a frequency automatic detector for receiving a synchronizing signal synchronized with deflection current period, a phase comparator for receiving one of the synchronizing signals, an LPF for receiving its output, a for receiving the output smoothed by the LPF, a 1/N frequency divider for dividing its oscillation output by 1/N so as to be controlled by the frequency automatic detector, a 1/M frequency divider for dividing the divided output further to 1/M, an adjusting pattern generator for feeding the synchronizing signal reproduced by the 1/M frequency divider into the other end of the phase comparator, and further receiving the reproduced synchronizing signal, and using the oscillation clock oscillated by the VCO as input clock, a video signal for receiving its output pattern, a correction data generator for receiving the reproduced synchronizing signal, and using the divided output divided by the 1/N frequency divider as input clock, a D/A converter for receiving the digital correction data output, an LPF for receiving the analog output of the D/A converter, an output amplifier for receiving and amplifying its output, and a convergence coil which is driven by the amplified output.

In the constitution of the invention, as compared with the conventional digital convergence apparatus in which it was difficult to adjust the convergence precisely in a simple structure except by increasing the number of adjusting points because the operation clock of the adjusting pattern generator and the operation clock of the correction data generator were identical, high precision convergence adjustment is realized in a small scale circuit construction.

Moreover, since the frequency divider is composed in two stages and the frequency automatic detector is incorporated, when used in multiscan application, the precision of adjustment pattern can be changed depending on the synchronizing frequency of the external signal source, so that the convergence precision may be enhanced.

In particular, in claims 20, 21, 22, 23, 24, and 25, relating to improvement of direct-current drift, the output of the LPF is A/D converted, and the direct current drift is detected, and correction is operated according to the result of detection, and the correction data is added to the output of the LPF.

Specifically, the digital convergence apparatus comprises digital convergence correction data operating means for operating digital convergence correction data corresponding to an input signal entering from outside, memory means for storing the digital convergence correction data from the correction data operating means, D/A converting means for converting the digital convergence correction data stored in the memory means into analog quantity, an LPF for receiving the analog convergence correction data, A/D converting means for detecting the direct-current drift component from the output of the LPF, correction operating means for calculating the correction value for canceling the direct-current drift component detected from the A/D converting means, and adding means for converting the correction value calculated by the correction operating means into the output of the LPF, wherein the direct-current drift component generated in the LPF is automatically canceled.

That is, the convergence correction data stored in the volatile memory is converted into analog quantity by the D/A converter, and is passed through the LPF, and the direct-current drift component generated by the output of the LPF is detected by the A/D converter, and the correction is operated so as to cancel the direct-current drift component in the operating means on the basis of the result of detection, and the result of correction operation is added to the output of the LPF, so that the direct-current component generated in the LPF is canceled automatically without having to change the convergence correction data stored in the volatile memory.

According to the invention, without sacrificing the dynamic range of the convergence correction data stored in the volatile memory, a digital convergence apparatus capable of automatically canceling the direct-current drift component generated in the LPF is presented. The static drift of the entire digital convergence apparatus can be easily suppressed by composing a self-completed direct-current component canceling circuit in the output amplifier.

Moreover, in the ordinary digital convergence apparatus in which the output amplifier and other block are composed of different substrates, the maintenance for replacement of substrates may be enhanced.

BRIEF DESCRIPTION OF THE DRAWINGS

FIG. 8 is a block diagram of a digital convergence apparatus in embodiment 4 of the invention.

FIGS. 42a and 42b are operation explanatory diagram of the digital convergence apparatus in prior art 6.

DESCRIPTION OF THE PREFERRED EMBODIMENTS

Figure 1:
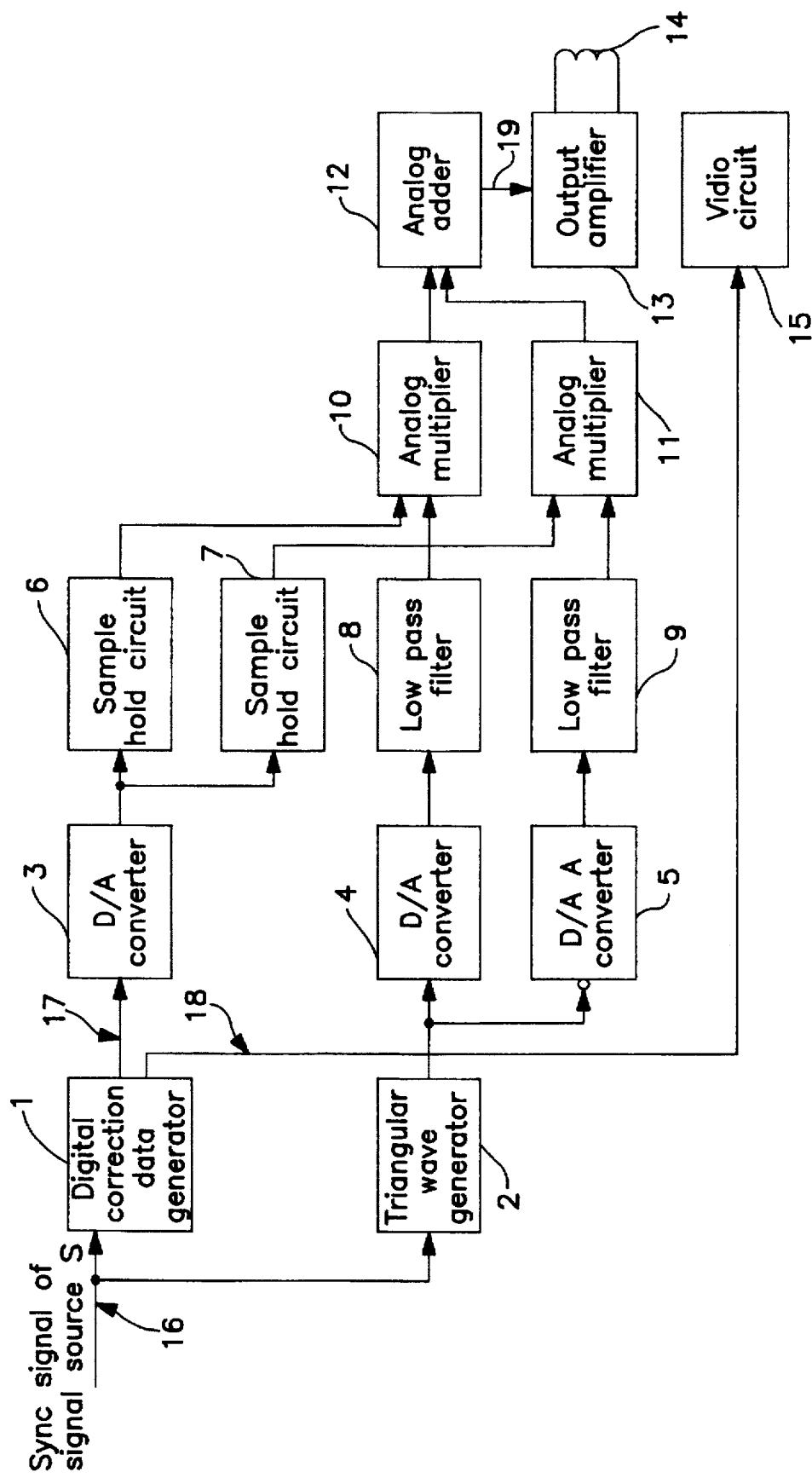
FIG. 1 is a block diagram of a digital convergence apparatus in embodiment 1 of the invention.

Referring now to the drawings, preferred embodiments of the digital convergence apparatus of the invention are described in detail below.

(Embodiment 1)

Embodiment 1 of the digital convergence apparatus corresponding to claims 1 and 2 of the invention is described.

Figure 34:
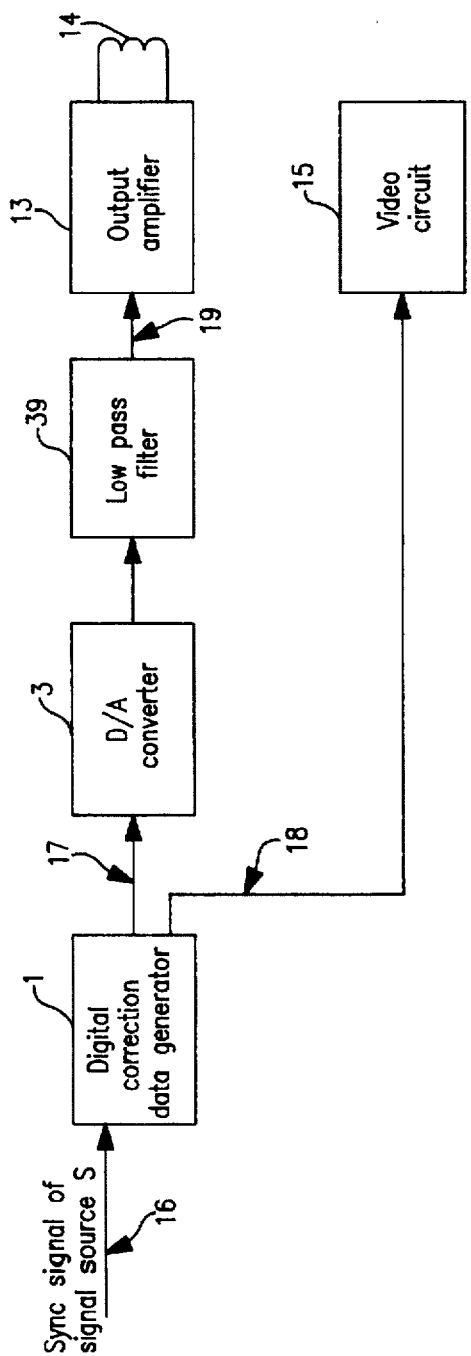
FIG. 34 is a block diagram of a digital convergence apparatus in prior art 1.

First, FIG. 34 relating to a prior art of the invention is described.

Reference numeral 1 is a digital convergence correction data generator (hereinafter called digital correction data generator), 3 is a D/A converter, 39 is a lot Pass filter, 13 is an output amplifier, 14 is a convergence coil, 15 is a video circuit, and 16 is a synchronizing signal included in a signal source S.

Figure 2:
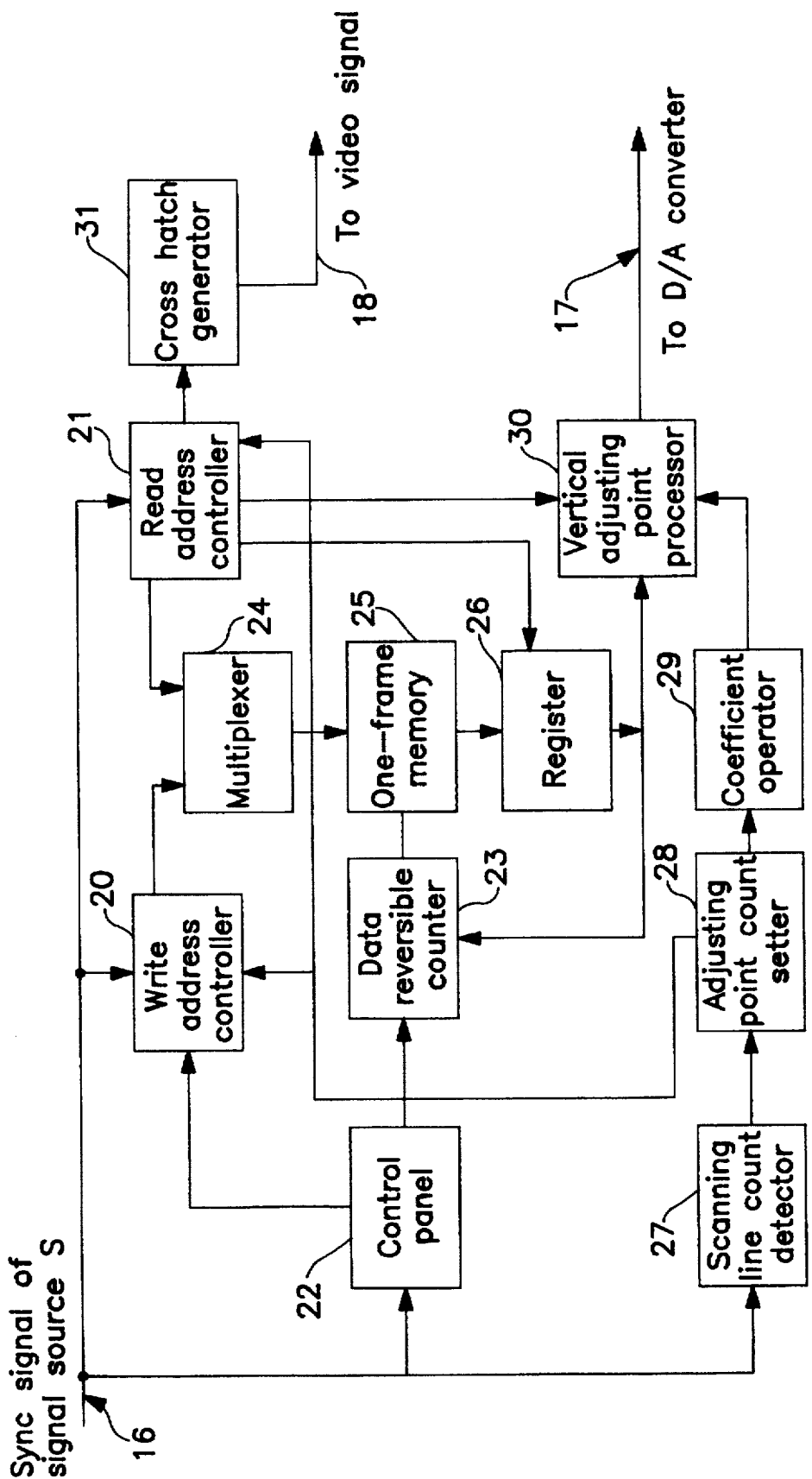
FIG. 2 is a block diagram of a digital correction data generating circuit in embodiment 1 of the invention.

A block diagram of the digital convergence correction data generator 1 is shown in FIG. 2. In FIG. 2, reference numeral 20 is a write address controller, 21 is a read address controller, 22 is a control panel, 23 is an up/down counter, 24 is a multiplexer, 25 is a frame memory, 26 is a register, 27 is a scanning line count detector, 28 is an adjusting point interval setter, 29 is a coefficient operator, 30 is a vertical adjusting point interval processor, and 31 is a cross hatch generator.

The operation of such conventional digital convergence apparatus composed of these elements and the manipulating method of this apparatus are described below.

In FIG. 34 and FIG. 2, the horizontal and vertical synchronizing pulses synchronized with the deflection current period included in the synchronizing signal 16 of the signal source S drive the read address controller 21. The output signal from the read address controller 21 drives the cross hatch generator 31, and its output 18 projects a cross hatch pattern on a projection screen through the video circuit 15.

Figure 3:
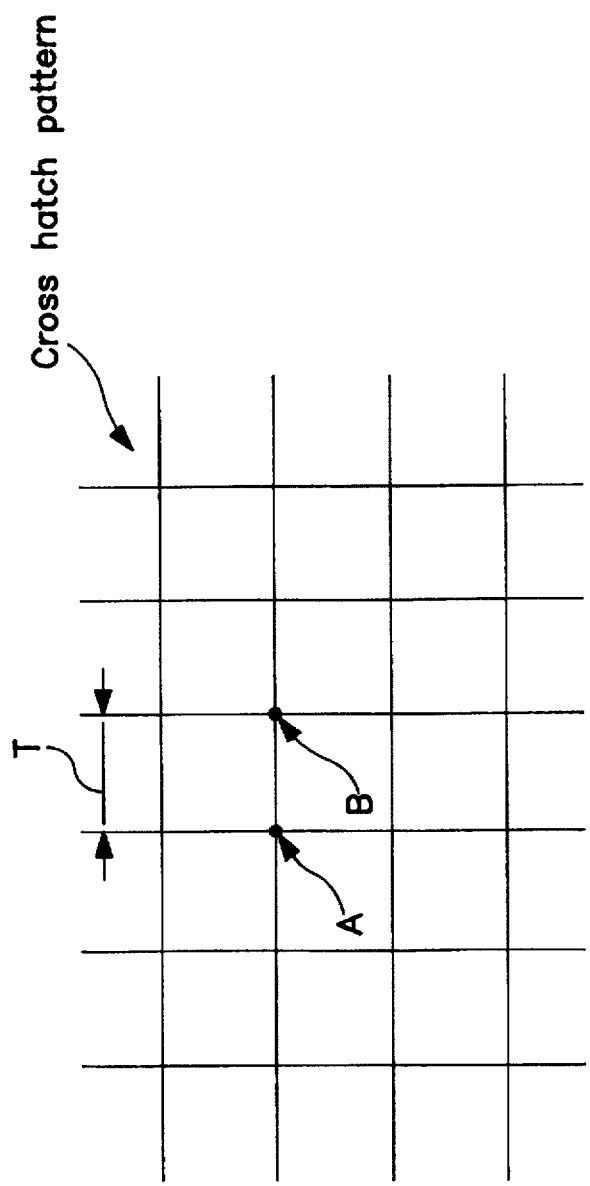
FIG. 3 is an example of convergence adjustment of the invention.

The adjusting operator manipulates an address key on the control panel 22, and specifies a cross point at a position requiring convergence correction (hereinafter called adjusting point, for example point A or point B on the cross hatch pattern shown in FIG. 3), and sets the position address in the write address controller 20.

Consequently, the adjusting operator manipulates a data write key of a desired color to be corrected, for example, red key provided on the control panel 22, and write the correction amount into the frame memory 25 through the up/down counter 23 while observing the screen. Usually, writing into the frame memory 25 is changed over and controlled by the multiplexer 24 so as to be done in the blanking period of the video signal, so that reading of the frame memory 25 will not be lost. In this way, similar manipulation is done at each adjusting point.

Next, to read the frame memory 25, each adjusting point position on the screen is read by the read address controller 21, and through a register 26 driven by the read address controller 21, the correction amount is processed on the deviation in the vertical scanning direction between adjusting points in the vertical adjusting point interval processor 30.

To correspond to various video signal sources, it is necessary to process the adjusting point interval depending on various numbers of scanning lines. Accordingly, the synchronizing signal 16 is supplied to the scanning line count detector 27, and the number of scanning lines per field is detected, and is given to the adjusting point interval setter 28. In the adjusting point interval setter 28, the number of scanning lines R between R=P/(Q+1) adjusting points is determined from the number of scanning lines P per field and the number of adjusting points Q in the vertical direction, and the information is given to the coefficient operator 29. The other output of the adjusting point interval setter 28 is given to the Trite address controller 20 and read address controller 21, and the write address controller 20 and read address controller 21 are changed over in operation in every R times.

In thus operating digital convergence correction data generator 1, the output 17 of the vertical adjusting point interval processor 30 is fed into the D/A converter 3, and it is converted into an analog signal herein. The signal between adjusting points in the horizontal direction is smoothed by the low pass filter (LPF) 39 of the correction amount of the adjusting point of each line, and its output 19 is amplified by the output amplifier 13, and is supplied into the convergence coil 14. The detection signal from the scanning line count detector 27 is given to the deflecting circuit as system changeover signal, and the deflection amplitude and deflection frequency are changed over. In this ray, in various signal sources, the convergence can be corrected independently of each adjusting point.

Besides, when reading out data between adjusting points, the convergence correction data of each scanning line is created by vertical interpolation calculation, but alternatively the data of the scanning lines of the entire screen may be preliminarily determined by vertical interpolation calculation, and all obtained data are written into the frame memory, and the data is read out from the frame memory to be corrected. In this case, too, the convergence can be corrected independently of each adjusting point in every video signal source.

Figure 36:
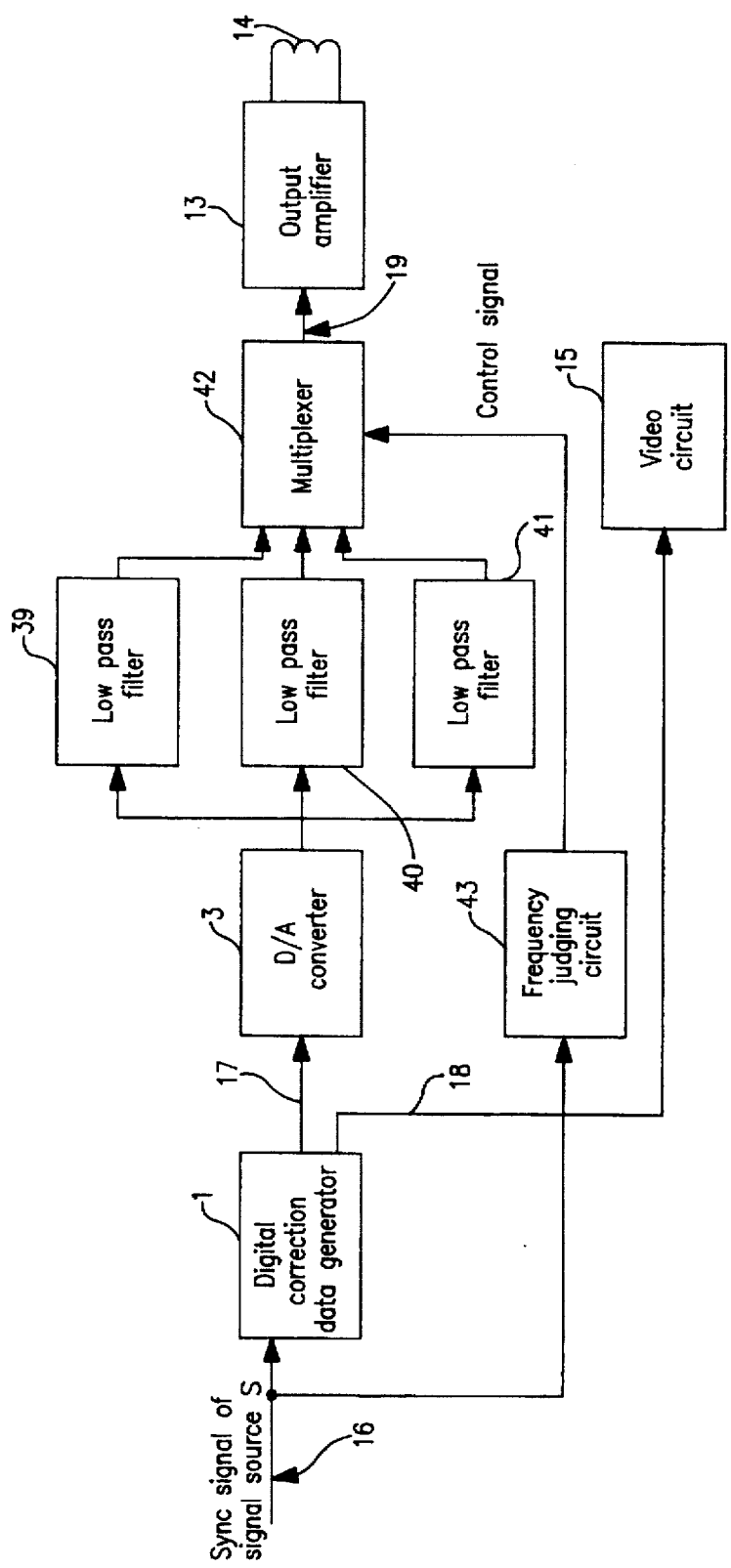
FIG. 36 is a block diagram of a digital convergence apparatus in prior art 2.

In FIG. 36, reference numeral I is a digital correction data generator, 3 is a D/A converter, 39, 40, 41 are low pass filters having different cut-off frequencies, 42 is a multiplexer, 13 is an output amplifier, 14 is a convergence coil, 43 is a frequency judging circuit, 15 is a video circuit, and 16 is synchronizing signal included in the signal source S.

Figure 35A:
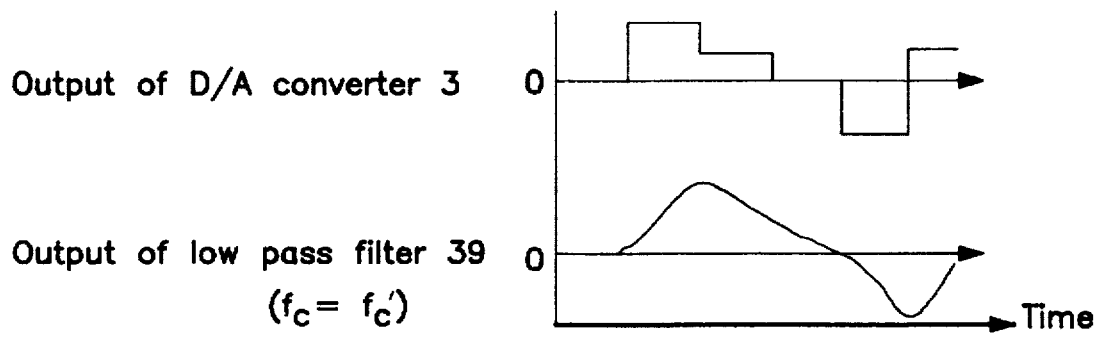
FIGS. 35a and 35b are phase relation diagram of signals in prior art 1.
Figure 35B:
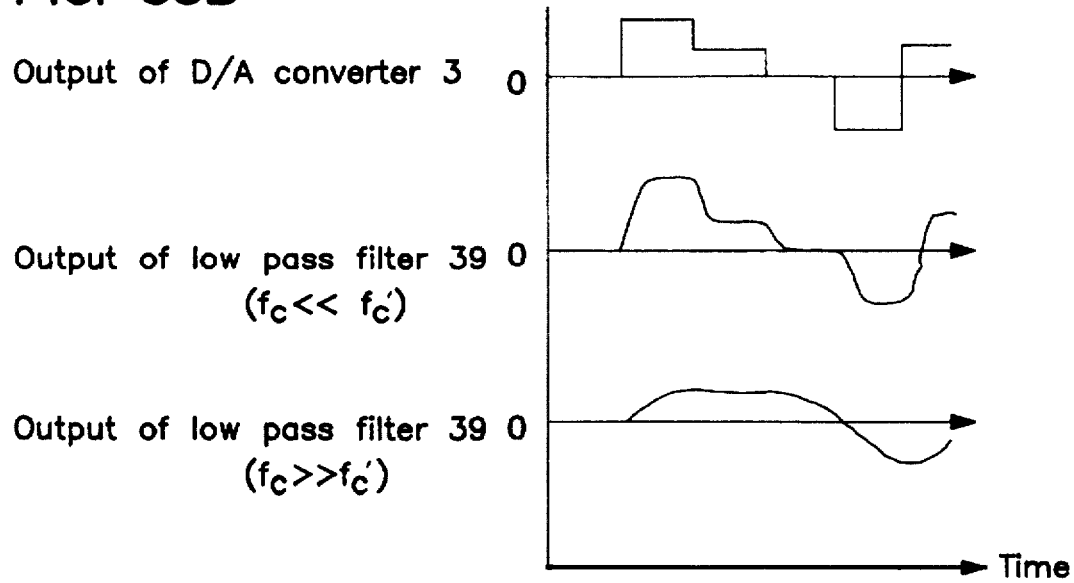

The operation of the digital convergence apparatus in FIG. 36 is described below. In FIG. 36, an external synchronizing signal 16 is fed into the frequency judging circuit 43, and its frequency judging result is put into the multiplexer 42, the output of the low pass filter having the optimum cut-off frequency for the frequency of the external synchronizing signal is selected from the low-pass filters 39 to 41 having different cut-off frequencies, and its output 19 is put into the output amplifier 13 to be amplified, and the convergence coil 14 is driven. This constitution has multiple low pass filters having different cut-off frequencies in order to adjust the convergence precisely for a wide range of synchronizing signal frequencies. Its problems are described below while referring to FIG. 34 and FIGS. 35a and 35b.

In the conventional digital convergence apparatus shown in FIG. 34, the output 17 of the digital correction data generator 1 receiving the synchronizing signal 16 of the signal source S is put into the D/A converter 3, and its output is put into the LPF 39 having cut-off frequency fc'. The output 19 smoothed by the cut-off frequency fc' is put into the output amplifier 13, and is supplied into the convergence coil 14.

Herein, as shown in FIG. 35 (a), when the desired cut-off frequency fc for the frequency of the synchronizing signal entering from outside coincides with the cut-off frequency fc' of the LPF 39 (fc=fc'), an appropriate output for convergence correction is obtained from the LPF 39.

In this digital convergence apparatus, however, if the frequency of the external synchronizing signal is lower than the expected frequency, as shown in FIG. 35 (b), the relation of the cut-off frequency fc' of the LPF 39 and the desired LPF cut-off frequency fc becomes fc<fc'. At this time, the output for convergence correction from the LPF 39 is higher in the cut-off frequency fc' of the LPF 39 as compared with the desired cut-off frequency fc, and hence the output of the D/A converter 3 is not smoothed, and hence smooth convergence correction waveform as shown in FIG. 35 (a) is not obtained.

Furthermore, in this digital convergence apparatus, when the frequency of the external synchronizing signal is higher than the expected frequency, as shown in FIG. 35 (b), the relation of the cut-off frequency fc' of the LPF 39 and the desired LPF cut-off frequency fc becomes fc>fc', and the output for convergence correction from the LPF 39 is, contrary to the case above, smoothes the output of the D/A converter excessively, so that smooth convergence correction waveform as in FIG. 35 (a) is not obtained.

In the digital convergence apparatus of prior art 2 explained in FIG. 36, it requires multiple LPFs having different cut-off frequencies, and the circuit scale is very large, and hence the cost is raised.

By contrast, FIG. 1 shoving an embodiment of the invention is a block diagram of embodiment 1 of the digital convergence apparatus.

In FIG. 1, reference numeral 1 is a digital correction data generator, 2 is a triangular wave generator, 3, 4, 5 are D/A converters, 6, 7 are sample hold circuits, 8, 9 are LPFs, 10, 11 are analog multipliers, 12 is an analog adder, 13 is an output amplifier, 14 is a convergence coil, 15 is a video circuit, and 16 is a synchronizing circuit included in the signal source S.

Figure 6A:
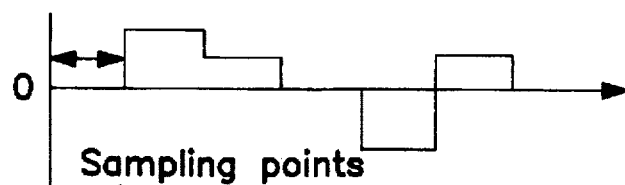
FIG. 6 is a phase relation diagram of signals in embodiment 3 of the invention.
Figure 6B:
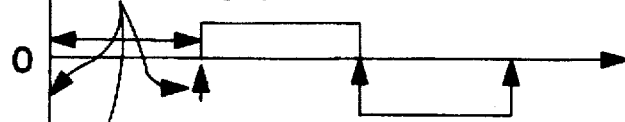
Figure 6C:
Figure 6D:
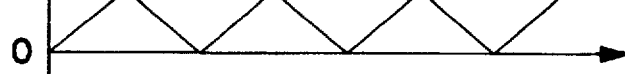
Figure 6E:
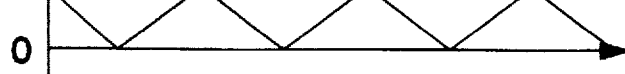
Figure 6F:
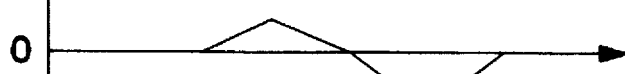
Figure 6G:
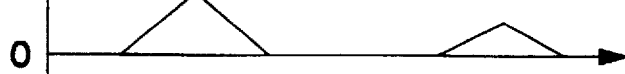
Figure 6H:
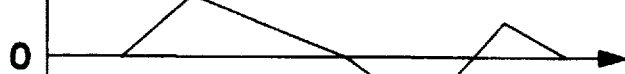

In the digital convergence apparatus composed of such constituent elements, the operation is described below while referring to FIGS. 6a and 6a.

In FIG. 1, the synchronizing signal 16 is put into the digital correction data generator 1. A detailed circuit diagram of the digital correction data generator 1 is shown in FIG. 2. The operating principle of the digital correction data generator 1 is explained in the prior art, and its explanation is omitted herein.

The digital correction data output 17 of the digital correction data generator 1 is put into the first D/A converter 3, and is converted into analog correction data as shown in FIG. 6 (a). The output of the D/A converter 3 is put into the first and second sample hold circuits 6 and 7 for latching on the basis of different sampling clocks having different sampling points. Herein, the sampling points are set at double period (2T) of the original sampling period T shown in FIG. 6 (a) (corresponding to T shown in FIG. 3, and this T is generated by equally dividing the period of synchronizing signal 16), and there is a phase difference of T between the sampling point of the sample hold circuit 6 and the sampling point of the sample hold circuit 7. The outputs held at such sampling points are shown respectively in FIG. 6 (b) and FIG. 6 (c).

On the other hand, the synchronizing signal 16 is put into the triangular wave generator 2. The digital data of the triangular wave generator 2 is put into the second D/A converter 4, and is converted into the analog quantity as shown in FIG. 6 (d). The output of the D/A converter 4 is put into the first LPF 8 in order to remove the gritty component which is a high frequency component superposed on the output of the D/A converter 4.

Similarly, the data delayed by the sampling point interval T from the digital data of the triangular wave generator 2

(that is, reverse phase data) is put into the third D/A converter 5, and is converted into analog quantity as shown in FIG. 6 (e). Likewise, to remove the gritty component which is a high frequency component superposed on the output of the D/A converter 5, the output of the D/A converter 5 is put into the second LPF 9.

The analog correction data output of the sample hold circuit 6 and the analog triangular wave output of the LPF 8 thus generated are put into the first analog multiplier 10. On the other hand, the analog correction data output of the sample hold circuit 7 and the analog triangular wave output of the LPF 9 are put into the second analog multiplier 11.

The output waveforms of the analog multipliers 10, 11 are shown in FIG. 6 (f) and FIG. 6 (g). As shown in FIG. 6 (f) and FIG. 6 (g), the output waveforms of the analog multipliers 10, 11 are triangular waves in the width of sampling period 2T, and their amplitude depends on the correction data output of the digital correction data generator 1.

When the outputs of the analog multipliers 10, 11 are put into the analog adder 12, as shown in FIG. 6 (h), regardless of the frequency of input synchronizing signal, desired correction data waveform is obtained at an interval of the sampling period T on the basis of the interval of adjusting points on the screen. The output of the analog adder 12 is put into the output amplifier 13 and amplified. By the amplified correction data, the convergence coil 14 is driven.

Thus, according to the embodiment, by combining the triangular wave generator 2, sample hold circuits 6, 7, analog multipliers and adder, the problems difficult in multiscan application in the conventional constitution can be easily solved.

(Embodiment 2)

This is to explain embodiment 2 of the digital convergence apparatus corresponding to claim 3 of the invention.

Figure 4:
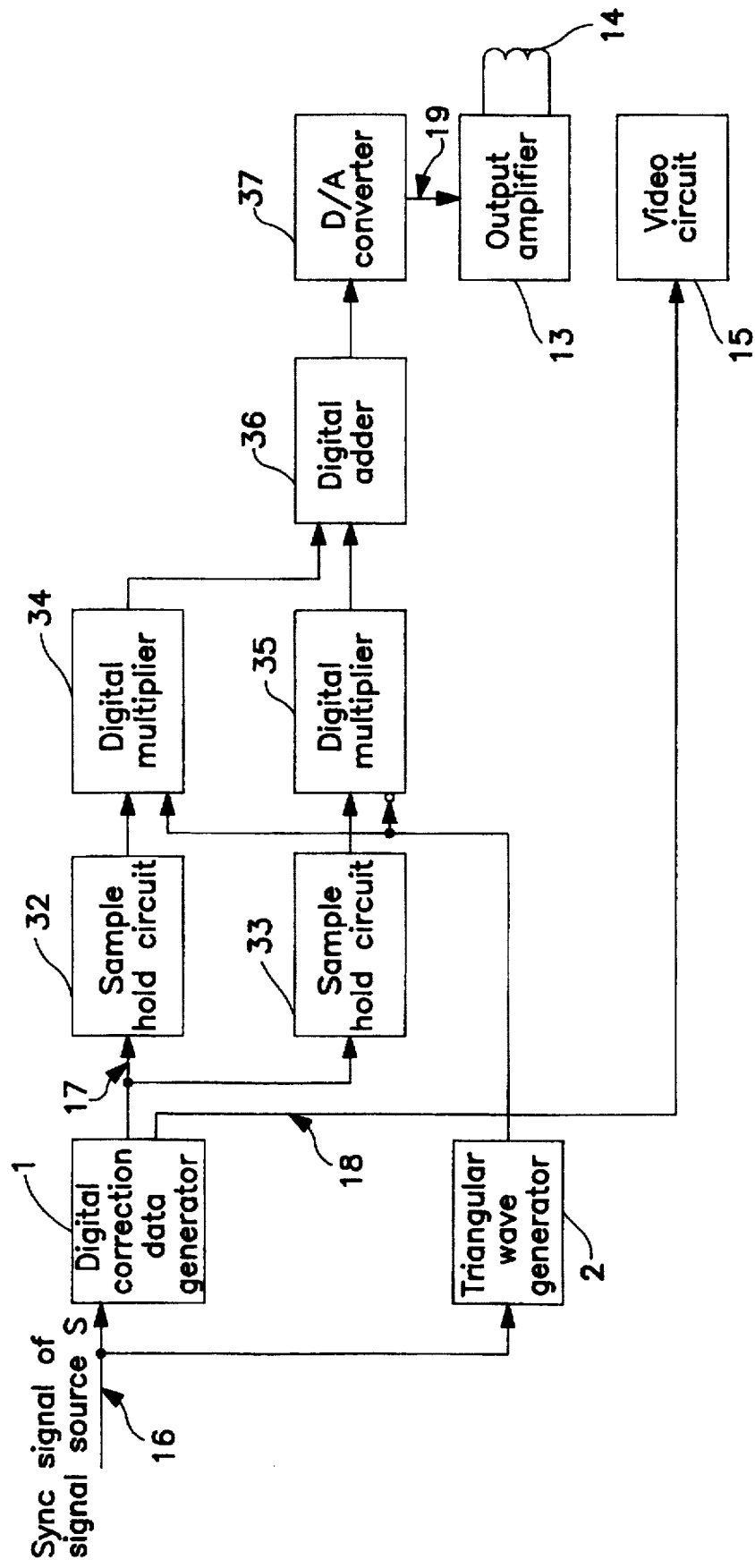
FIG. 4 is a block diagram of a digital convergence apparatus in embodiment 2 of the invention.

FIG. 4 is a block diagram of embodiment 2 of the digital convergence apparatus. In FIG. 4, reference numeral 1 is a digital correction data generator, 2 is a triangular wave generator, 82, 33 are sample hold circuits, 34, 35 are digital multipliers, 36 is a digital adder, 37 is a D/A converter 13 is an output amplifier, 14 is a convergence coil, 15 is a video circuit, and 16 is a synchronizing circuit included in the signal source S.

In the digital convergence apparatus composed of such constituent elements, the operation is described below.

In FIG. 4, the synchronizing signal 16 is put into the digital correction data generator 1. A detailed circuit diagram of the digital correction data generator 1 is shown in FIG. 2. The operating principle of the digital correction data generator 1 is explained in the prior art, and its explanation is omitted herein.

The digital correction data output 17 of the digital correction data generator 1 is put into the first and second sample hold circuits 32 and 38 for latching on the basis of different sampling clocks having different sampling points. Herein, the sampling points are, same as in embodiment 1, set at double period (2T) of the original sampling period T, and there is a phase difference of half period of the sampling period between the sampling points of the sample hold circuit 32 and sample hold circuit 33.

On the other hand, the synchronizing signal 16 is put into the triangular wave generator 2. The digital data of the triangular wave generator 2 and the output of the sample hold circuit 32 are put into the first digital multiplier 34. Similarly, the data inverted in each bit of the digital data of the triangular wave generator 2 (that is, reverse phase data) and the output of the sample hold circuit 33 are put into the second digital multiplier 35.

The outputs of the digital multipliers 34, 35 are put into the digital adder 36. The digital output of the digital adder 36 is put the D/A amplifier 37 to be converted into analog correction data quantity, and this analog correction data 19 is amplified in the output amplifier 13. By the amplified correction data, the convergence coil 14 is driven.

Thus, according to the embodiment, by combining the triangular wave generator 2, sample hold circuits 32, 33, digital multipliers 34, 35 and digital adder 36, the problems difficult in multiscan application in the conventional constitution can be easily solved.

Moreover, as compared with the constitution of embodiment 1 (FIG. 1), in the constitution of this embodiment, signal processing of convergence correction data can be done by the digital circuits only as much as immediately before the output amplifier 13, and effects of fluctuations of pats and noise from peripheral circuits which were defects of analog circuits can be eliminated, and the LSI can be structured and the number of parts is saved. Hence, the digital convergence apparatus of high stability and high precision usable in multiscan application is realized.

(Embodiment 3)

Embodiment 3 of the digital convergence apparatus corresponding to claim 4 of the invention is described.

Figure 5:
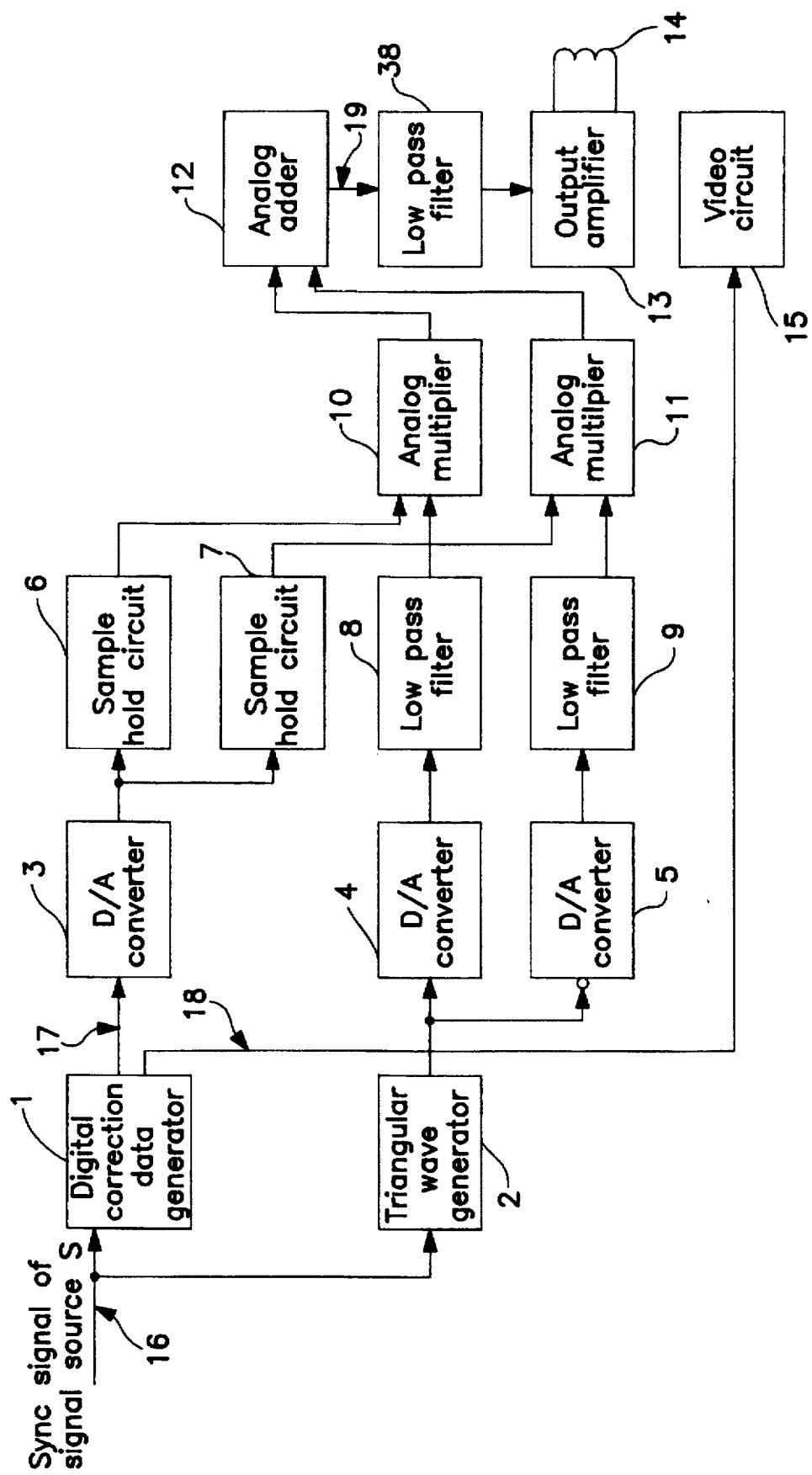
FIG. 5 is a block diagram of a digital convergence apparatus in embodiment 3 of the invention.

FIG. 5 is a block diagram of embodiment 3 of the digital convergence apparatus. In FIG. 5, reference numeral 1 is a digital correction data generator, 2 is a triangular wave generator, 3, 4, 5 are D/A converters, 6, 7 are sample hold circuits, 8, g are LPFs, 10, 11 are analog multipliers, 12 is an analog adder, 38 is an LPF, 13 is an output amplifier, 14 is a convergence coil, 15 is a video circuit, and 16 is a synchronizing circuit included in the signal source S.

Figures 7A, 7B:
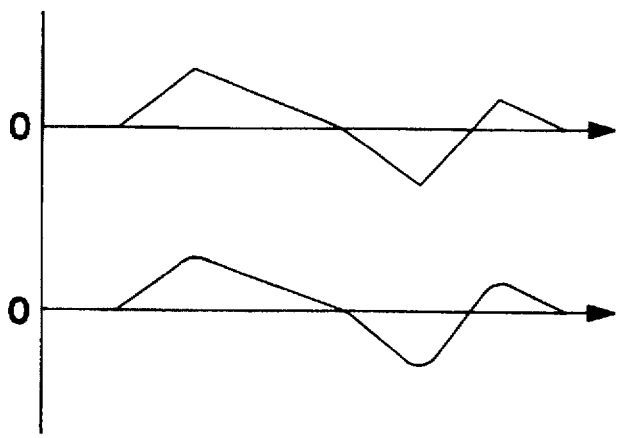
FIGS. 7a and 7b are phase relation diagram of signals in embodiment 3 of the invention.

In the digital convergence apparatus composed of such constituent elements, the operation is described below while referring to FIGS. 7a and 7b.

In FIG. 5, the operation up to the analog correction data output 19 of the analog adder 12 is same as in the operation of embodiment 1 (FIG. 1), and the explanation is omitted herein.

The analog correction point data output has a sharp data change point at data correction point as shown in FIG. 7 (a). This is because, as shown in FIG. 5, the triangular wave generating circuit 2 is provided inside the digital convergence apparatus. At such sharp data change point, smooth correction data change is not obtained, and hence the sharp data change point is smoothed by the LPF 38 having a slightly lower cut-off frequency than the cutoff frequencies of the LPF 8, 9, so that a smooth correction data waveform is obtained as shown in FIG. 7 (b).

In this embodiment 3, the analog correction data output 19 of the analog adder 12 in embodiment 1 shown in FIG. 1 is used also as the analog correction data output 19, but the same effect is obtained by using the analog correction data output 19 of the D/A converter 37 in embodiment 2 in FIG. 4.

In the foregoing embodiments 1, 2 and 3, in the color receiver compatible for multiscan application, smooth convergence adjustment is realized in various input signal sources differing in the frequency of synchronizing signal, and the correction precision of convergence can be enhanced.

(Embodiment 4)

A different embodiment of the invention is described n FIG. 8 through FIG. 13.

Figure 37:
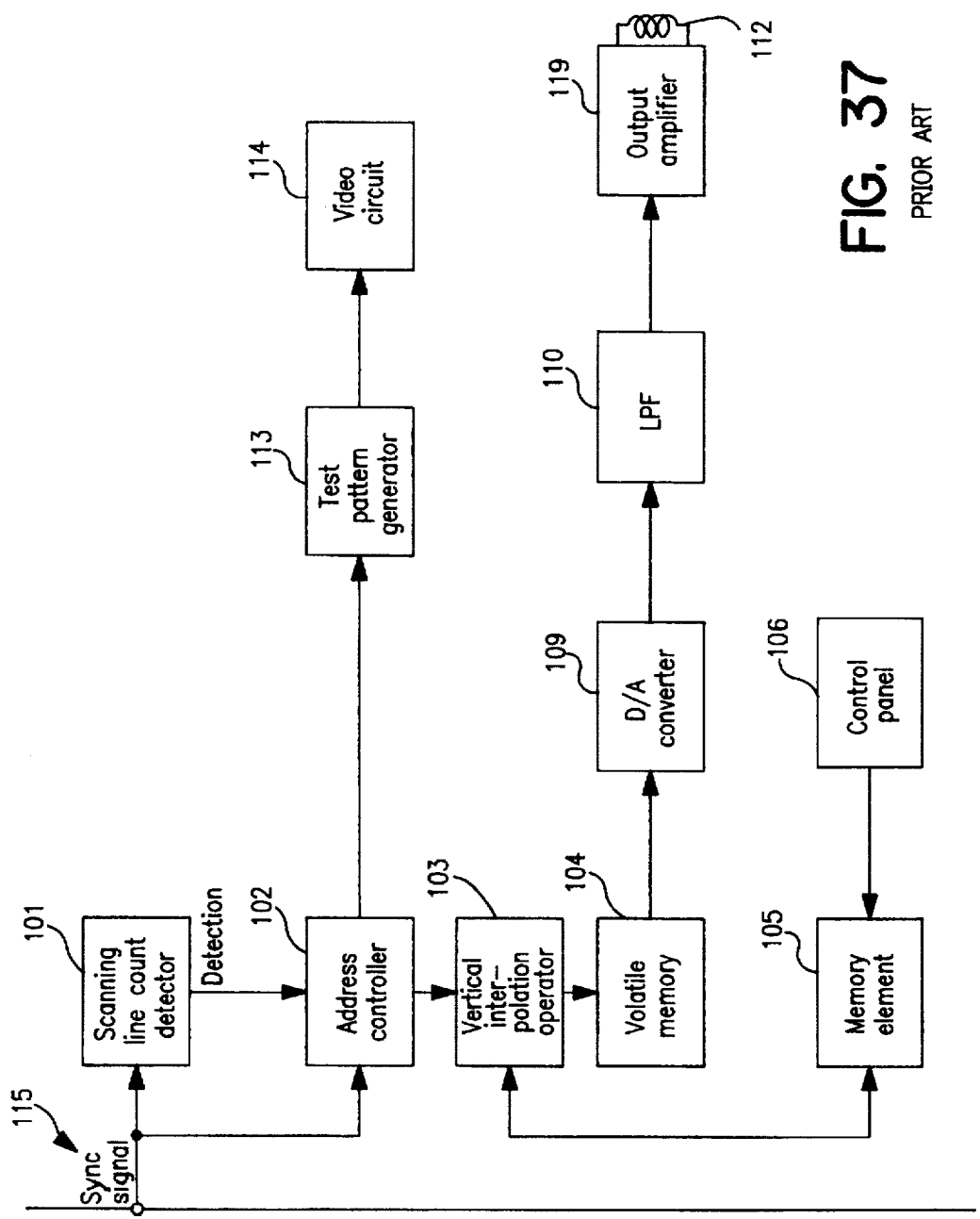
FIG. 37 is a block diagram of a digital convergence apparatus in prior art 3.

First of all, the prior at in FIG. 37 is explained. Reference numeral 101 is a scanning line count detector, 102 is an address controller, 103 is a vertical interpolation operator, 104 is a volatile memory, 105 is a memory element, 106 is a control panel, 113 is a test pattern generator, 114 is a video circuit, 109 is a D/A converter, 110 is an LPF, 11 is an output amplifier, 112 is a convergence coil, and 115 is a synchronizing signal synchronized with deflection current period.

In thus constituted digital convergence apparatus, the operation is described below.

In FIG. 37, the synchronizing signal 115 synchronized with the deflection current period is put into the address controller 102 and into the scanning line count detector 101. The detection result of the number of scanning lines of the scanning line count detector 101 is put in as the control signal of the address controller 102, and this control signal controls the test pattern generator 113 and vertical interpolation operator 103.

First, by the control signal from the address controller 102, the test pattern generator 113 is driven, and a test pattern (for example, a cross hatch pattern) is projected on a projection screen by the video circuit 114.

Consequently, by the data write key of the color desired to be corrected, for example, red key provided in the control panel 106, the correction amount is written into the memory element 105 while observing the screen. To correspond to various video signal sources, it is necessary to process the interval of adjusting points depending on various numbers of scanning lines, and therefore the synchronizing signal 115 is fed into the scanning line count detector 101 and is added to the vertical interpolation operator 103 through the address controller 102. In the vertical interpolation operator 103, from the number of scanning lines P per field (or frame) and the number of adjusting points Q in the vertical direction, the number of scanning lines R in R=P/(Q+1) adjusting points is determined, and in every R times the vertical interpolation is operated on the basis of the convergence correction data of the memory element 105, and the result:of the vertical interpolation is written into the volatile memory 104 on every occasion.

The convergence correction data stored in the volatile memory 104 is converted into analog quantity in the D/A converter 109, and is smoothed by the LPF 110. The output 134 of the LPF 110 is put into the output amplifier 112, and the amplified convergence correction data is applied to the convergence coil 113.

In this constitution, however, the volatile memory 104 is required to have a memory capacity corresponding to the number of scanning lines of video signal source entered from outside. To cope with various videos signal sources having various numbers of scanning lines, the required memory capacity of the volatile memory 104 is very large.

Figure 38A:
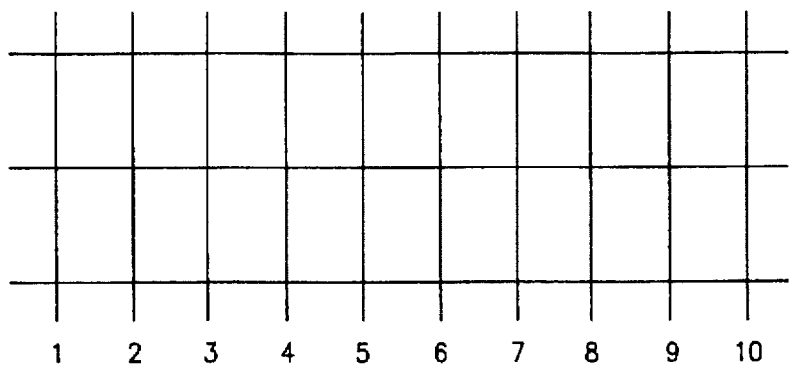
FIGS. 38a and 38b correspondence diagrams of screen and corresponding scanning lines of the digital convergence apparatus in prior art 3.
Figure 38B:
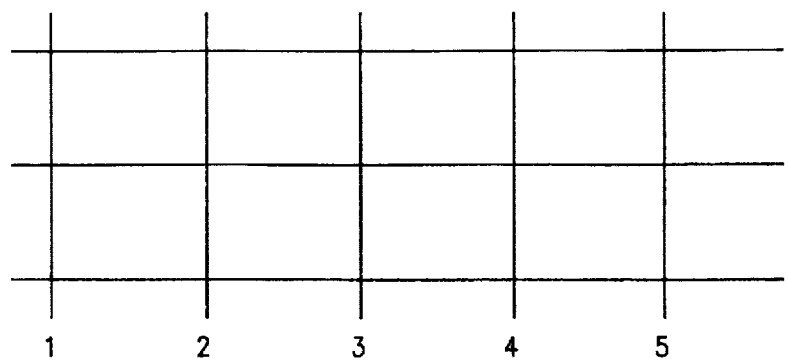

To solve this problem, hitherto, when a video signal source is a great number of scanning lines was entered from outside, the number of scanning lines was detected by the scanning line count detector 101, and the horizontal direction convergence correction data interval of the address controller 102 was controlled on the basis of the result of detection. Its example is shown in FIGS. 38a and 38b.

When the digital convergence apparatus shown in FIG. 38 (a) has a volatile memory 104 with a memory capacity of 1M bit, 16 bits each are provided each concerning R, G, B three colors×(horizontal+vertical)=6 channels of each digital convergence correction data, and supposing the number of pieces of convergence correction data in one horizontal direction to be 10, the maximum number of scanning lines that can be handled by this digital convergence apparatus is 1$M$/(16×6×10)=max. 1041 lines.

Hence, conventionally, as for the video signal source with more than 1042 scanning lines, as shown in FIG. 38 (b), the number of pieces of convergence correction data in one horizontal direction was decreased. In FIG. 38 (b), by reducing the number of pieces of convergence correction data in one horizontal direction to half of FIG. 38 (a), the applicable number of scanning lines is 1$M$/(16×6×5)=max. 2083 lines.

Incidentally, a similar effect is obtained by changing the precision of each data from 16 bits to 8 bits.

By contrast, in the embodiment of the invention, in FIG. 8, reference numeral 101 is a scanning line count detector, 102 is an address controller, 103 is a vertical interpolation operator, 104 is a volatile memory, 105 is a memory element, 106 is a control panel, 107 is a one-horizontal period delay circuit, 108 is an operating circuit, 109 is a D/A converter, 110 is an LPF, 111 is an output amplifier, 112 is a convergence coil, 113 is a test pattern generator, 114 is a video circuit, and 115 is a synchronizing signal synchronized with deflection current period. Meanwhile, the one-horizontal period delay circuit 107 and operating circuit 108 for interpolating the data for the digital convergence correction data stored in the volatile memory 104 are collectively called an interpolating circuit 119.

In thus constituted digital convergence apparatus, the operation is described below.

In FIG. 8, the synchronizing signal 115 synchronized with the deflection current period is put into the address controller 102 and into the scanning line count detector 101. The detection result of the number of scanning lines of the scanning line count detector 101 is put in as the control signal of the address controller 102, and this control signal controls the test pattern generator 113 and vertical interpolation operator 103.

First, by the control signal from the address controller 102, the test pattern generator 113 is driven, and a test pattern (for example, a cross hatch pattern) is projected on a projection screen by the video circuit 114.

Consequently, by the data write key of the color desired to be corrected, for example, red key provided in the control panel 106, the correction amount is written into the memory element 105 while observing the screen. To correspond to various video signal sources, it is necessary to process the interval of adjusting points depending on various numbers of scanning lines, and therefore the synchronizing signal 115 is fed into the scanning line count detector 101 and is added to the vertical interpolation operator 103 through the address controller 102. In the vertical interpolation operator 103, from the number of scanning lines $P_f$ per frame and the number of adjusting points $Q_f$ in the vertical direction, the number of scanning lines $R_f$ in $R_f=P_f/(Q_f+1)$ adjusting points is determined, and in every $R_f$ times the vertical interpolation is operated on the basis of the convergence correction data of the memory element 105, and the result of the vertical interpolation is written into the volatile memory 104 on every occasion.

The convergence correction data stored in the volatile memory 104 is put into the interpolating circuit 119, and converted into analog quantity in the D/A converter 9, and the convergence correction data is smoothed in the horizontal direction by the LPF 110. The output of the LPF 110 is put into the output amplifier 111, and the amplified convergence correction data is applied to the convergence coil 112.

In thus constituted digital convergence apparatus of the embodiment, the operation of the interpolating circuit 119 which is a feature of the invention is described in detail below while referring to FIG. 9 to FIG. 13.

Figure 9:
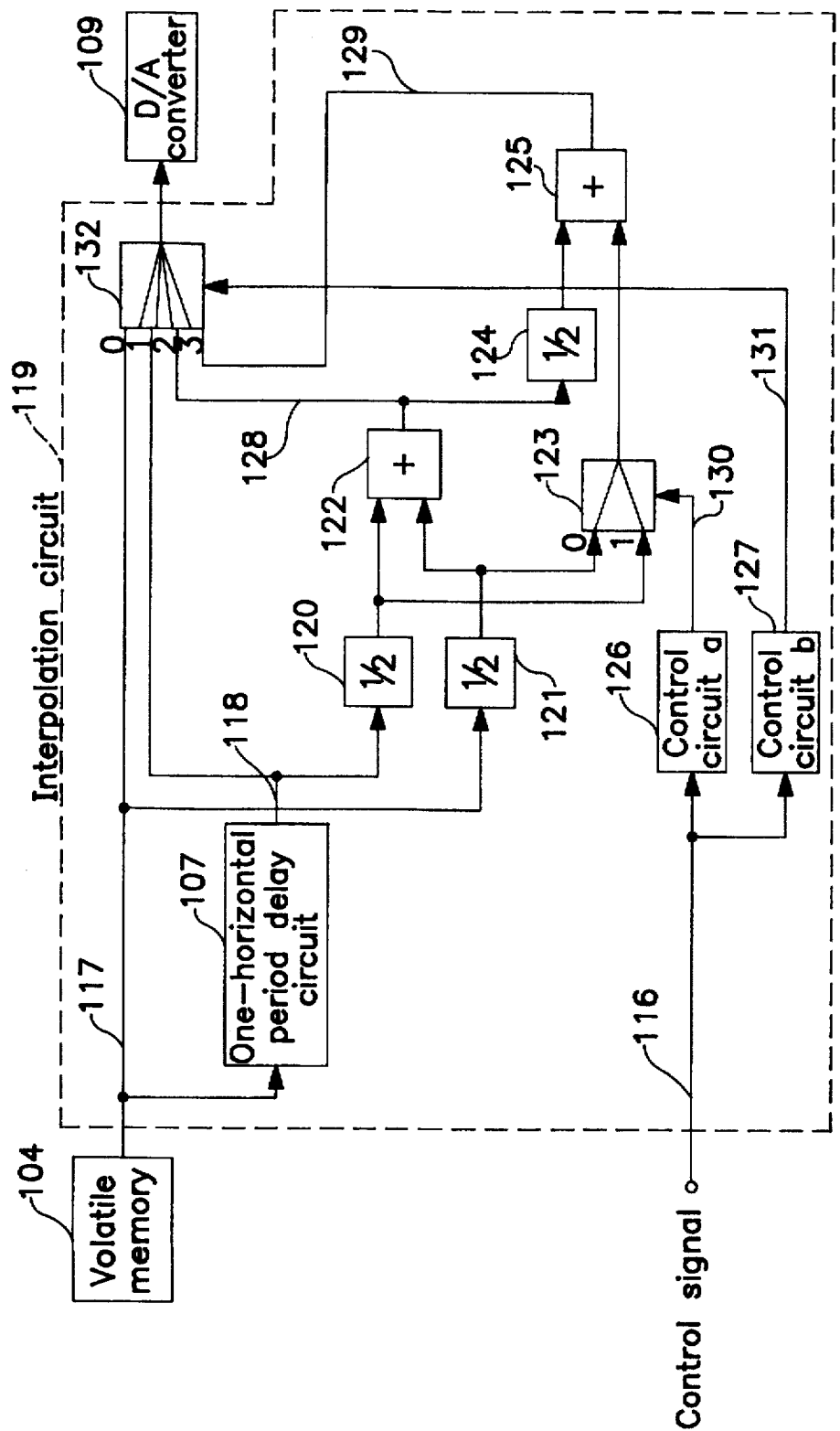
FIG. 9 is a block diagram of an interpolation circuit of the digital convergence apparatus in embodiment 4 of the invention.

In FIG. 9, reference numeral 120, 121, and 124 are bit shift circuits for converting the value of digital convergence correction data into ½ value, 122 and 125 are adders, 126 is a control circuit a controlled by the output control signal 116 of the scanning line count detector 1, 127 is a control circuit b similarly controlled by the control output signal 116 of the scanning line count detector 101, 123 is a multiplexer controlled by the control circuit a 126, and 132 is a multiplexer controlled by the control circuit b 127.

Suppose the maximum number of corresponding scanning lines limited by the memory capacity of the volatile memory 104 of the digital convergence apparatus of the embodiment to be 500. At this time, assuming that a video signal source with 480 scanning lines is entered from outside, the operation is described below.

First, in the scanning line count detector 101, the number of scanning lines of the video signal source from outside is detected to be 480 lines. Hence, memory capacity of volatile memory 500 lines>480 lines it is known that all scanning lines can be handled by the memory capacity of the volatile memory 104. As a result, by the control signal 116 produced from the scanning line count detector 101, the control circuit b 127 in the interpolating circuit 119 is controlled, and the control output 131 of the control circuit b 127 is the digital convergence correction data 117 of the volatile memory 104 in which always the output of the multiplexer 132 is stored, and the digital convergence correction data of 480 lines stored in the volatile memory 104 is directly put into the D/A converter 109 and converted into analog quantity.

Next, supposing a video signal source with 960 scanning lines is entered, the operation is described below.

In the scanning line count detector 101, it is detected that the number of scanning lines of the external video signal source is 960 lines. Hence, memory capacity of volatile memory 500 lines < 960 lines memory capacity of volatile memory 500 lines > 960 lines/2 and all scanning lines can be handled if the memory capacity of the volatile memory 104 is twice as much.

Figure 10:
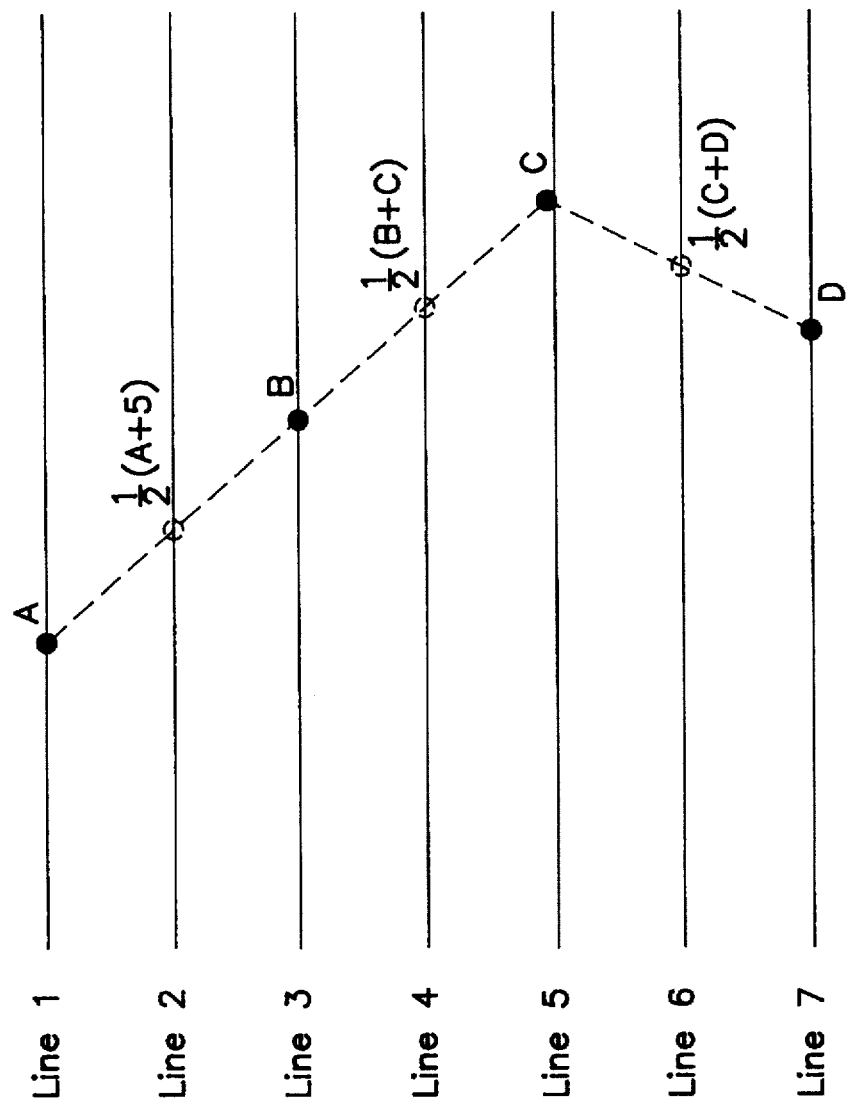
FIG. 10 is a digital convergence correction data correspondence diagram on a screen in one-line interpolation of the digital convergence apparatus in embodiment 4 of the invention.

That is, as shown in FIG. 10, assuming the digital convergence correction data in the vertical direction stored presently in the volatile memory 104 to be

A, B, C, by feeding the digital convergence correction data (A+B)/2, (B+C)/2, between the digital convergence correction data in real time into the D/A converter 109 without increasing the memory capacity, it is possible to compensate for the shortage of the memory capacity of the volatile memory 104. As shown in FIG. 9, the input of the multiplexer 132 is the digital convergence correction data 117 stored in the volatile memory 104, the output 118 of the one-horizontal period delay circuit 107 delayed by one horizontal period from the input of the digital convergence correction data stored in the volatile memory 104, and the output 128 of the adder 122 receiving the outputs of the bit shift circuit 121 converted to ½ value of the digital convergence correction data value 117 stored in the volatile memory 104 and the bit shift circuit 120 converted to ½ value of the output data value 118 of the one-horizontal period delay circuit 107.

Figure 12:
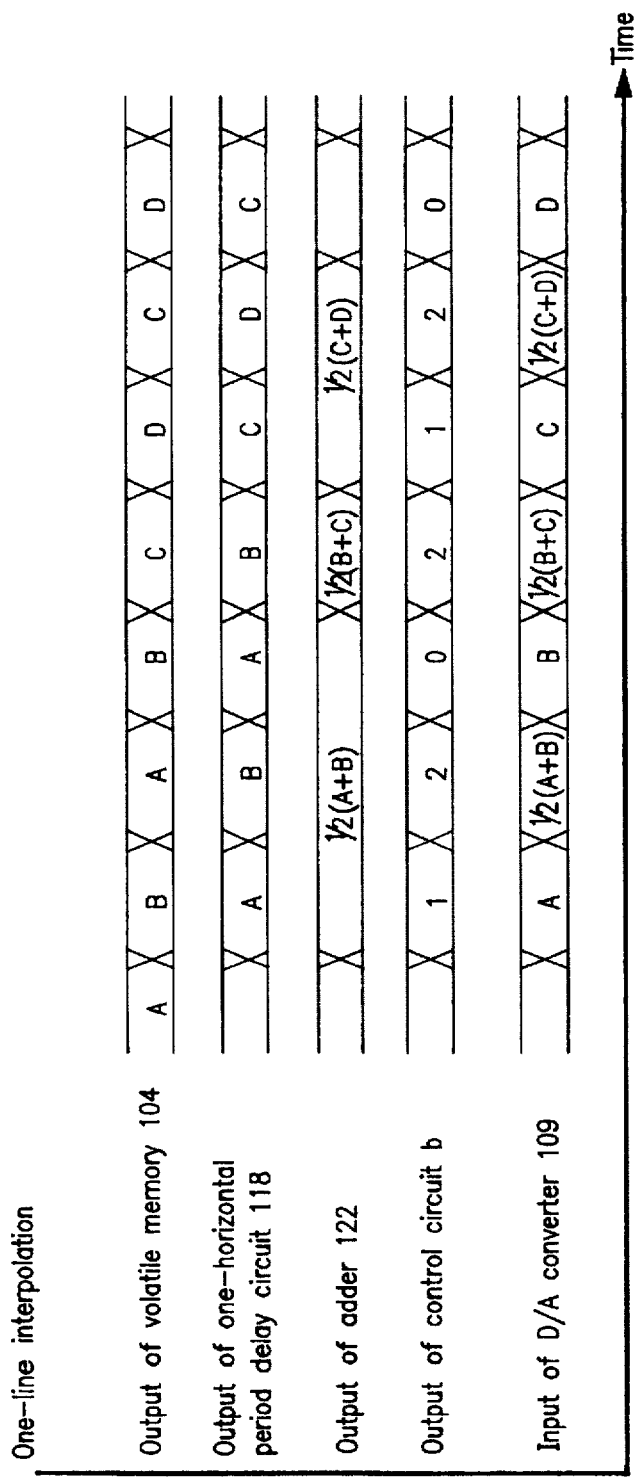
FIG. 12 is an operation explanatory diagram of one-line interpolation of the digital convergence apparatus in embodiment 4 of the invention.

At this time, as shown in FIG. 12, by reading out the digital convergence correction data stored in the volatile memory 104 as

A, B, A, B, C, D, C, D, the output of the control circuit 127 in the interpolating circuit 119 is controlled by the control signal 116 produced from the scanning line count detector 101 as shown in FIG. 12, so that each digital convergence correction data fed in the multiplexer 182 is changed over and produced as follows:

A,(A+B)/2,B, (B+C)/2,C,

By putting the digital convergence correction data into the D/A converter 109, it is converted into analog quantity, and hence, as shown in FIG. 10, digital convergence correction smooth in the vertical direction is realized without increasing the memory capacity of the volatile memory 104.

Similarly, supposing a video signal source with 1280 scanning lines is entered, the operation is described below.

In the scanning line count detector 101, it is detected that the number of scanning lines of the external video signal source is 1280 lines. Hence, memory capacity of volatile memory 500 lines < 1280 lines memory capacity of volatile memory 500 lines < 1280 lines/2 memory capacity of volatile memory 500 lines > 1280 lines/4 and all scanning lines can be handled if the memory capacity of the volatile memory 104 is four times as much. Numerically, it is enough to handle with three times of the memory capacity, but for the simplicity of the circuit constitution of the interpolating circuit 119, it is necessary to compensate for the shortage of memory capacity of the volatile memory in 2n unit.

Figure 11:
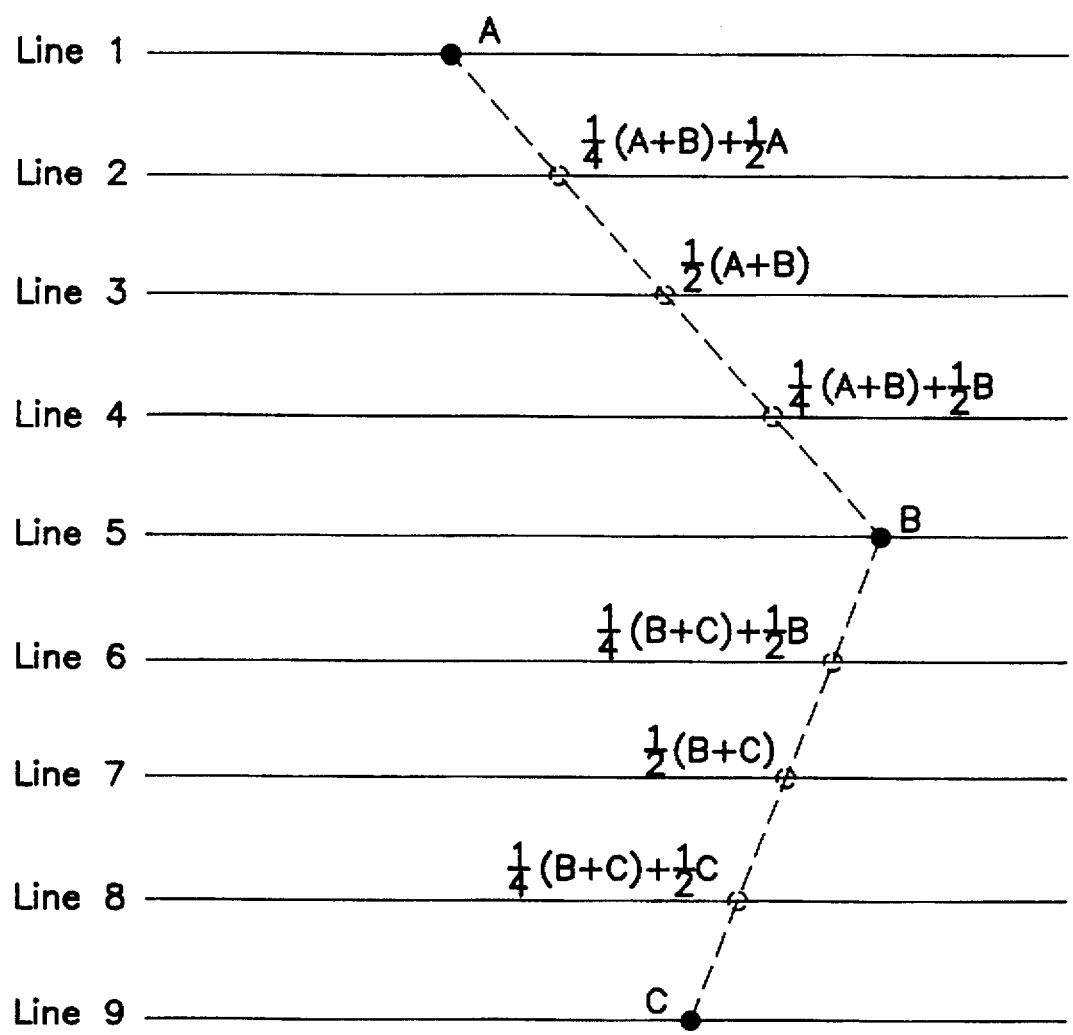
FIG. 11 is a digital convergence correction data correspondence diagram on a screen in three-line interpolation of the digital convergence apparatus in embodiment 4 of the invention.

Herein, as shown in FIG. 11, assuming the digital convergence correction data in the vertical direction stored presently in the volatile memory 104 to be

A, B, C, by feeding the digital convergence correction data (A+B)/4+½A,(A+B)/2,(A+B)/4+B/2, between the digital convergence correction data in real time into the D/A converter 109 without increasing the memory capacity, it is possible to compensate for the shortage of the memory capacity of the volatile memory 104. As shown in FIG. 9, the input of the multiplexer 132 is the digital convergence correction data 117 stored in the volatile memory 104, the output 118 of the one-horizontal period delay circuit 107 delayed by one horizontal period from the input of the digital convergence correction data stored in the volatile memory 104, the output 128 of the adder 122 receiving the outputs of the bit shift circuit 121 converted to ½ value of the digital convergence correction data value 117 stored in the volatile memory 104 and the bit shift circuit 120 converted to ½ value of the output data value 118 of the one-horizontal period delay circuit 107, and the output 129 of the adder 125 receiving the output of the multiplexer 123 changed over as shown in FIG. 13 by the output of the control circuit b 127 controlled by the control signal 116 produced from the scanning line count detector 101 from the outputs of the bit shift circuits 120 and 121 and the output of the bit shift circuit 124 converted to ½ value from the data value of the output 128 of the adder 122.

Figure 13:
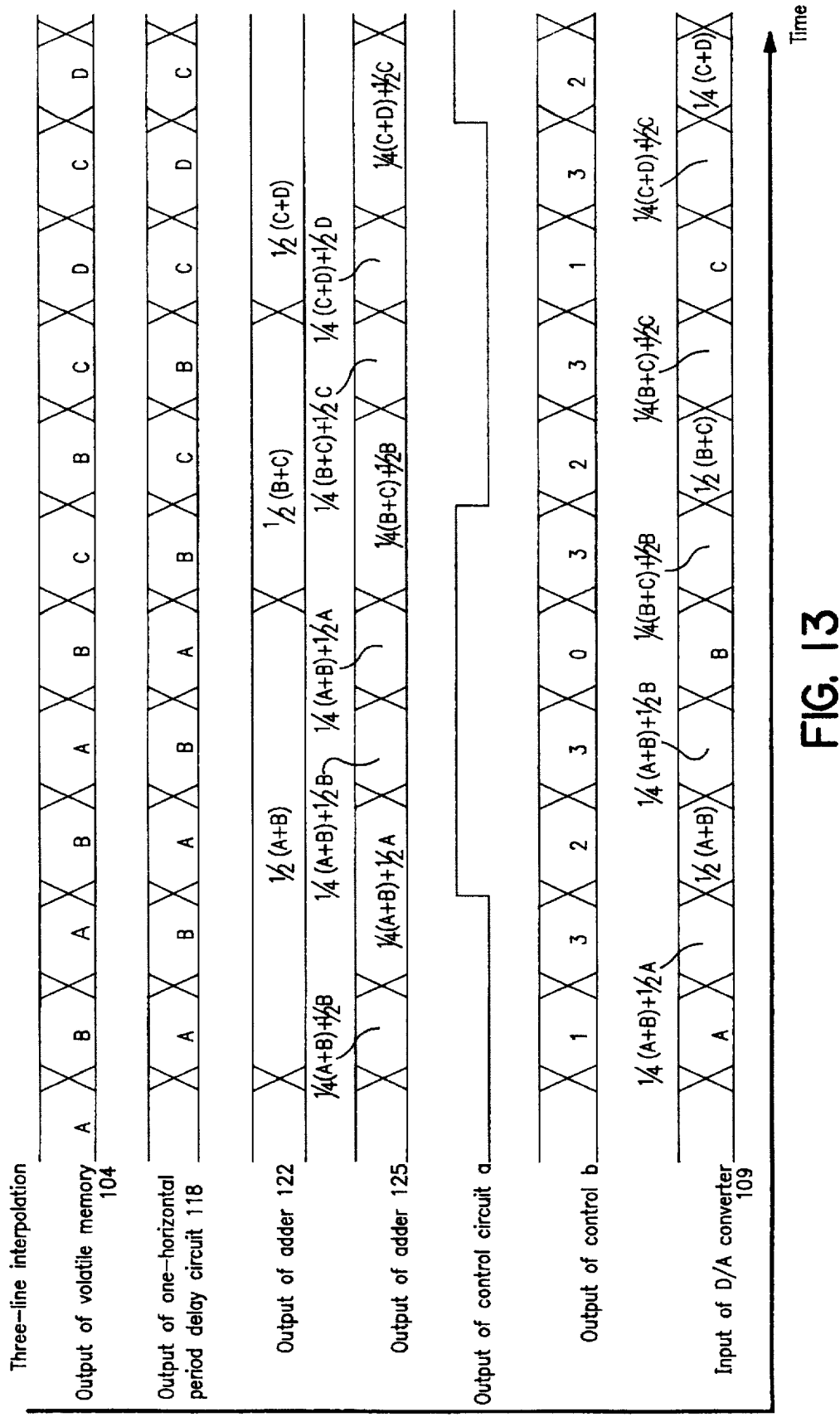
FIG. 13 is an operation explanatory diagram of three-line interpolation of the digital convergence apparatus in embodiment 4 of the invention.

At this time, as shown in FIG. 13, by reading out the digital convergence correction data stored in the volatile memory 104 as $A, B, A, B, A, B, C,$ the output of the control circuit b 127 in the interpolating circuit 119 is controlled by the control signal 116 produced from the scanning line count detector 101 as shown in FIG. 13, so that each digital convergence correction data fed in the multiplexer 132 is changed over and produced as follows:

$A, (A+B)/4+A/2, (A+B)/2, (A+B)/4+B/2, B$

By putting the digital convergence correction data into the D/A converter 109, it is converted into analog quantity, and hence, as shown in FIG. 11, digital convergence correction smooth in the vertical direction is realized without increasing the memory capacity of the volatile memory 104.

In this constitution of the invention, if a video signal source having a number of scanning lines more than the range handled by the memory capacity of the volatile memory 104 is entered from outside, it is possible to cope with by a simple circuit constitution. In this embodiment, the circuit operation is explained in the maximum number of corresponding scanning lines of the volatile memory 104 of up to four times, but same effects are obtained by similar circuit constitution in the case of 8 times or 16 times.

Figure 14:
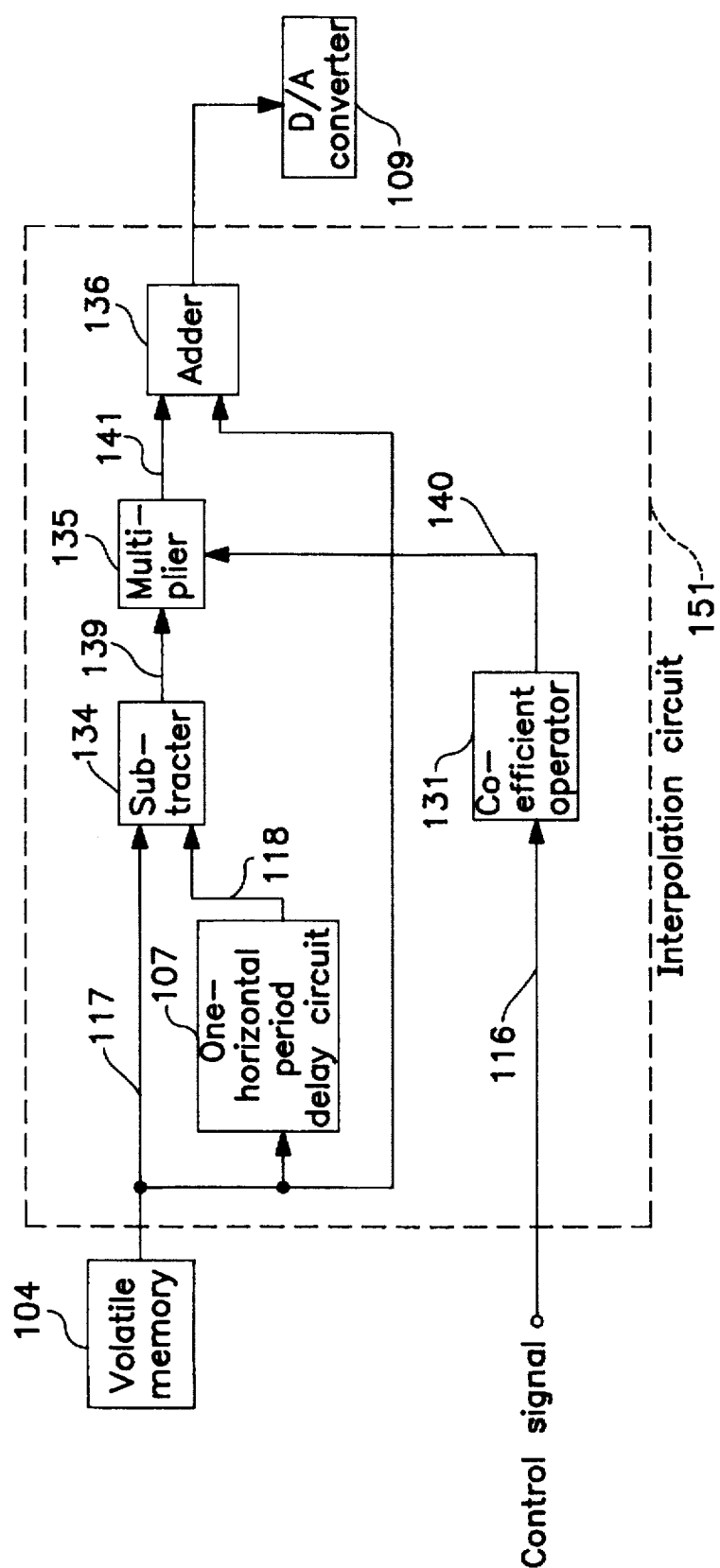
FIG. 14 is a block diagram of an interpolation circuit of a digital convergence apparatus in embodiment 5 of the invention.
Figure 15:
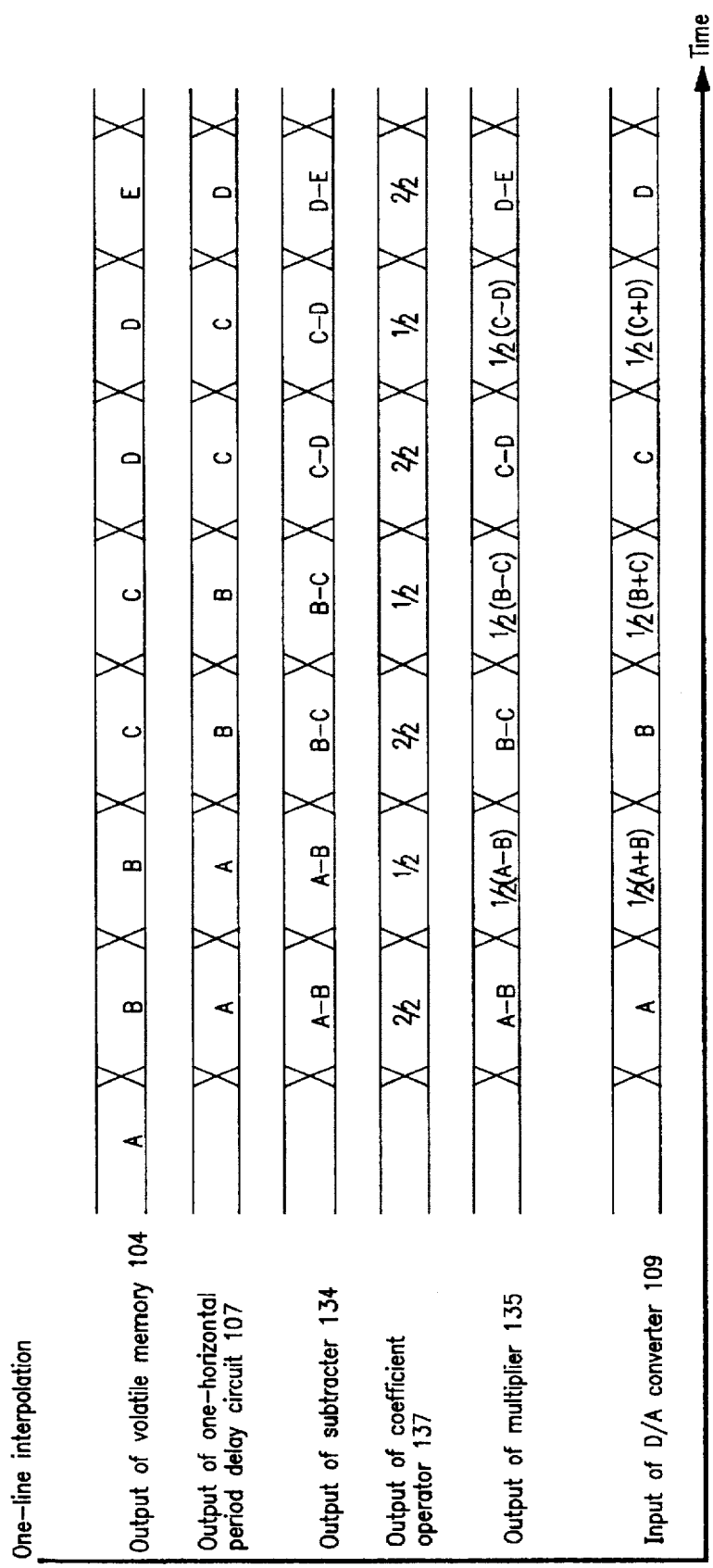
FIG. 15 is an operation explanatory diagram of one-line interpolation of the digital convergence apparatus in embodiment 5 of the invention.
Figure 16:
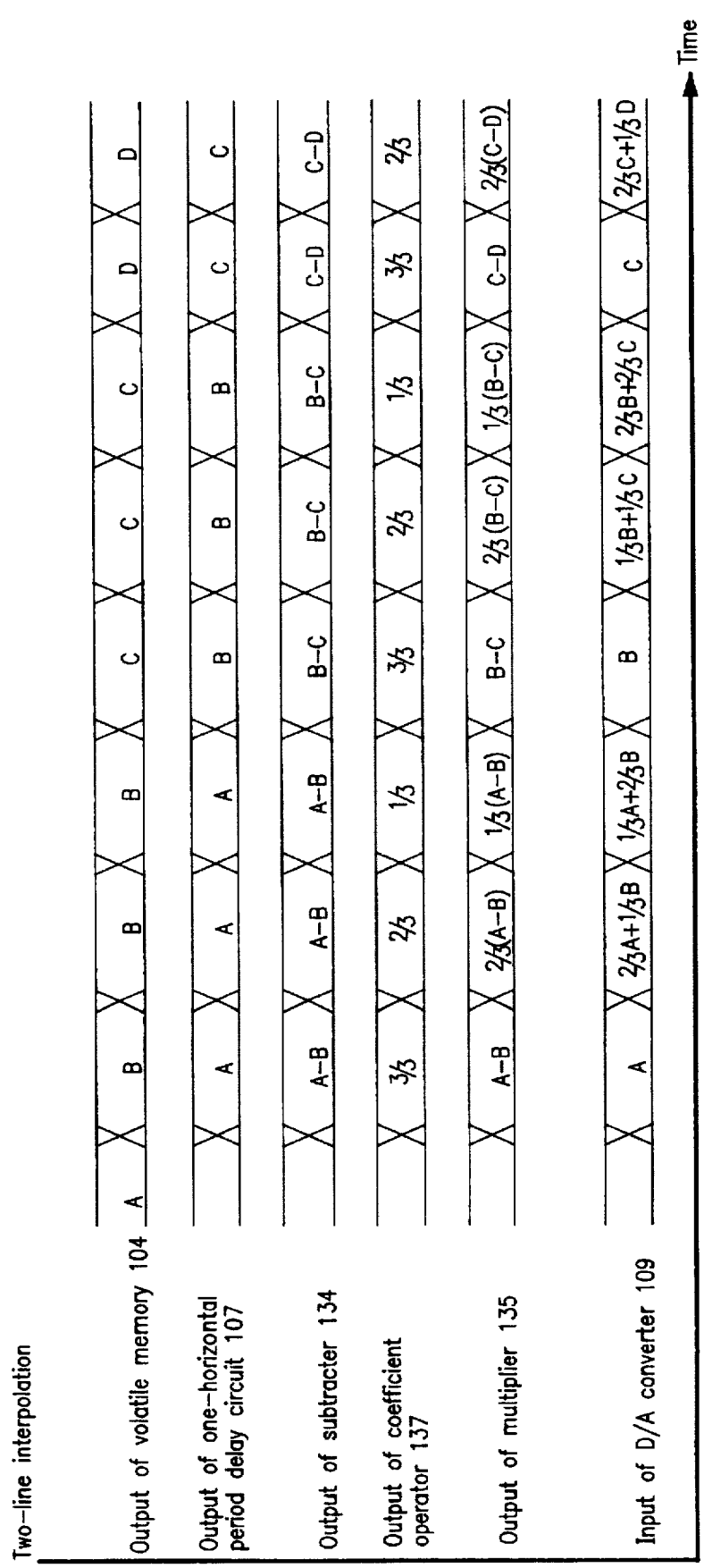
FIG. 16 is an operation explanatory diagram of two-line interpolation of the digital convergence apparatus in embodiment 5 of the invention.

(Embodiment 5):

A further different embodiment of the invention is described while referring to FIG. 14, FIG. 15, and FIG. 16.

In the same components as explained in the foregoing embodiments, same reference numerals are used and repeated explanations are omitted.

In embodiment 4, if a video signal source having a number of scanning lines larger than the maximum number of scanning lines that can be handled in the memory capacity of the volatile memory 104 is fed from outside, it is possible to compensate for the shortage of memory capacity of the volatile memory by issuing the correction data in the vertical direction of $(2^n-1)$ pieces into the D/A converter 109 between the digital convergence correction data in the real time by the interpolating circuit 119, to the digital convergence correction data stored in the volatile memory 104, but as the value of n increases, the number of pieces of interpolating data increases hugely, and smooth interpolating effect may not be obtained.

In this embodiment, accordingly, this problem is solved by using an interpolating circuit 151 as shown in FIG. 14. The interpolating circuit 151 corresponds to the interpolating circuit 119 mentioned in embodiment 4.

In FIG. 14, reference numeral 107 is one-horizontal period delay circuit, 134 is a subtracter, 135 is a multiplier, 136 is an adder, and 137 is a coefficient operator.

In the digital convergence apparatus of the invention, suppose the maximum number of corresponding scanning lines limited by the memory capacity of the volatile memory 104 is supposed to be 500. At this time, when a video signal source having 480 scanning lines is supplied from outside, the operation is described below.

First, in the scanning line count detector 101, it is detected that the number of scanning lines of the external video signal source is 480 lines. Hence, memory capacity of volatile memory 500 lines>480 lines and it is known that all scanning lines can be handled by the memory capacity of the volatile memory 104. Accordingly, by the control signal 116 issued from the scanning line count detector 101, the coefficient operator 137 in the interpolating circuit 151 is controlled, and 1 is issued from the output of the coefficient operator 137. Herein, supposing the digital convergence correction data in the vertical direction stored in the volatile memory 104 to be $A, B, C,$ the operation result output of the subtracter 184 receiving the output of the one-horizontal period delay circuit 107 delayed by one horizontal period from the digital convergence correction data 117 stored in the volatile memory 104, and the digital convergence correction data output 117 stored in the volatile memory 104 is as follows:

$A-B, B-C, C-D,$

The output 141 of the multiplier 135 receiving the output 139 of the subtracter and coefficient 1 as output of 140 of the coefficient operator 137 is as follows:

$(A - B) \times 1, (B - C) \times 1, (C - D) \times 1, \ldots$ $= A - B, B - C, C - D, \ldots$ so as to be identical with the output 139 of the subtracter 134. The output or the adder 136 receiving the output 141 of the multiplier 135 and the digital convergence correction data output 119 stored in the volatile memory 104 is $A - B + B, B - C + C, C - D + D, \ldots$ $= A, B, C, \ldots$ and the same output as the digital convergence correction data stored in the volatile memory 104 can be obtained from the adder 136, so that the digital convergence correction data stored in the volatile memory 104 is directly put into the D/A converter 109 and converted into analog quantity.

Next, supposing a video signal source with 960 scanning lines is entered, the operation is described below.

In the scanning line count detector 101, it is detected that the number of scanning lines of the external video signal source is 960 lines. Hence, memory capacity of volatile memory 500 lines < 960 lines memory capacity of volatile memory 500 lines > 960 lines/2 and all scanning lines can be handled if the memory capacity of the volatile memory 104 is twice as much. That is, as shown in FIG. 10, assuming the digital convergence correction data in the vertical direction stored presently in the volatile memory 104 to be $A, B, C,$ by feeding the digital convergence correction data $(A+B)/2, (B+C)/2,$ between the digital convergence correction data in real time into the D/A converter 109 without increasing the memory capacity, it is possible to compensate for the shortage of the memory capacity of the volatile memory 104. As shown in FIG. 15, by controlling the coefficient operator 137 in the interpolating circuit 151 by the control signal 116 issued from the scanning line count detector 101, the output 140 of the coefficient operator 137 is synchronized with the digital convergence correction data stored in the volatile memory 104 as follows:

$1, \frac{1}{2}, 1, \frac{1}{2},$

Herein, assuming the digital convergence correction data in the vertical direction stored in the volatile memory 104 to be

A, B, C, and the digital convergence correction data stored in the volatile memory 104 is readout as

A, A, B, B, C, C, as shown in FIG. 15. The operation result output of the subtracter 134 receiving the output 118 of the one-horizontal period delay circuit 107 delayed by one horizontal period from the digital convergence correction data 117 stored in the volatile memory 104 thus being read out, and the digital convergence correction data output 117 stored in the volatile memory 104 is as follows:

A–B, A–B, B–C, B–C, C–D,

The output 141 of the multiplier 185 receiving this output 189 of the subtracter and the coefficient 1 or ½ of the output 140 of the coefficient operator 137 is as follows:

A–B,(A–B)/2,B–C,(B–C)/2,

Hence, the output of the adder 136 receiving the output 141 of the multiplier 13, and the digital convergence correction data output 117 stored in the volatile memory 104 is as follows:

A–B+B,(A–B)/2+B, B–C+C,

=A, (A+B)/2,B, and by putting this digital convergence correction operation data into the D/A converter 109, it is converted into analog quantity. Hence, as shown in FIG. 10, digital convergence correction smooth in the vertical direction is realized without increasing the memory capacity of the volatile memory 104.

Similarly, supposing a video signal source with 1280 scanning lines is entered, the operation is described below.

In the scanning line count detector 101, it is detected that the number of scanning lines of the external video signal source is 1280 lines. Hence, memory capacity of volatile memory 500 lines < 1280 lines memory capacity of volatile memory 500 lines < 1280 lines/2 memory capacity of volatile memory 500 lines > 1280 lines/3 and all scanning lines can be handled if the memory capacity of the volatile memory 104 is three times as much. Herein, assuming the digital convergence correction data in the vertical direction stored presently in the volatile memory 104 to be

A, B, C, by feeding the digital convergence interpolation operation data (A+B)/3+A/3,(A+B)/3+B/3, between the digital convergence correction data in real time into the D/A converter without increasing the memory capacity, it is possible to compensate for the shortage of the memory capacity of the volatile memory 104. As shown in FIG. 9, the coefficient operator 137 in the interpolating circuit 151 is controlled by the control signal 116 issued from the scanning line count detector 101, and the output 140 of the coefficient operator 137 is synchronized with the digital convergence correction data stored in the volatile memory 104 as follows:

1, ⅔, ⅓, 1, ⅔, ⅓,

Herein, assuming the digital convergence correction data in the vertical direction stored in the volatile memory 104 to be

A, B, C, and the digital convergence correction data stored in the volatile memory is readout as

A, A, A, B, B, B, C, C, as shown in FIG. 16. The operation result output of the subtracter 134 receiving the output 118 of the one-horizontal period delay circuit 107 delayed by one horizontal period from the digital convergence correction data 117 stored in the volatile memory 104 thus being read out, and the digital convergence correction data output 117 stored in the volatile memory 104 is as follows:

A–B, A–B, A–B, B–C, B–C, B–C, C–D,

The output 141 of the multiplier 135 receiving this output 139 of the subtracter and the coefficient 1 or ⅔, ⅓ of the output 140 of the coefficient operator 137 is as follows:

A–B,(A–B)×⅔,(A–B)/3,B=C,

Hence, the output of the adder 136 receiving the output 141 of the multiplier 135, and the digital convergence correction data output 117 stored in the volatile memory 104 is as follows:

A – B + B, (A – B) × 2/3 + B, (A – B)/3 + B, B – C + C, . . .

= A, A × 2/3 + B/3, A/3 + B × 2/3, B, . . .

and by putting this digital convergence correction operation data into the D/A converter 109, it is converted into analog quantity. Hence, digital convergence correction smooth in the vertical direction is realized without increasing the memory capacity of the volatile memory 104.

In this constitution of the invention, if a video signal source having a number of scanning lines more than the range handled by the memory capacity of the volatile memory 104 is entered from outside, it is possible to handle. Or, in the constitution of the digital convergence apparatus as in embodiment 4, if a video signal source having a far greater number of scanning lines than the number of scanning lines handled by the memory capacity of the volatile memory 104 is entered from outside, the problem of failure in obtaining smooth digital convergence interpolation operation result due to huge increase in the number of digital convergence interpolation operation data quantity interpolated in the vertical direction to 2n times can be easily solved by the constitution of the invention. In this embodiment, meanwhile, the circuit operation is explained in the maximum number of corresponding scanning lines of the volatile memory 104 of up to three times, but same effects are obtained by similar circuit constitution in the case of four or five times.

(Embodiment 6)

A still other embodiment of the invention is described below by referring to FIG. 17 and FIGS. 18a and 18b.

In the same components as explained in the foregoing embodiments, same reference numerals are used and repeated explanations are omitted.

In embodiment 4, if a video signal source having a number of scanning lines larger than the maximum number of scanning lines that can be handled in the memory capacity of the volatile memory 104 is fed from outside, it is possible to compensate for the shortage of memory capacity of the volatile memory 104 by issuing ($2^n-1$) pieces of digital convergence correction data into the D/A converter 109 in real time in the vertical direction in the interpolating circuit 119 by feeding the digital convergence correction data stored in the volatile memory 104, but, as shown in FIG. 18 (a), for example, by linearly interpolating the digital convergence correction data, discontinuous point of digital convergence correction data as show in the periphery of data B in the diagram occurs, and smooth digital convergence correction data curve is not obtained. Such discontinuous point appears in the image expressed as coarse and dense scanning lines, that is, uneven brightness, which causes to lower the picture quality.

Figure 17:
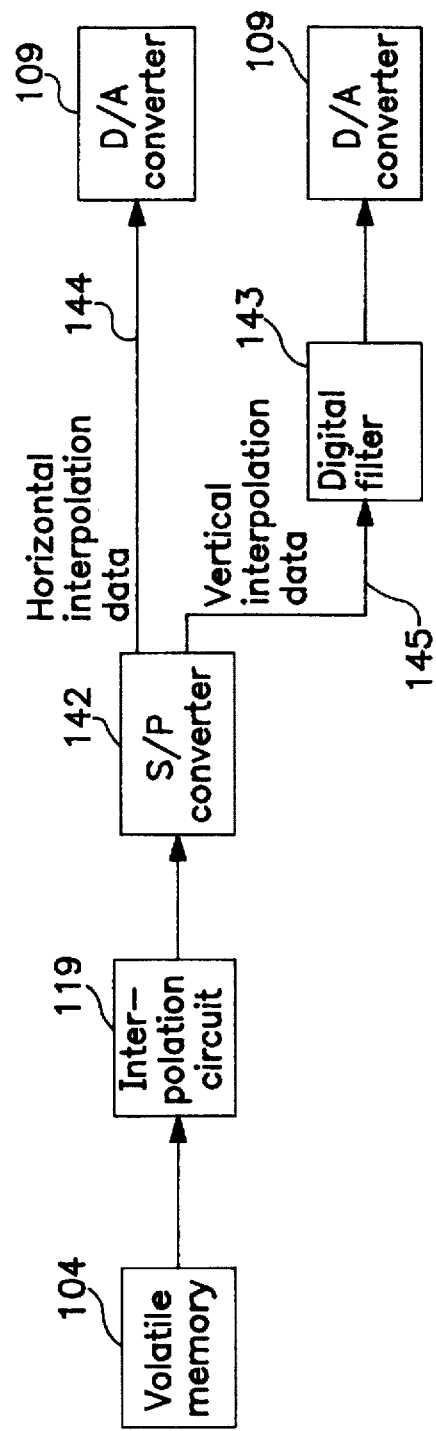
FIG. 17 is a block diagram of a digital convergence apparatus in embodiment 6 of the invention.
Figure 18A:
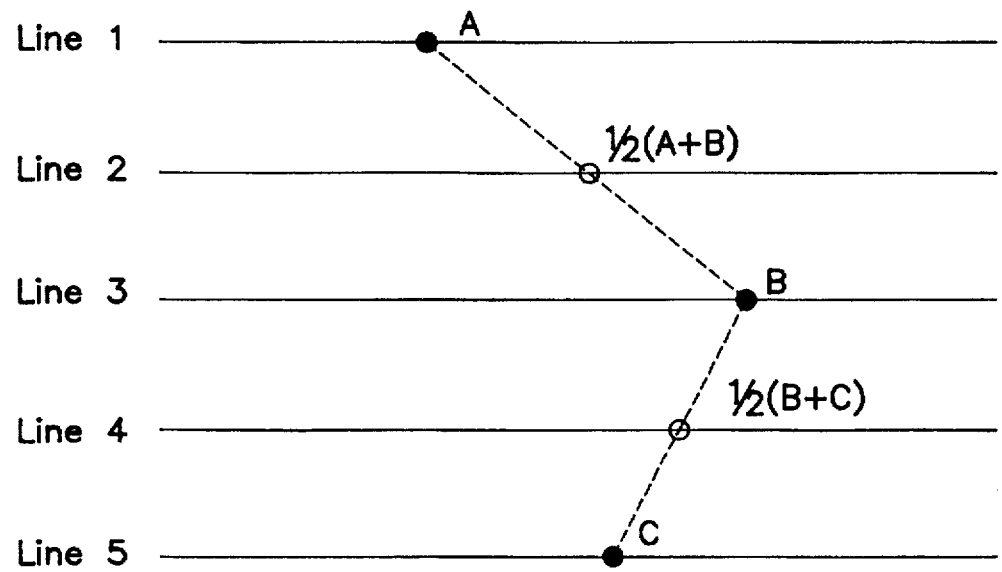
FIGS. 18a and 18b are operation explanatory diagram of the digital convergence apparatus in embodiment 6 of the invention.
Figure 18B:
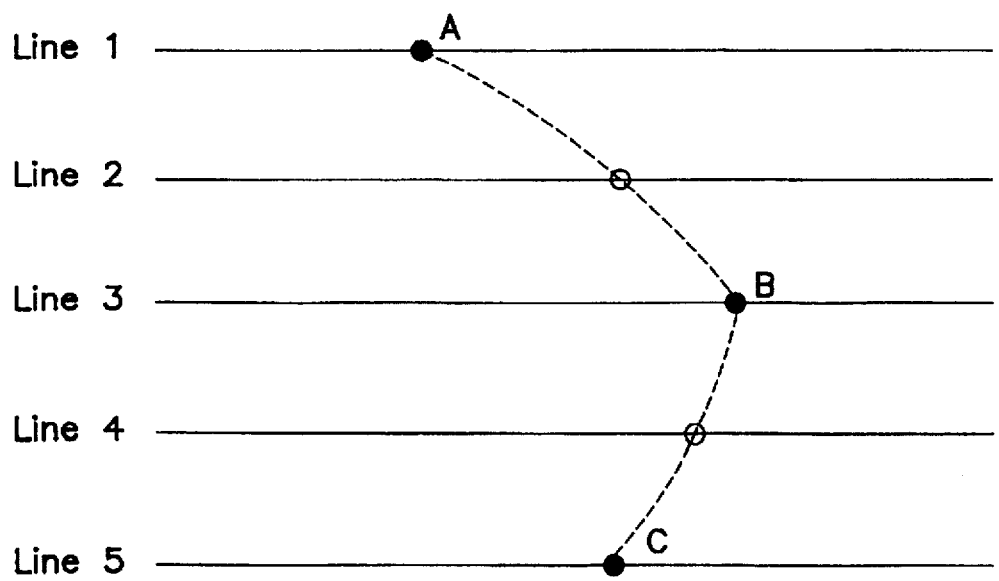

In the invention, such problem is solved by using a digital filter 143 as shown in FIG. 17.

In FIG. 17, reference numeral 142 is an S/P converter, and 143 is the digital filter. The circuit operation is described below.

In FIG. 17, the digital convergence correction data stored in the volatile memory 104 passes through the interpolating circuit 119, and is issued as digital convergence correction data corresponding to each scanning line. In an ordinary digital convergence apparatus, before putting the digital convergence correction data into the D/A converter 109 for converting into analog quantity, the digital convergence correction data is separated into six channels R, G, B three colors×(horizontal+vertical) in the S/P converter 142. Herein, only the digital convergence correction data in the vertical direction appearing as uneven brightness of scanning lines is filtered by the digital filter 143, so that the discontinuous point in the vertical direction of the digital convergence correction data as shown in embodiment 4 can be eliminated in the constitution of the embodiment as shown in FIG. 18 (b).

Incidentally, in FIG. 17, only the digital convergence correction data in the vertical direction is passed through the digital filter 143, which is because the degree of filter is completely difference between the vertical direction and horizontal direction, and the problem in the constitution of the invention is the discontinuous point of the digital convergence correction data in the vertical direction. Moreover, if attempted to pass the digital convergence correction data in the horizontal direction also through the digital filter, a high speed system clock is required, and it is very expensive. Besides, by using the digital filter 143 composed on the basis of the clock depending on the horizontal synchronizing frequency, if the external input horizontal synchronizing frequency varies, it is not necessary to change the degree of the filter, and the multiscan application is easy.

In the embodiment, meanwhile, only the digital convergence correction data output 145 in the vertical direction of the S/P converter 142 is passes through the digital filter 143 and put into the D/A converter 109, but, needless to say, same effects are obtained by passing the digital convergence correction data output 144 in the horizontal direction through the digital filter and putting into the D/A converter. (Embodiment 7)

A certain different embodiment of the invention is described below while referring to FIG. 19, FIG. 20, and FIG. 21.

Same components as in the foregoing embodiments are identified with same reference numerals and repeated explanations are omitted.

Figure 19:
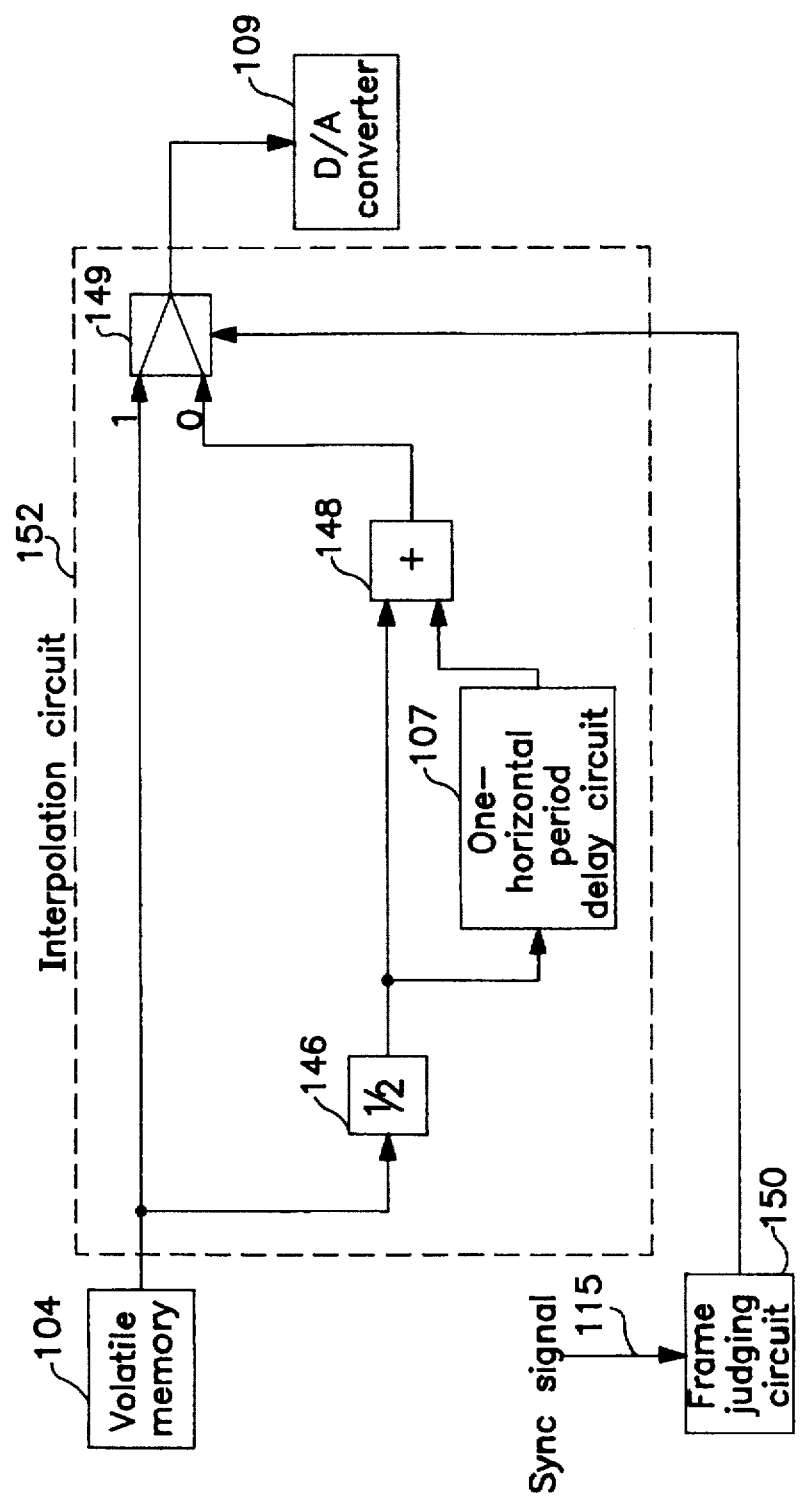
FIG. 19 is a block diagram of an interpolation circuit of a digital convergence apparatus in embodiment 7 of the invention.

In FIG. 19, reference numeral 146 is a bit shift circuit for changing the digital convergence correction data value stored in the volatile memory 104 into ½ data value, 107 is a one-horizontal period delay circuit, 148 is an adder, 149 is a multiplexer, and 150 is a frame judging circuit.

In thus constituted digital convergence apparatus, the operation is described below.

In the first place, when the video signal source entered from outside is sequential scanning, the video signal source connected to the apparatus is judged to be sequential scanning by the frame judging circuit 150 which receives a synchronizing signal 115 from outside. As a result, by the frame judging circuit 150, the output of the multiplexer 149 is controlled so as to directly issue the digital convergence correction data stored in the output memory 104. The output of the multiplexer 149 is put into the D/A converter 109, and the digital convergence correction data is converted into analog quantity. By this circuit operation, in the case of external video signal source being of sequential scanning, the digital convergence correction data stored in the volatile memory 104 is sequentially issued from the interpolating circuit 152 regardless of frame, so that digital convergence correction is easily realized as in prior art.

Figure 20:
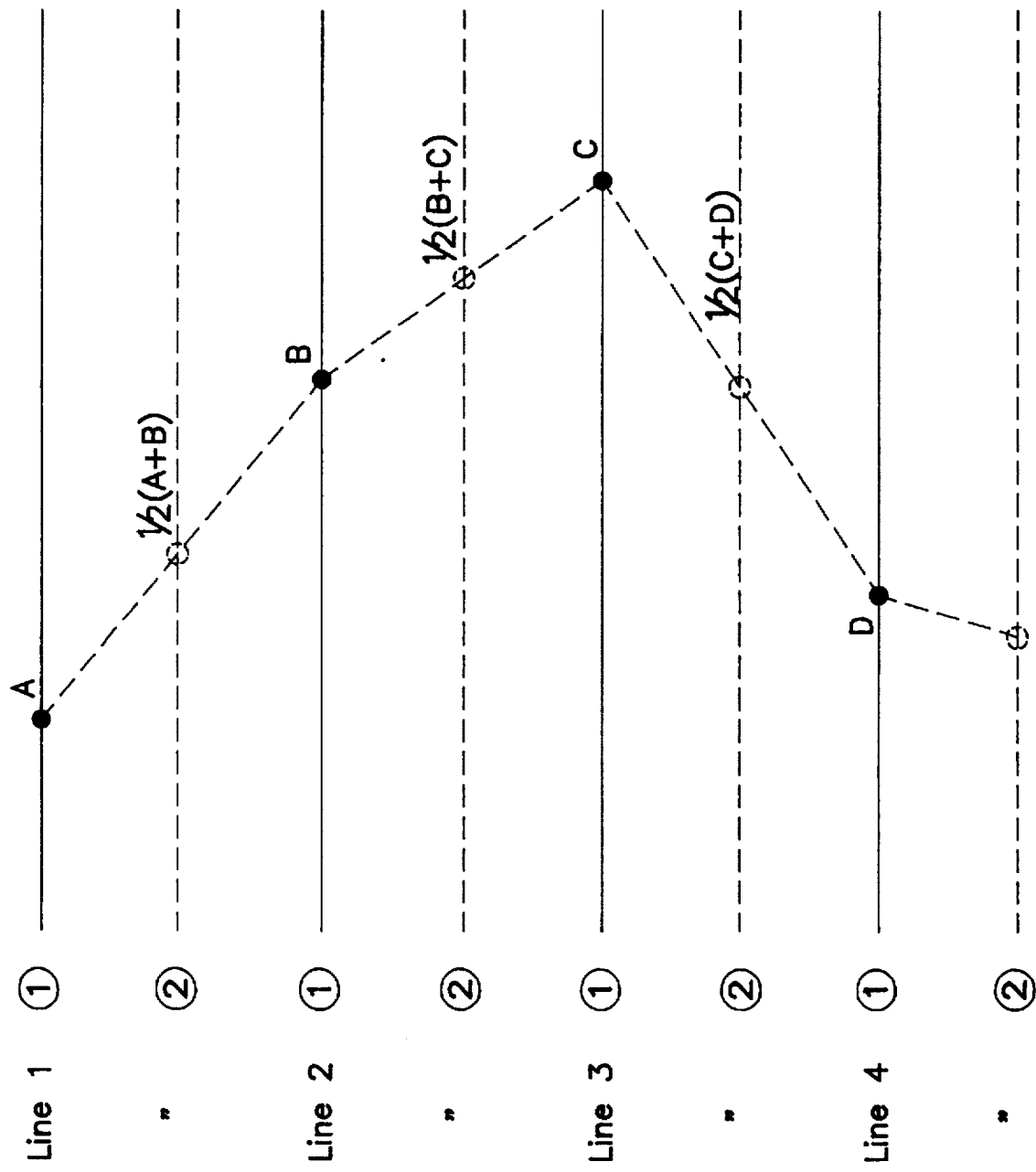
FIG. 20 is a digital convergence correction data correspondence diagram on a screen in interlaced scanning of the digital convergence apparatus in embodiment 7 of the invention.
Figure 21:
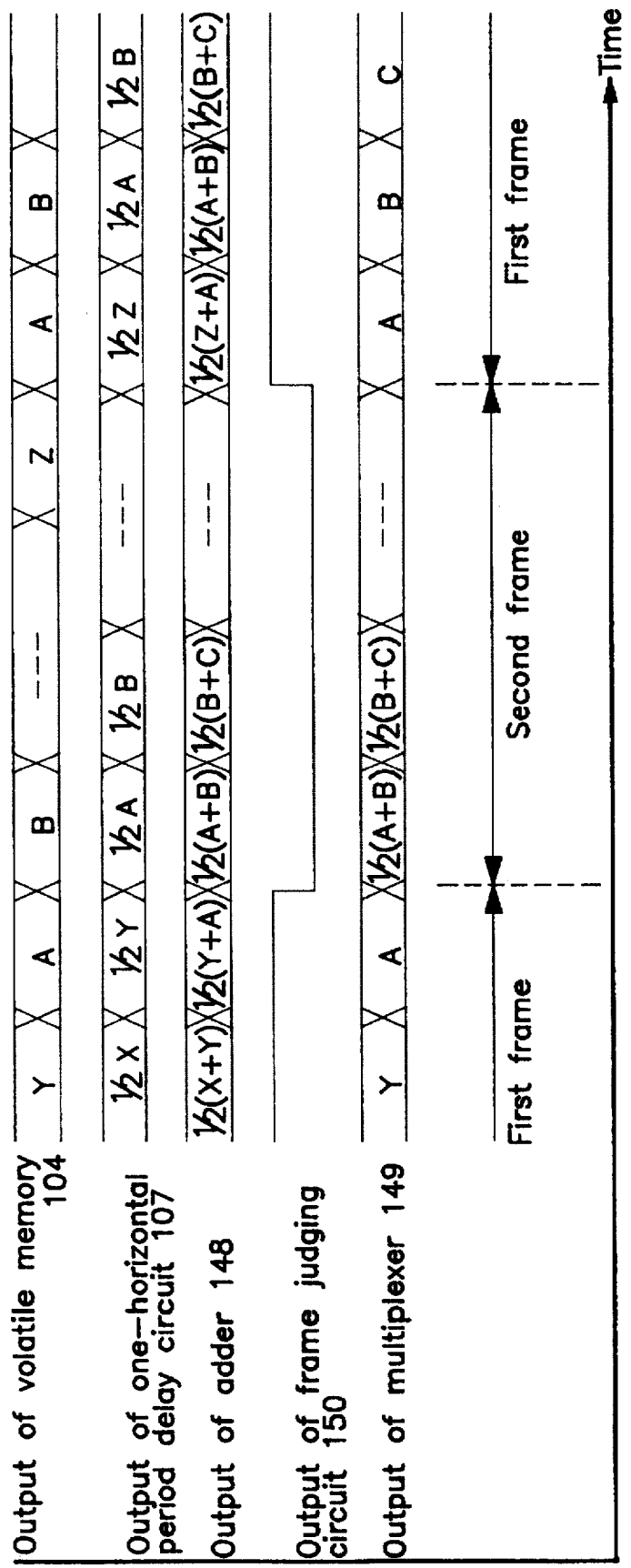
FIG. 21 is an operation explanatory diagram of the digital convergence apparatus in embodiment 7 of the invention.

Next, when the external input video signal source is interlaced scanning, by the frame judging circuit 150 receiving an external synchronizing signal 115, it is judged that the video signal source connected to the apparatus is interlaced scanning. Herein, the digital convergence correction data stored in the volatile memory 104, corresponding to a first frame of the video signal source of interlaced scanning is supposed to be $$A, B, C, \ldots, Z$$

as shown in FIG. 20. At this time, as in FIG. 20, if the digital convergence correction data corresponding to the second frame is $$(A+B)/2, (B+C)/2,$$

it is easily known that convergence correction smooth in the vertical direction of the image can be done. As shown in FIG. 21, the digital convergence correction data stored in the volatile memory 104 is put into one end of the multiplexer 149, and is also put into the bit shift circuit 146 for changing the digital convergence correction data value into ½ data. The output of the bit shift circuit 146 is put into one end of the adder 148, and is also put into the one-horizontal period delay circuit 107 for delaying the digital convergence correction data stored in the volatile memory 104 by one horizontal period, and its output is put into the other end of the adder 148. As a result, the output of the adder 148 can be issued as the digital convergence correction data $$(A+B)/2, (B+C)/2,$$

corresponding to the second frame as shown in FIG. 21, and such output of the adder 148 is put into the other end of the multiplexer 149. As a result, by changing over the output of the multiplexer 149 in every frame by the frame judging circuit 150, as shown in FIG. 20, even in the case of external video signal source being of interlaced scanning, smooth digital convergence correction can be done in the constitution of the invention without increasing the memory capacity of the volatile memory 104.

(Embodiment 8)

Another different embodiment of the invention is described below while referring to FIG. 22 and FIG. 23.

Then the video signal source entered from outside is sequential scanning, the operation is same as in the digital convergence apparatus constituted in embodiment 4, and explanation of this operation is omitted herein.

In the case of the external input video signal source being of interlaced scanning, in this constitution in embodiment 4, as shown in FIG. 21, the output of the multiplexer 149 must be, in principle,

A, B, C, ..., Y, Z in the first frame, but it is actually

A, B, C, ..., Y, A and at the final place of scanning line of the video signal source, the original digital convergence correction data Z is replaced by the first digital convergence correction data A of the scanning line. Usually, the last place of scanning line is blanking period on the screen, and it does not appear as convergence error on the screen. In the color receiver of CRT type, however, generally, the convergence correction data at the beginning position of scanning line and the convergence correction data at the ending position of scanning line tend to be symmetrical data. Accordingly, in the case of embodiment 7, a large convergence distortion may occur near the ending position of scanning line, and an excessive convergence distortion data is applied to the convergence correction circuit, and the power consumption increases.

According to the constitution of the invention, the problem of convergence correction data in the final scanning line that causes convergence distortion can be easily solved only by changing over the output of the multiplexer 153. This operation is described below.

Figure 22:
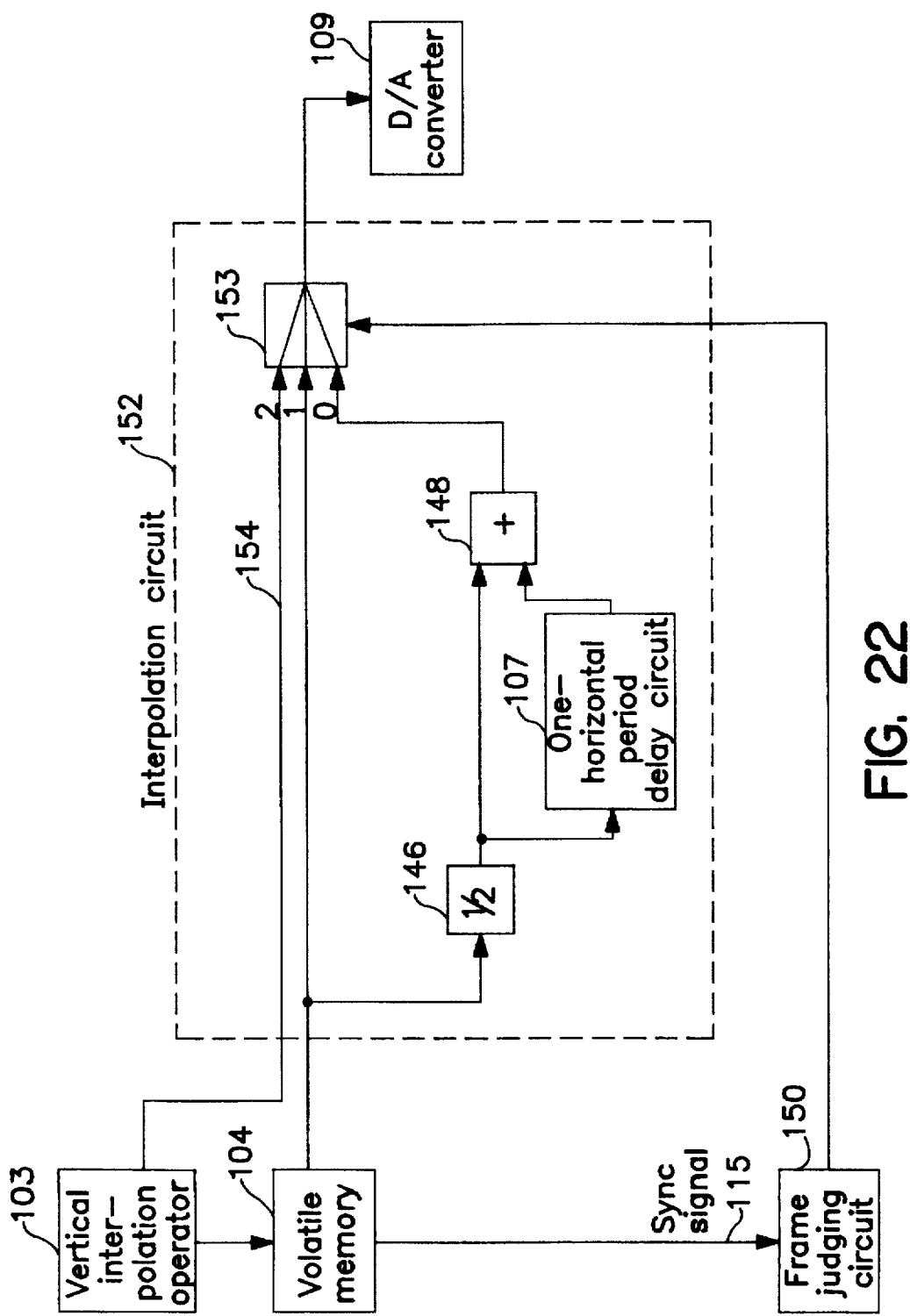
FIG. 22 is a block diagram of an interpolation circuit of a digital convergence apparatus in embodiment 8 of the invention.

In FIG. 22, in the multiplexer 153, as shown in embodiment 8, the digital convergence correction data stored in the volatile memory 104, and the output of the adder 148 for generating digital convergence correction data corresponding to the first frame through the one-horizontal period delay circuit 107 are applied, and further the digital convergence correction data 154 of the final scanning line which is a feature of the invention is applied.

Herein, the digital convergence correction data of final scanning line can be controlled by vertical interpolation operation, so that it may be always ready to be fed into the multiplexer 153.

Figure 23:
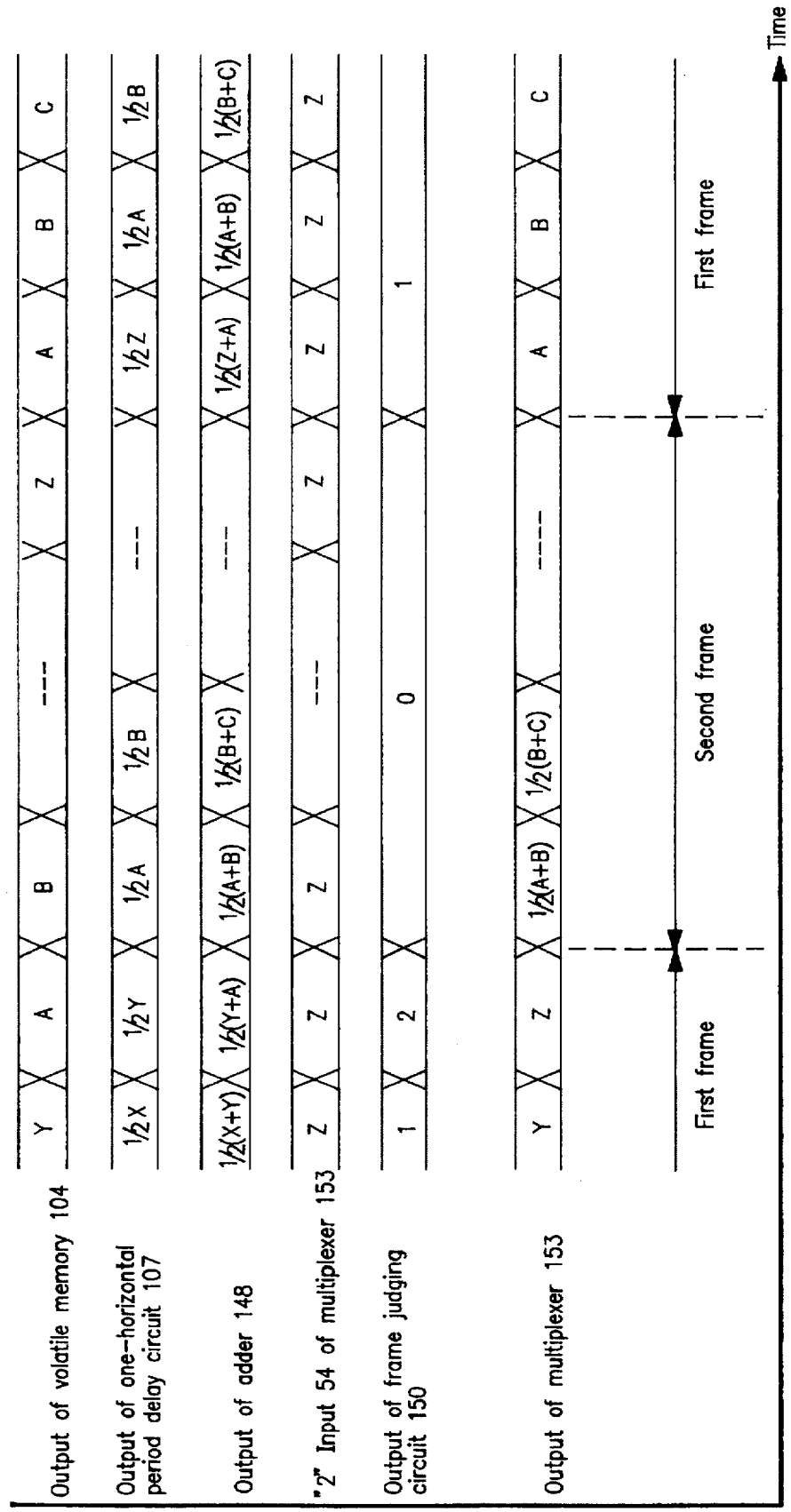
FIG. 23 is an operation explanatory diagram of the digital convergence apparatus in embodiment 8 of the invention.

Hence, as shown in FIG. 23, the output of the multiplexer 153 can be changed over in every frame by the frame judging circuit 150, and also the output

A, B, C, ..., Y, A of the digital convergence correction data in the first frame which was a problem in the constitution in embodiment 4 can be changed to

A, B, C, ..., Y, Z so that smoother convergence correction data than in the constitution in embodiment 4 may be obtained. Thus, according to the constitution of the invention, even in the case of the external video signal source being of interlaced scanning, smooth digital convergence correction is realized without increasing the memory capacity of the volatile memory 104, and also increase of power consumption of the convergence circuit due to distortion of digital convergence correction data can be suppressed at the same time.

(Embodiment 9)

An embodiment of the digital convergence apparatus as set forth in claim 17 Of the invention is described below by referring to a block diagram in FIG. 24.

Figure 40:
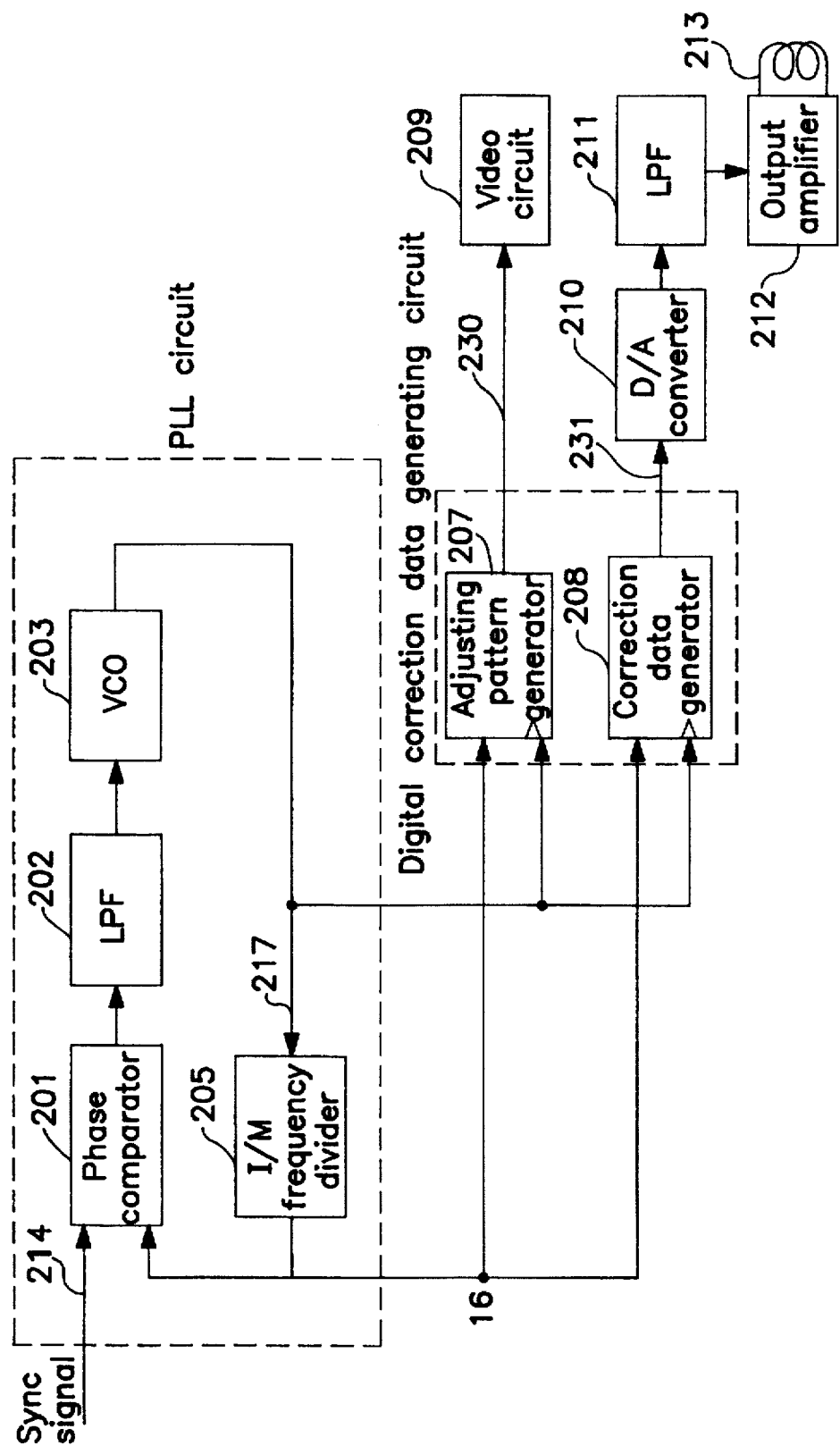
FIG. 40 is a block diagram of a digital convergence apparatus in prior art 5.

In advance, the prior art shown in FIG. 40 is described.

Reference numeral 201 is phase comparator, 202 is an LPF, 203 is a VCO, 205 is a 1/M frequency divider, 1 is a digital convergence correction data generator, 209 is a video circuit, 210 is a D/A converter, 211 is an LPF, 212 is an output amplifier, 213 is a convergence coil, and 214 is an input synchronizing signal. A block diagram of digital convergence correction data generator 1 is shown in FIG. 2. The synchronizing signal 16 included in the signal source S from outside in FIG. 2 is reproduced from the synchronizing signal 214 in FIG. 40, and is also a synchronizing signal synchronized with the deflection current period. Herein, calling it as reproduced synchronizing signal 16, FIG. 40 is described.

In this constitution conventional digital convergence apparatus, the operation is described below.

In FIG. 40 and FIG. 2, the input synchronizing signal 214 is applied to one end of the phase comparator 201, and the phase comparison result output of the phase comparator 201 is smoothed in the LPF 202, and the smoothed direct-current voltage is fed into the VCO 203. In the VCO 203, the input synchronizing signal 214 is multiplied by M times and a clock is oscillated. The clock multiplied by the VCO 203 is divided by the 1/M frequency divider 205, and the reproduced horizontal synchronizing signal 16 is put into other end of the phase comparator 201. Herein, M of the 1/M frequency divider 205 corresponds to the number of adjusting points in the horizontal direction. By the reproduced horizontal synchronizing signal 16 and reproduced clock 217, the read address controller 21 is controlled. Making use of the pulse from the read address controller 21, the cross hatch generator 31 is driven, and a cross hatch pattern is projected on the projection screen by the video circuit 209.

On the other hand, by the address key of the control panel 22, the cross point of the position requiring convergence correction (for example, point A in FIG. 3) is specified, and the position address is set in the write address controller 20.

Next, concerning the color desired to be corrected, for example, by the red data write key provided in the control panel 22, the correction amount is written into the frame memory 25 through the data reversible counter (up/down counter) 23 while observing the screen. Usually, it is changed over and controlled by the multiplexer 24 so that writing into the frame memory 25 may be done in the blanking period of video signal, so that reading of the frame memory 25 will not be lost. In this way, similar operation is done at each adjusting point.

Reading of the frame memory 25 is done on each adjusting point position on the screen by the read address controller 21, and through the register 26 driven by the read address controller 21, the correction amount is processed in the vertical scanning direction between adjusting points by the vertical adjusting point interval processor 30.

To correspond to various video signal sources, the adjusting point interval must be processed depending on each number of scanning lines. Accordingly, the synchronizing signal 16 is fed into the scanning line count detector 27, and the number of scanning lines per field is detected, and is applied to the adjusting point interval setter 28. In the adjusting point interval setter 28, from the number of scanning lines P per field and the number of adjusting points Q in the vertical direction, the number of scanning lines R in R=P (Q+1) adjusting points is determined, and is added to the coefficient operator 29. Moreover, the output of the adjusting point interval setter 28 is added to the write address controller 20 and read address controller 21, and the operation is changed over every R times.

When reading out data between adjusting points, the scanning line convergence correction data is prepared by vertical interpolation operation, but, alternatively, by operating the scanning line data of the entire screen by vertical interpolation preliminarily, all may be written into the frame memory, and data in the frame memory may be read out and corrected.

In this way, for various video signal sources, convergence correction independent in each adjusting point can be performed regardless of the number of scanning lines.

Figure 24:
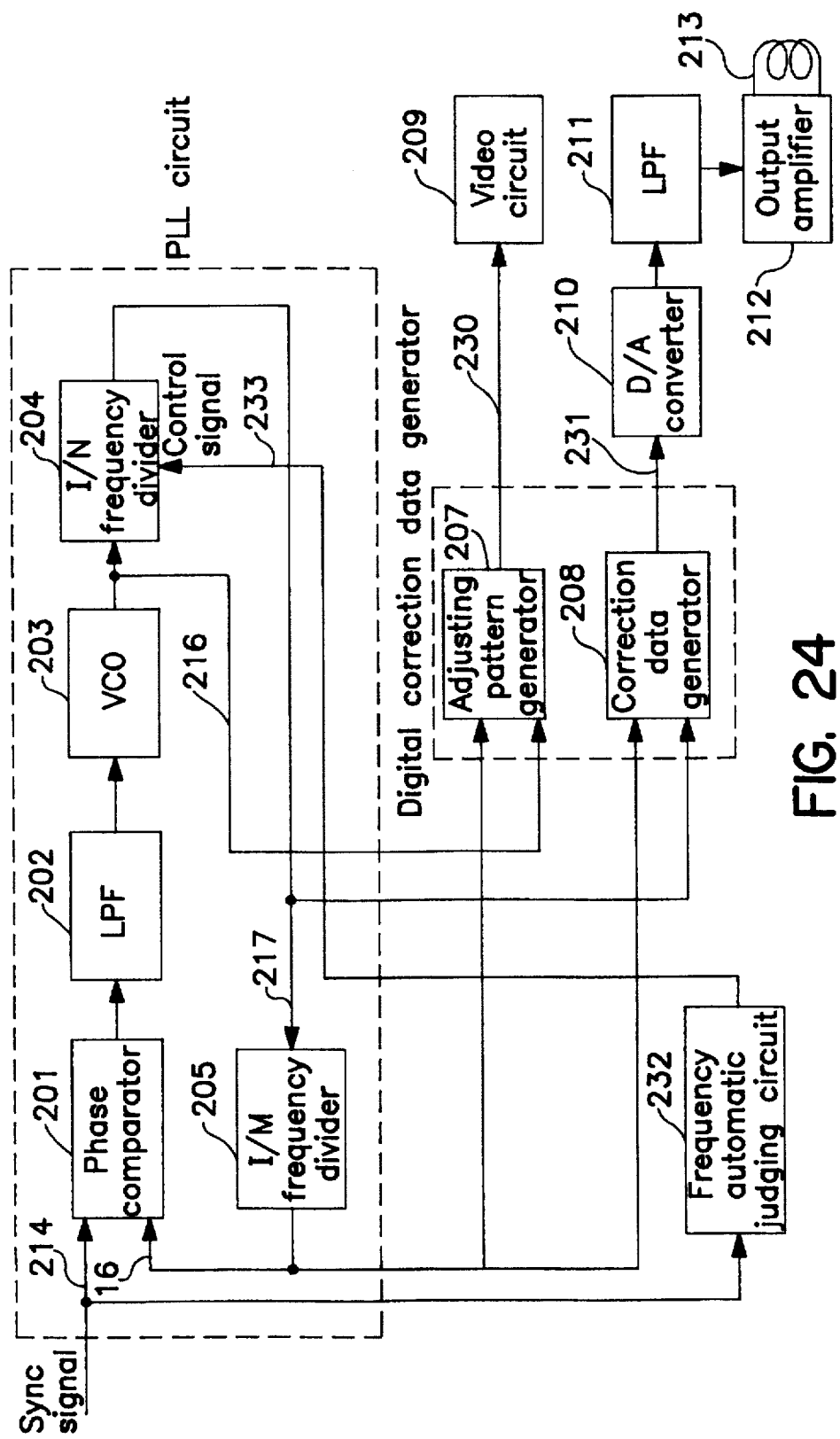
FIG. 24 is a block diagram of a digital convergence apparatus in embodiment 9 of the invention.

By contrast, the embodiment of the invention is shown in a block diagram of digital convergence apparatus in FIG. 24 which relates to claim 17 of the invention. In FIG. 24, reference numeral 282 is a frequency automatic detector, 201 is a phase comparator, 202 is a LPF, 203 is a VCO, 204 is a 1/N frequency divider, 205 is a 1/M frequency divider, 207 is a adjusting pattern generator, 209 is a video circuit, 208 is a correction data generator, 210 is a D/A converter, 211 is an LPF, 212 is an output amplifier, and 218 is a convergence coil. Besides, reference numeral 214 is a synchronizing signal synchronized with deflection current period, 16 is a reproduced synchronizing signal, 230 is an output of the adjusting pattern generator 207, and 231 is an output signal of the correction data generator 208.

Figure 25:
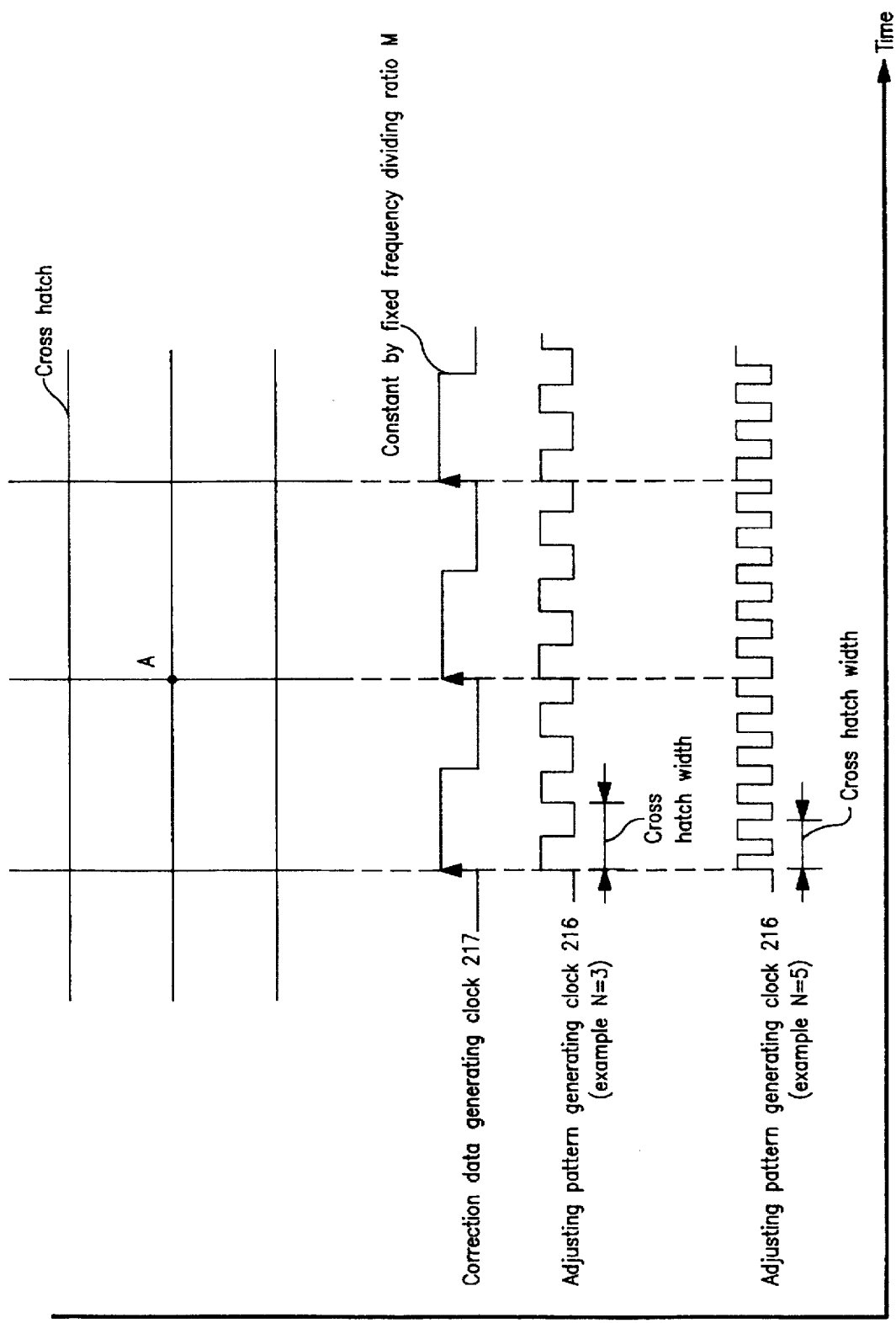
FIG. 25 is a phase relation diagram of signals in FIG. 24.

The operation of thus constituted invention is described below while referring to FIG. 24, FIG. 2, and FIG. 25.

In FIG. 24, the synchronizing signal 214 synchronized with the deflection current period, and the reproduced synchronized signal 16 which is an output signal of the 1/M frequency divider 205 are compared in phase by the phase comparator 201, and its output is put into the LPF 202, and the direct-current output smoothed in the LPF 202 is put into the VCO 203. The output clock oscillated in the VCO 203 is put into the 1/N frequency divider 204, and its divided output is put into the 1/M frequency divider, and its reproduced output of synchronizing signal 16 is fed back to the phase comparator 201, thereby composing a PLL circuit.

At this time, the dividing ratio M of the 1/M frequency divider 205 depends on the number of adjusting points in the horizontal direction, and by defining the dividing ratio M constant regardless of the synchronizing signal frequency of the signal source connected outside, it is possible to adjust without increasing the number of adjusting points if the synchronizing signal frequency of the signal source connected outside varies. On the other hand, the dividing ratio N of the 1/N frequency divider 204 is controlled by the frequency automatic detector 232, and as the set value is larger, an adjusting pattern of higher precision is generated, thereby leading to enhancement of precision of adjustment of convergence. Corresponding to the lattice point A of the adjusting pattern (cross hatch), an example of phase relation of clock waveforms 216 and 217 is shown in FIG. 25 (example: N=3, N=5). In this way, by fixing the dividing ratio M and varying only the dividing ratio N, the precision of adjusting pattern can be enhanced without increasing the number of adjusting points, and the precision of convergence adjustment can be enhanced. In multiscan application, moreover, by varying the dividing ratio N from outside depending on the synchronizing frequency of the signal source, the oscillation frequency of the VCO 203 can be always settled within a specific range, and the multiscan application may be realized easily without using the VCO having a wide range of oscillation frequency.

The synchronizing signal 16 reproduced in such PLL circuit is put into the adjusting pattern generator 7 and correction data generator 8. Herein, the clock for driving the adjusting pattern generator 207 makes use of the oscillation clock 216 of the VCO 203, and the clock for driving the correction data generator 208 makes use of the divided output 217 of the 1/N frequency divider 204. The operating principle of the adjusting pattern generator 207 and correction data generator 208 is explained in the digital correction data generator 1 of the prior art, and the duplicated explanation is omitted. In the digital correction data generator 1, however, the read address controller 21 and cross hatch generator 31 correspond to the adjusting pattern generator 207. The output signal 230 of the adjusting pattern generator 207 is put into the video circuit 209, and the adjusting pattern is produced at the time of convergence adjustment. On the other hand, the digital correction data output signal 231 of the correction data generator 208 is put into the D/A converter 210, and the output converted into analog correction amount is put into the LPF 211, and the analog correction waveform is smoothed, and its output is put into the output amplifier 212 and amplified. On the basis of the correction amount amplified herein, the convergence coil 218 is driven.

Thus, according to the embodiment, by composing the frequency divider in the PLL in two stages consisting of the 1/N frequency divider 204 and 1/M frequency divider 205, the precision of convergence adjustment is enhanced from the prior art.

(Embodiment 10)

Figure 26:
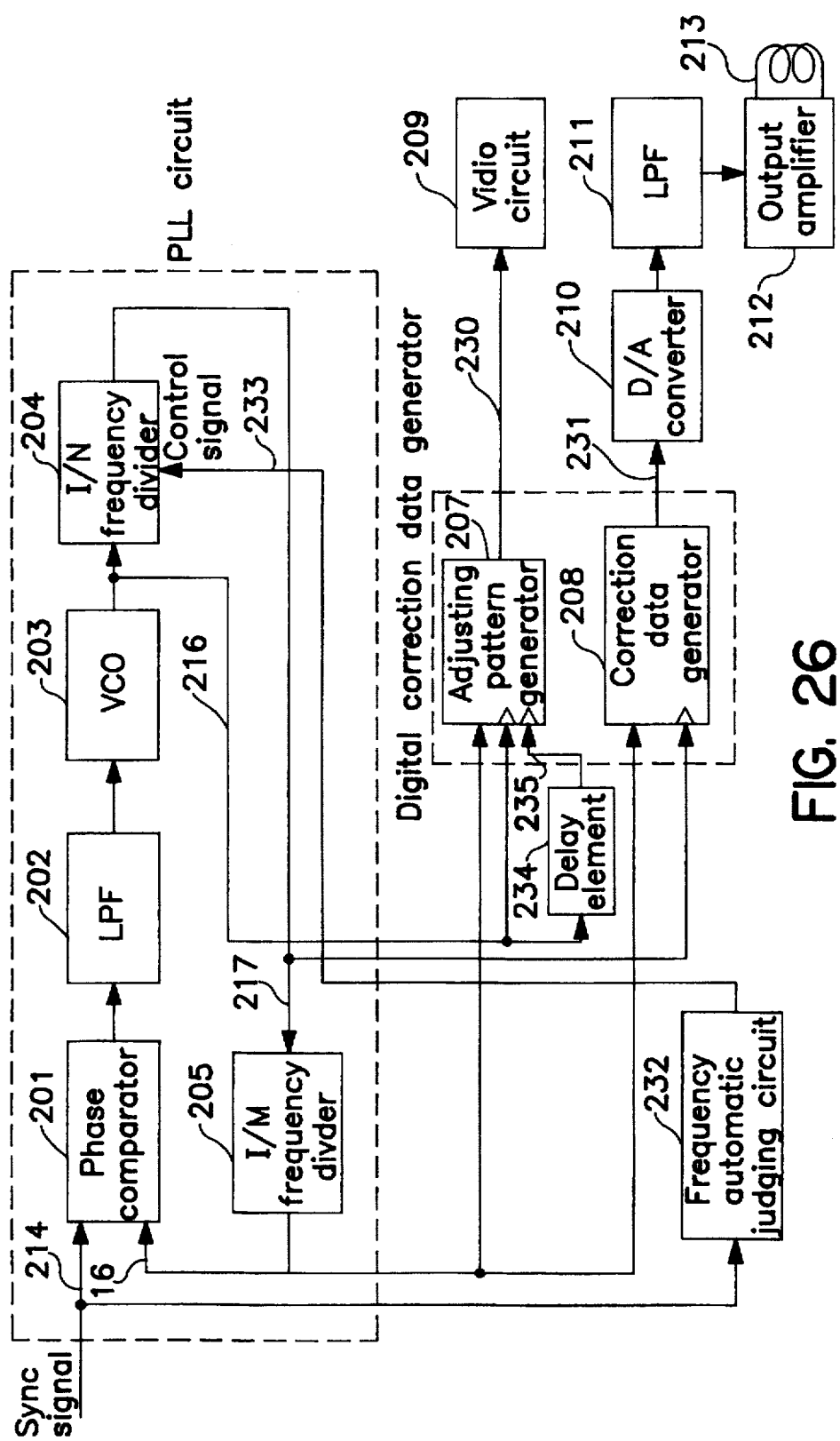
FIG. 26 is a block diagram of a digital convergence apparatus in embodiment 10 of the invention.

In FIG. 26 which is a block diagram of an embodiment of the digital convergence apparatus as set forth in claim 18, reference numeral 232 is a frequency automatic detector, 201 is a phase comparator, 202 is a LPF, 203 is a VCO, 204 is a 1/N frequency divider, 205 is a 1/M frequency divider, 234 is a delay element, 207 is a adjusting pattern generator, 209 is a video circuit, 208 is a correction data generator, 210 is a D/A converter, 211 is an LPF, 212 is an output amplifier, and 213 is a convergence coil. Besides, reference numeral 214 is a synchronizing signal synchronized with deflection current period, 16 is a reproduced synchronizing signal, 230 is an output of the adjusting pattern generator 207, 231 is an output signal of the correction data generator 208, and 235 is an output signal of the delay element.

Figure 27:
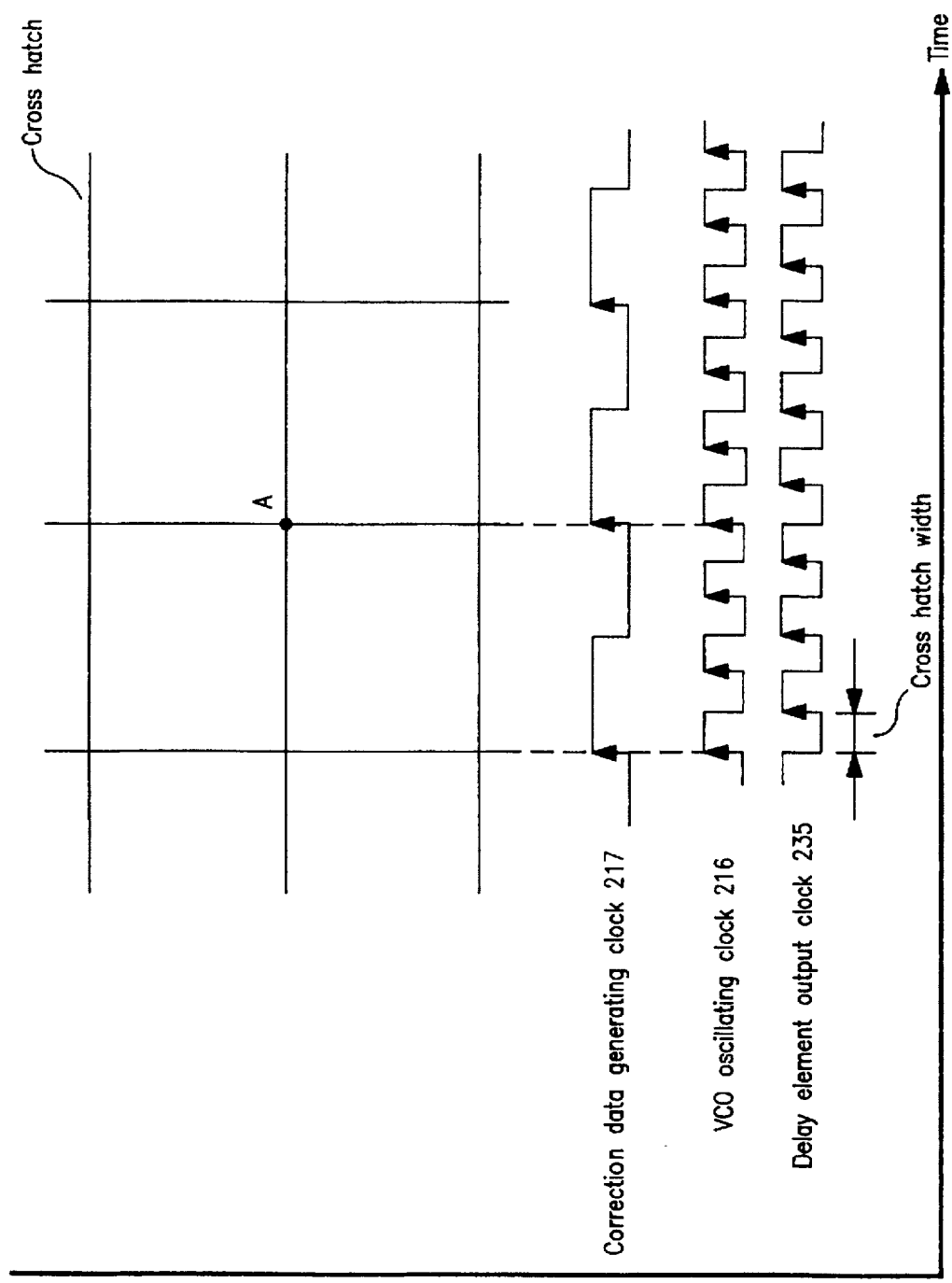
FIG. 27 is a phase relation diagram of signals in FIG. 26.

The operation of thus constituted invention is described below while referring to FIG. 26 and FIG. 27.

In FIG. 26, the synchronizing signal 214 synchronized with the deflection current period, and the output signal 16 of the 1/M frequency divider 205 are compared in phase by the phase comparator 201, and its output is put into the LPF 202, and the direct-current output smoothed in the LPF 202 is put into the VCO 203. The output clock oscillated in the VCO 203 is put into the 1/N frequency divider 204, and its divided output is put into the 1/M frequency divider, and its output 16 is fed back to the phase comparator 201, thereby composing a PLL circuit.

At this time, the dividing ratio M of the 1/M frequency divider 205 depends on the number of adjusting points in the horizontal direction, and by defining the dividing ratio M constant regardless of the synchronizing signal frequency of the signal source connected outside, it is possible to adjust without increasing the number of adjusting points if the synchronizing signal frequency of the signal source connected outside varies. On the other hand, the dividing ratio N of the 1/N frequency divider 204 is controlled by the frequency automatic detector 232, and as the set value is larger, an adjusting pattern of higher precision is generated, thereby leading to enhancement of precision of adjustment of convergence.

In the constitution in embodiment 9, since the upper limit of the dividing ratio N is limited by the upper limit of the oscillation frequency of the VCO 203, the precision of the convergence adjustment is limited consequently. In embodiment 10, accordingly, by putting the output of the 1/N frequency divider 204 into the delay element 234 and putting the delayed output clock 235 and the oscillation clock 216 of the VCO 203 as the clock of the adjusting patter generator 7, and processing by time sharing, an adjusting pattern of high precision can be generated, and hence the adjustment precision may be further enhanced. Herein, the delay element 234 has similar effects whether in digital element or in analog element. Corresponding to the lattice point A of the adjusting pattern (cross hatch), an example of phase relation of clock waveforms 217 and 216, 235 is shown in FIG. 27. In this way, by operating the circuit in the adjusting pattern generator by time sharing processing, the precision of convergence adjustment can be enhanced.

The reproduced synchronizing signal 16 reproduced in such PLL circuit is put into the adjusting pattern generator 207 and correction data generator 208. Herein, the clock for driving the adjusting pattern generator 207 makes use of the oscillation clock 216 of the VCO 203 and the output delay clock of the delay element 234 receiving this oscillation clock 216, and the clock for driving the correction data generator 208 makes use of the divided output 217 of the 1/N frequency divider 204. The operating principle of the adjusting pattern generator 207 and correction data generator 208 is explained in the digital correction data generator 1 of the prior art, and the duplicated explanation is omitted. In the digital correction data generator 1, however, the read address controller 21 and cross hatch generator 31 correspond to the adjusting pattern generator 207, and time sharing action is done by these two clocks. The output signal 230 of the adjusting pattern generator 207 is put into the video circuit 209, and the adjusting pattern is produced at the time of convergence adjustment. On the other hand, the digital correction data output signal 31 of the correction data generator 208 is put into the D/A converter 210, and the output converted into analog correction amount is put into the LPF 211 and the analog correction waveform is smoothed, and its output is put into the output amplifier 212 and amplified. On the basis of the correction amount amplified herein, the convergence coil 213 is driven.

Thus, according to the embodiment, by composing the frequency divider in the PLL in two stages consisting of the 1/N frequency divider 204 and 1/M frequency divider 205, and further operating the adjusting pattern generator 207 by time sharing using clocks differing in phase, the precision of convergence adjustment is enhanced from the prior art.

(Embodiment 11)

Figure 28:
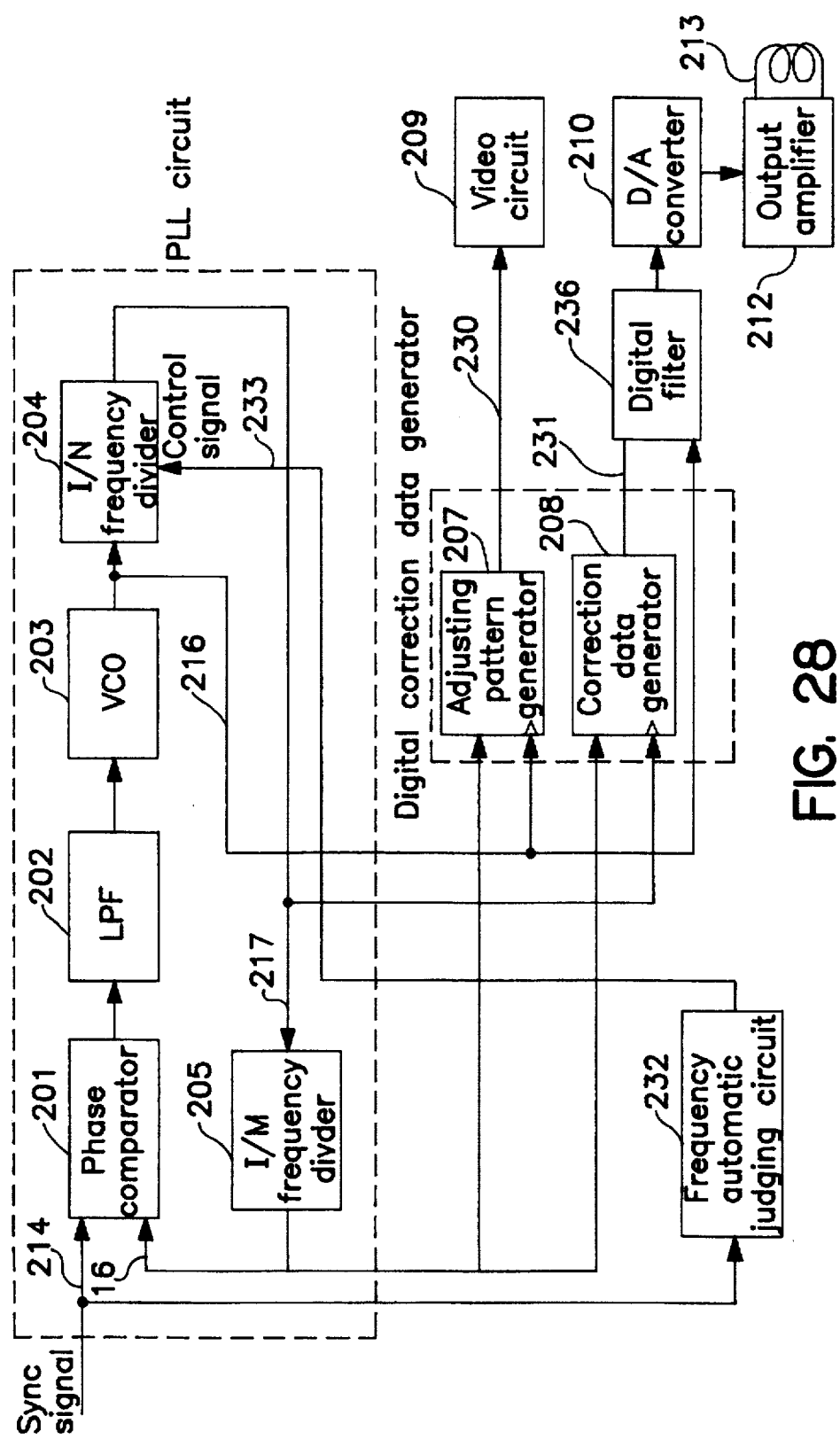
FIG. 28 is a block diagram of a digital convergence apparatus in embodiment 11 of the invention.

FIG. 28 is a block diagram of an embodiment of the digital convergence apparatus as set forth in claim 19. In FIG. 28, reference numeral 232 is a frequency automatic detector, 201 is a phase comparator, 202 is a LPF, 203 is a VCO, 204 is a 1/N frequency divider, 205 is a 1/M frequency divider, 207 is a adjusting pattern generator, 209 is a video circuit, 208 is a correction data generator, 236 is a digital filter, 210 is a D/A converter, 212 is an output amplifier, and 213 is a convergence coil. Besides, reference numeral 214 is a synchronizing signal synchronized with deflection current period, 16 is a reproduced synchronizing signal, 230 is an output of the adjusting pattern generator 207, and 231 is an output signal of the correction data generator 208.

The operation of thus constituted digital convergence apparatus of claim 19 of the invention is described below while referring to FIG. 28.

In FIG. 28, the synchronizing signal 214 synchronized with the deflection current period, and the output signal 16 of the 1/M frequency divider 205 are compared in phase by the phase comparator 201, and its output is put into the LPF 202, and the direct-current output smoothed in the LPF 202 is put into the VCO 203. The output clock oscillated in the VCO 203 is put into the 1/N frequency divider 204, and its divided output is put into the 1/M frequency divider, and its output 16 is fed back to the phase comparator 201, thereby composing a PLL circuit.

At this time, the dividing ratio M of the 1/M frequency divider 205 depends on the number of adjusting points in the horizontal direction, and by defining the dividing ratio M constant regardless of the synchronizing signal frequency of the signal source connected outside, it is possible to adjust without increasing the number of adjusting points if the synchronizing signal frequency of the signal source connected outside varies. On the other hand, the dividing ratio N of the 1/N frequency divider 204 is controlled by the frequency automatic detector 232, and as the set value is larger, an adjusting pattern of higher precision is generated, thereby leading to enhancement of precision of adjustment of convergence. In this way, by fixing the dividing ratio M and varying only the dividing ratio N, the precision of adjusting pattern may be enhanced without increasing the number of adjusting points, so that the precision of convergence adjustment may be enhanced.

The reproduced synchronizing signal 16 reproduced in such PLL circuit is put into the adjusting pattern generator 207 and correction data generator 208. Herein, the clock for driving the adjusting pattern generator 207 makes use of the oscillation clock 216 of the VCO 203, and the clock for driving the correction data generator 208 makes use of the divided output 217 of the 1/N frequency divider 204. The operating principle of the adjusting pattern generator 207 and correction data generator 208 is explained in the digital correction data generator 1 of the prior art, and the duplicated explanation is omitted. In the digital correction data generator 1, however, the read address controller 21 and cross hatch generator 31 correspond to the adjusting pattern generator 207. The output signal 230 of the adjusting pattern generator 207 is put into the video circuit 209, and the adjusting pattern is produced at the time of convergence adjustment. On the other hand, the digital correction data output signal 231 of the correction data generator 208 is put into the digital filter 236 in which the oscillation clock 216 of the VCO 203 is used as input clock, and the correction between the adjusting points is done digitally, and output is put into the D/A converter 210 to be converted into analog correction amount. Herein, since the precision of the digital filter 236 is determined by the dividing ratio N of the 1/N frequency divider 204, by raising N, the filter precision for smoothing the correction data in the horizontal direction may be easily enhanced. The analog output of this D/A converter 210 is put into the output amplifier 212 and amplified. On the basis of the correction amount amplified herein, the convergence coil 213 is driven.

Thus, according to the embodiment, by composing the frequency divider in the PLL in two stages consisting of the 1/N frequency divider 204 and 1/M frequency divider 205, and using the digital filter, the precision of adjusting pattern is enhanced, while the precision between horizontal adjusting points of the convergence correction data is enhanced, from the prior art.

(Embodiment 12)

The invention as set forth in claim 20 and claim 21 of the invention is described below while referring to FIG. 29 and FIGS. 30a and 30b.

Figure 41:
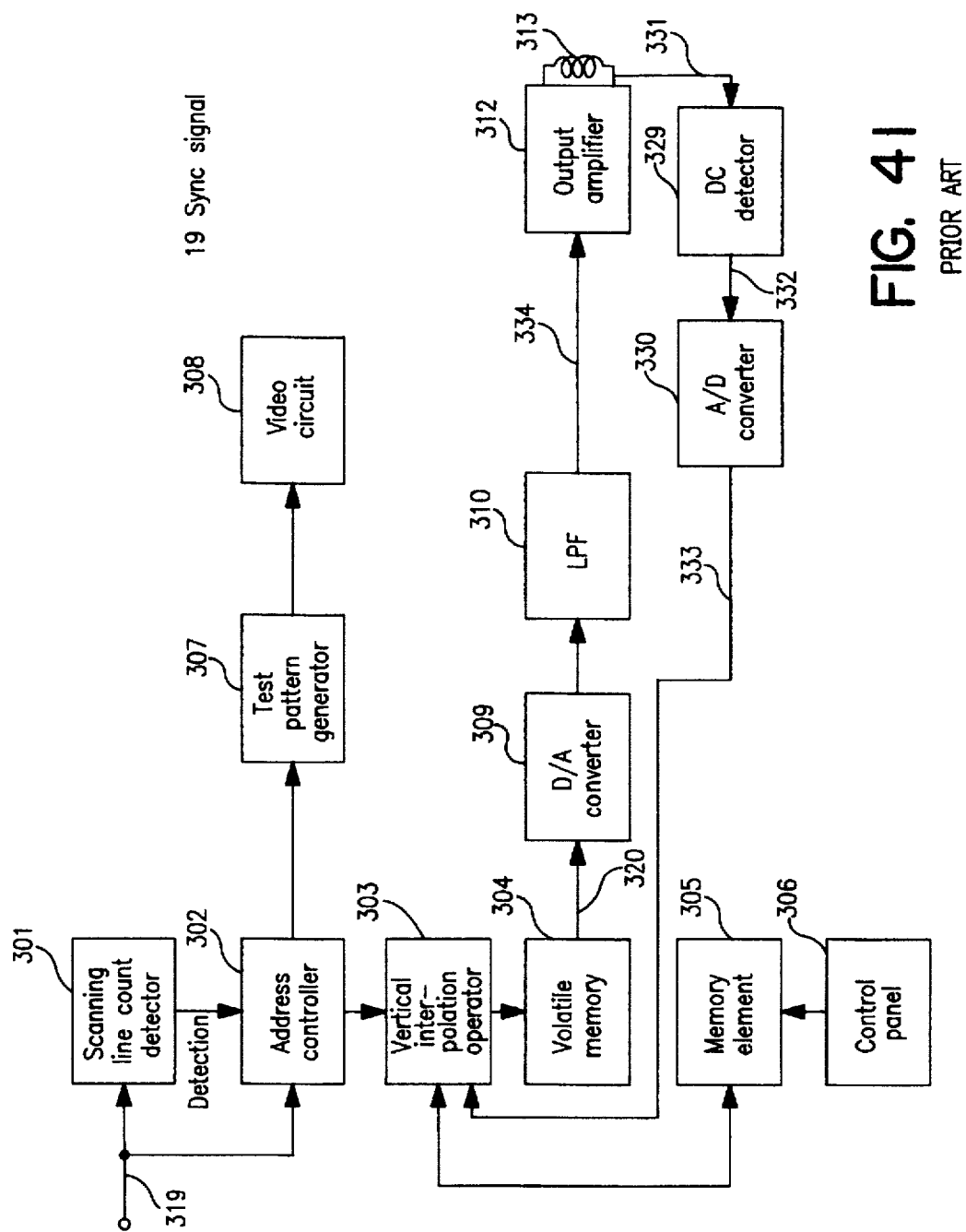
FIG. 41 is a block diagram of a digital convergence apparatus in prior art 6.

In advance, a prior art is described in FIG. 41. Reference numeral 301 is a scanning line count detector, 302 is an address controller, 303 is a vertical interpolation operator, 304 is a volatile memory, 305 is a memory element, 306 is a control panel, 307 is a test pattern generator, 308 is a video circuit, 309 is a D/A converter, 310 is an LPF, 312 is an output amplifier, 313 is a convergence coil, 329 is a direct-current detector, 330 is an A/D converter, and 319 is a synchronizing signal synchronized with deflection current period. In thus constituted digital convergence apparatus, the operation is described below.

In FIG. 41, the synchronizing signal 319 synchronized with the deflection current period is put into the address controller 302 and the scanning line count detector 301. The result of scanning line count detection of the scanning line count detector 301 is put in as control signal of the address controller 302, and by this control signal the test pattern generator 307 and the vertical interpolation operator 303 are controlled.

First, by the control signal from the address controller 302, the test pattern generator 307 is driven, and a test pattern (for example, cross hatch pattern) is projected on a projection screen by the video circuit 308.

Concerning a color desired to be correct, for example, by the red data write key provided in the control panel 306, the correction amount is written into the memory element 305 while observing the screen. To correspond to various video signal sources, since it is necessary to process the adjusting point interval depending on the number of scanning lines, the synchronizing signal 319 is supplied into the scanning line count detector 301, and is applied to the vertical interpolation operator 303 through the address controller 302. In the vertical interpolation operator 303, from the number of scanning lines P per field and the number of adjusting points Q in the vertical direction, the scanning lines R in R=P/(Q+1) adjusting points is determined, and in every R times, the vertical interpolation is operated on the basis of the convergence correction data of the memory element 305, and the result of the vertical interpolation operation is written into the volatile memory 304 on every occasion.

The convergence correction data stored in the volatile memory 304 is put into the D/A converter 309 to be converted into analog quantity, and is smoothed by the LPF 310. The output 334 of this LPF 310 is put into the output amplifier 312, and the convergence correction data amplified herein is applied to the convergence coil 313.

However, in the process of converting the convergence correction data stored in the volatile memory 304 into analog quantity and transmitting to the convergence coil 313, there was a problem of superposition of direct-current drift component on the convergence correction waveform which should be purely applied to the convergence coil 313, thereby appearing as static drift on the projection screen, due to effects Of time course changes or temperature changes. As the means of solving this problem, hitherto, the disclosure in Japanese Laid-open Patent 3-76396 was known.

In FIG. 41, the convergence correction waveform 331 applied to the convergence coil 313 is put into the direct-current detector 329, and the direct-current component which causes static drift is detected. The detection result 332 is converted into digital quantity 333 in the A/D converter 330, and is put into the vertical interpolation operator 303. In the vertical interpolation operator 303, the output 333 of the A/D converter 330 is subtracted from the convergence correction data 320 stored in the volatile memory 304, and this operation result is stored in the volatile memory 304 as convergence correction data again, so that the direct-current component as static drift cause can be canceled. This process is more specifically described below by referring to FIG. 42.

In FIG. 42, for example, if the number of significant bits of convergence correction data stored in the volatile memory 304 is 8 bits, the center of the dynamic range of the convergence correction data is "10000000." Herein, if the output 320 of the volatile memory 304 is "10000000," suppose the output voltage 331 of the output amplifier 312 is, for example, +b V (or "00001000" when expressed in 8 bits), while the ideal state is 0 V. This +V B corresponds to the direct-current portion causing static drift. In the conventional constitution shown in FIG. 41, to cancel this direct-current component of +b V, the following correction is operated in the vertical interpolation operator 303.

$$1000000 - 00001000 = 01111000$$

By storing this operation result "01111000" (corresponding to −b V when converted to analog quantity) again into the volatile memory 304, $$(-b)+(+b)=0 \text{ V}$$

is applied to the convergence coil 313, and it is as if direct-drift component were not superposed on the convergence coil 313, so that the static drift component may be suppressed.

Figure 29:
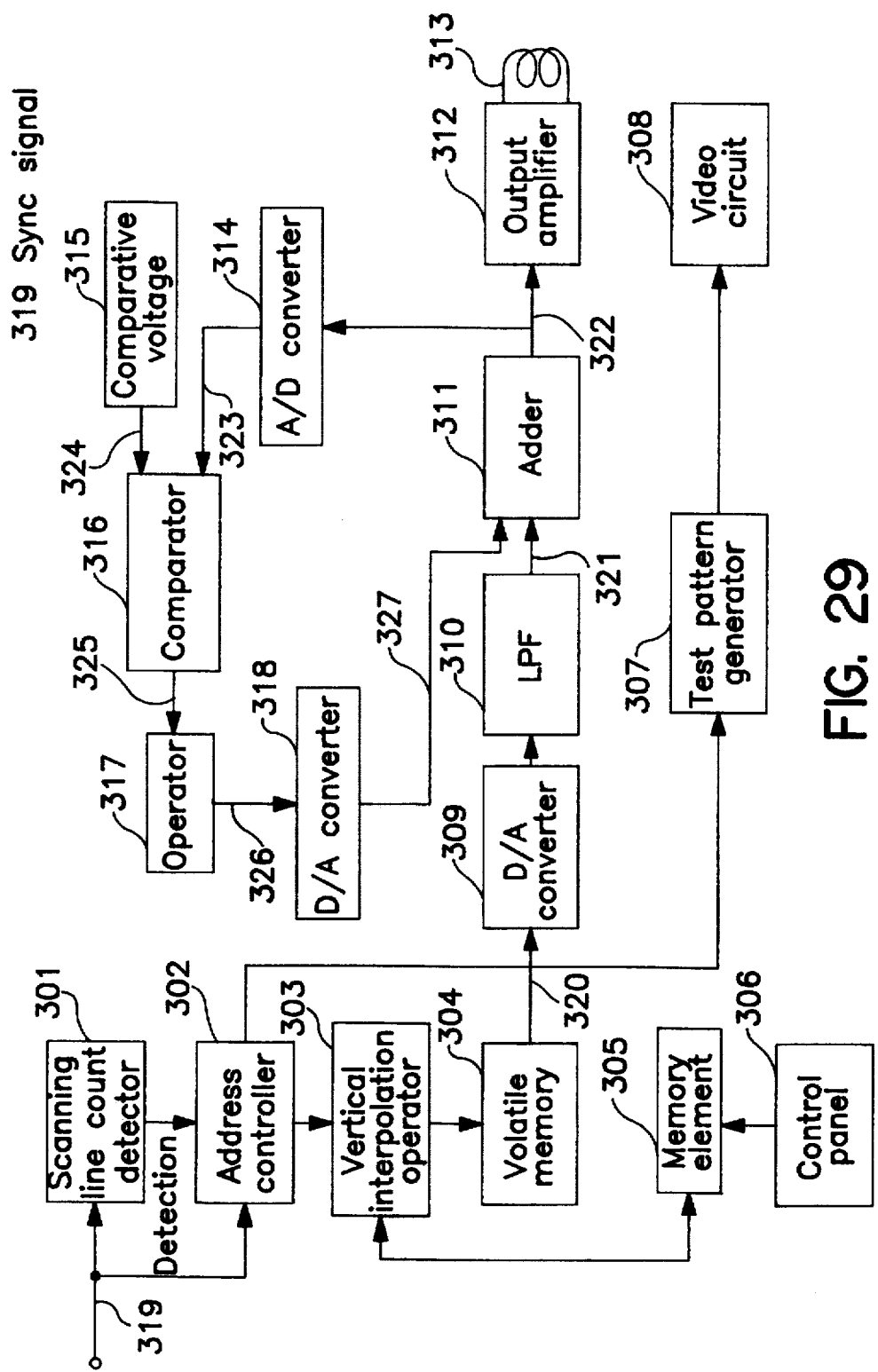
FIG. 29 is a block diagram of a digital convergence apparatus in embodiment 12 of the invention.

By contrast, in the present invention, in FIG. 29, reference numeral 301 is a scanning line count detector, 302 is an address controller, 303 is a vertical interpolation operator, 304 is a volatile memory, 305 is a memory element, 306 is a control panel, 307 is a test pattern generator, 308 is a video circuit, 309 is a D/A converter, 310 is an LPF, 311 is an adder, 312 is an output amplifier, 313 is a convergence coil, 314 is an A/D converter, 315 is a comparative voltage expressed in digital value, 316 is a comparator, 317 is an operator, 318 is a D/A converter, and 319 is a synchronizing signal synchronized with deflection current period. In thus constituted digital convergence apparatus, the operation is described below.

In FIG. 29, the synchronizing signal 319 synchronized with the deflection current period is put into the address controller 302 and the scanning line count detector 301. The result of scanning line count detection of the scanning line count detector 301 is put in as control signal of the address controller 302, and by this control signal the test pattern generator 307 and the vertical interpolation operator 303 are controlled.

First, by the control signal from the address controller 302, the test pattern generator 307 is driven, and a test pattern (for example, cross hatch pattern) is projected on a projection screen by the video circuit 308.

Concerning a color desired to be correct, for example, by the red data Trite key provided in the control panel 306, the correction amount is written into the memory element 305 while observing the screen. To correspond to various video signal sources, since it is necessary to process the adjusting point interval depending on the number of scanning lines, the synchronizing signal 319 is supplied into the scanning line count detector 301, and is applied to the vertical interpolation operator 303 through the address controller 302. In the vertical interpolation operator 303, from the number of scanning lines P per field and the number of adjusting points Q in the vertical direction, the scanning lines R in R=P/(Q+1) adjusting points is determined, and in every R times, the vertical interpolation is operated on the basis of the convergence correction data of the memory element 305, and the result of the vertical interpolation operation is written into the volatile memory 304 on every occasion.

The convergence correction data stored in the volatile memory 304 is put into the D/A converter 309 to be converted into analog quantity, and is smoothed by the LPF 310. The output 321 of this LPF 310 is put into one end of the adder 311, and its output is put into the output amplifier 312. The convergence correction data amplified in this output amplifier is applied to the convergence coil 313.

Furthermore, the output of the adder 311 is put into the A/D converter 314, and is converted into digital signal. This digital signal is put into one end of the comparator 316, and is compared with the comparative voltage 315 expressed in digital value as comparison reference. The result 325 of voltage comparison in the comparator 316 is put into the operator 317, and in this operator 317, depending on the voltage comparison result 325, it is operated to cancel the direct-current drift component generated in the LPF 310. This correction operation result is put into the D/A converter 318, and its correction operation result 327 is put into other end of the adder 311. In thus constituted digital convergence apparatus of the invention, the action process for automatically canceling the direct-current component superposed on the output of the LPF 310 is described specifically by reference to FIGS. 30a and 30b.

Figure 30A:
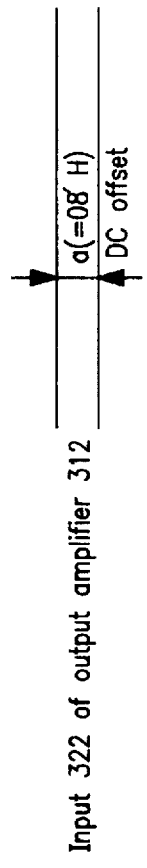
FIGS. 30a and 30b are operation explanatory diagram of the digital convergence apparatus in embodiment 12 of the invention.
Figure 30B:
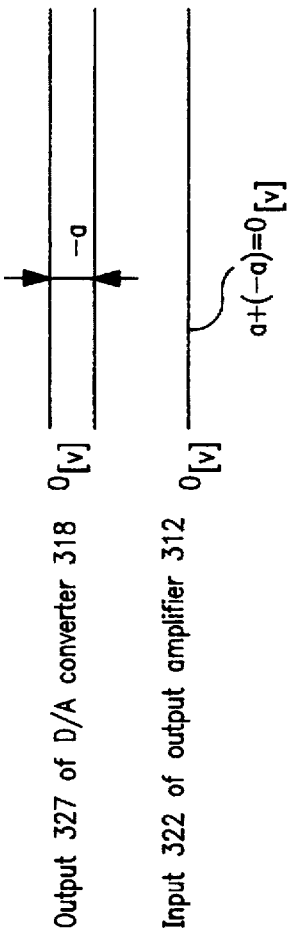

In FIGS. 30a and 30b for example, if the number of significant bits of convergence correction data stored in the volatile memory 304 is 8 bits, the center of the dynamic range of the convergence correction data is "10000000." Further, if the output 320 of the volatile memory 304 is "10000000," suppose the input voltage 331 of the output amplifier 312 is, for example, 0 V in ideal state. Herein, in order that the output 320 of the volatile memory 304 may be "10000000," the address controller 302 controls the vertical interpolation operator 303. At this time, when a direct-current drift component of, for example, +a V (supposing "00001000" when expressed in 8 bits) is superposed on the input voltage of the output amplifier 312, the output of the A/D converter 314 becomes

10000000+00001000=10001000.

By comparing this result of A/D converter 314 and the comparative voltage 315 in the comparator 316, we obtain

10000000−10001000=11111000 and from this result, the operator 317 detects that a direct-current drift component of +a V is superposed on the input voltage 322 of the output amplifier 312. According to this result of detection, a correction signal so that the output of the D/A converter 318 may be −a V is put into the D/A converter 318 from the operator 317, and the output voltage −a V is put into other end of the adder 311. As result, the output of the adder 311 is (output of adder 311 without correction) +

(corrected output of D/A converter 318)

$= a + (-a)$ $= 0$ V, so that the direct-current drift component superposed on the input of the output amplifier 312 can be canceled.

Thus, according to the digital convergence apparatus of the embodiment, without sacrificing the dynamic range of the convergence correction amount, the direct-current drift component generated in the LPF can be canceled automatically in a simple circuit composition and at high precision.

Besides, by controlling the direct-current drift component by detecting the signal before input into the output amplifier 312, since the state completely free from superposition of direct-current drift component on the input of the output amplifier is realized, it is not necessary to set again the convergence correction data stored in the memory 304 when replacing the board, and the maintainability in board replacement is dramatically improved.

(Embodiment 13)

An embodiment of the invention as set forth in claim 22 and claim 23 of the invention is described below by reference to FIG. 31. The same components as in the foregoing embodiments are identified with same reference numerals, and repeated explanations are omitted.

Figure 31:
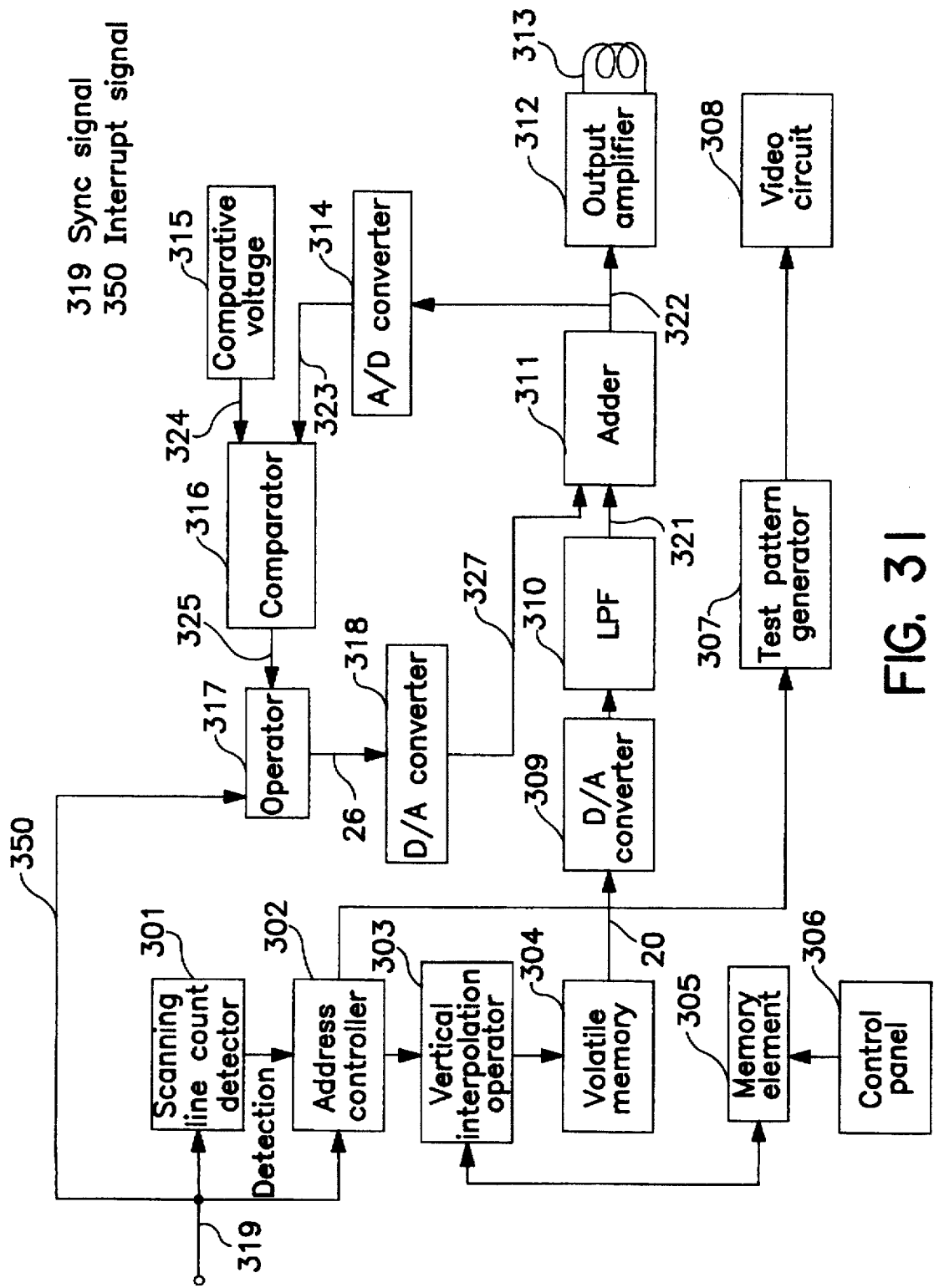
FIG. 31 is a block diagram of a digital convergence apparatus in embodiment 13 of the invention.

In FIG. 31, the synchronizing signal 319 synchronized with the deflection current period is put into the scanning line count detector 301 and address controller 302, and is also put into the operator 317 as an interrupt signal. Consequently, the address controller 302 writes the same correction data as comparative voltage 315 into the volatile memory 304 through the vertical interpolation operator 303 only in the fly-back period of the synchronizing signal 319 synchronized with the deflection current period, and the operator 817 detects the direct-current drift component superposed on the input 322 of the output amplifier 312 through the A/D converter 314. By the detected result, the operator 317 operates the correction calculation, and by adding the correction operation result to the output of the LPF 310, the direct-current drift component superposed on the input of the output amplifier 312 is canceled. Then the synchronizing signal 319 synchronized with the deflection current period is other than the fly-back period, the correction operation of the operator 317 is stopped, and the D/A converter 318 holds the result of correction operation by the operator 317 during the fly-back period.

By thus controlling the correction operation by the interrupt signal, fluctuations due to time course changes and temperature changes of the direct-current drift component superposed on the input 322 of the output amplifier 312 can be observed whenever desired, and if the output of the D/A converter 318 or the like is changed due to disturbance, it can be remedied within one period of the synchronizing signal 319, which leads to enhancement of reliability.

Moreover, by operating the correction in the fly-back period, and holding the output of the D/A converter 318 during video period, disturbance of image can be prevented.

(Embodiment 14)

An embodiment of the invention as set forth in claim 24 and claim 25 of the invention is described below by reference to FIG. 32 and FIG. 33. The same components as in the foregoing embodiments are identified with same reference numerals, and repeated explanations are omitted.

Figure 32:
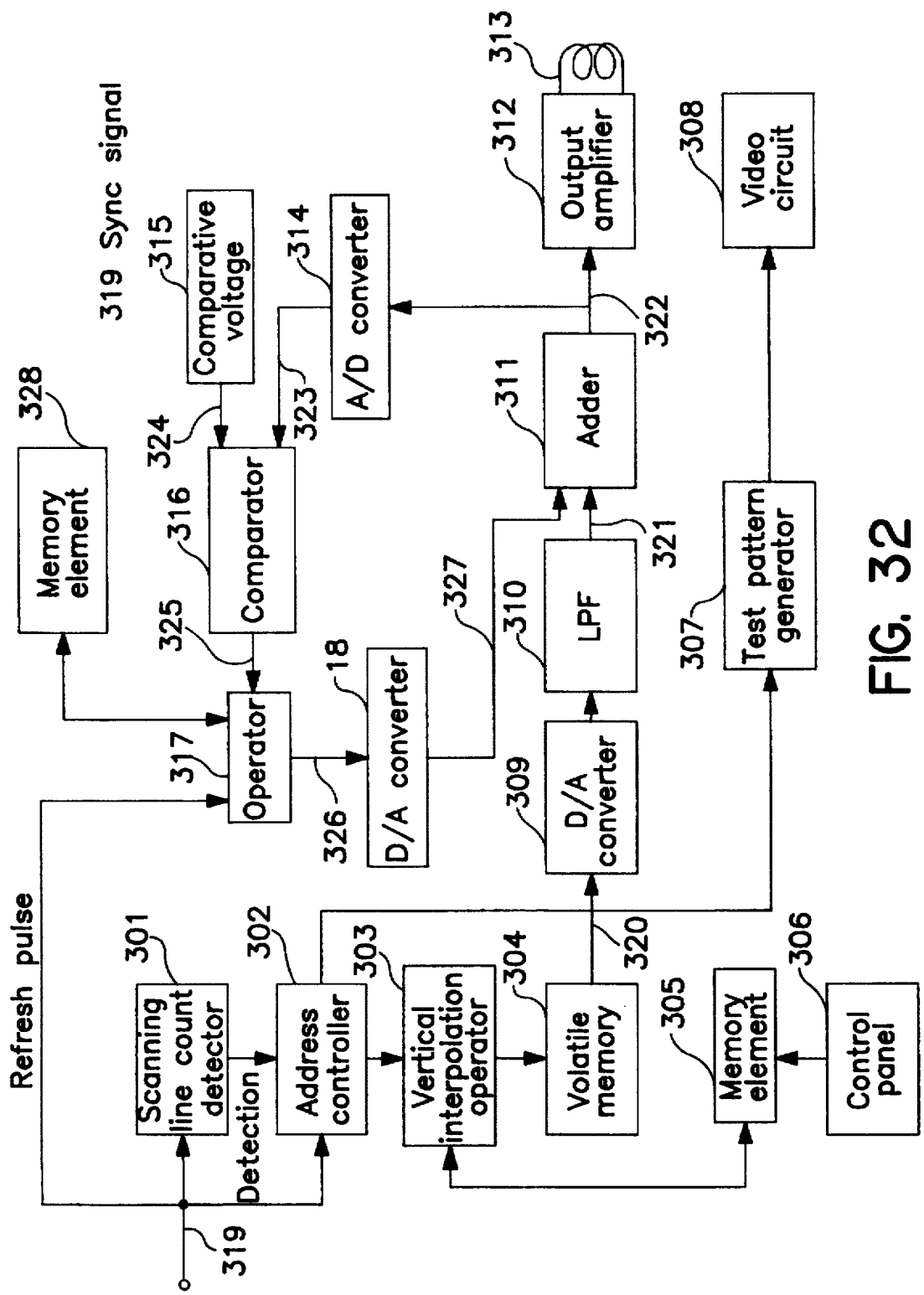
FIG. 32 is a block diagram of a digital convergence apparatus in embodiment 14 of the invention.
Figure 33:
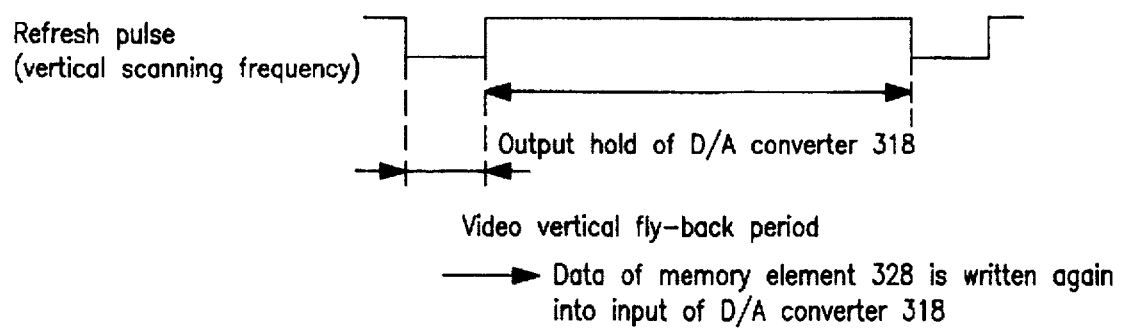
FIG. 33 is an operation explanatory diagram of the diagram of the digital apparatus in embodiment 14 of the invention.

In FIG. 32, reference numeral 328 is a memory element for storing the correction operation result of the operator 317. In the digital convergence apparatus of frame judgement 24 and frame judgement 25, when the output amplifier 312 is present in multiple channels, a series of circuit actions for canceling the direct-current drift component entered in the output amplifier 312 cannot be executed in all channels during the fly-back period. Accordingly, in the digital convergence apparatus of claim 24 and claim 25, the correction operation result of the operator 317 is put into the D/A converter 318 and also written and stored in the memory element 328. As a result, as shown in FIG. 33, when the synchronizing signal 319 synchronized with the deflection current period is put into the operator 317 as interrupt signal, the operator 317 writes the correction operation result stored in the memory element 328, and puts the correction operation result into the D/A converter 318, and feeds its output into the adder 311. At this time, the duration of the fly-back period is enough to have time for the operator 317 to read the correction operation result stored in the memory element 318 and time to write the correction operation result into the D/A converter 318.

Thus, in this constitution of the invention, if the output amplifier 312 is present in multiple channels, it is possible to cope with output fluctuations of the D/A converter 318 holding the ordinary output state due to disturbance, and also to cope with the short fly-back period of the synchronizing signal 319.

Moreover, when the output amplifier 312 is present in multiple channels, if desired to cope with fluctuations due to time course changes and temperature changes of the direct-current drift component superposed on the input 322 of the output amplifier 312, a series of correction circuit actions mentioned in embodiment 13 may be executed in the fly-back period of the synchronizing signal 319, and in other channels, the correction operation result stored in the memory element 328 may be read in and written again into the D/A converter 318. Herein, if the series of correction circuit actions mentioned in embodiment 3 can be completed within the fly-back period of the synchronizing signal 319, the same effect will be obtained if several channels are operated in one fly-back period.

In this way, according to the invention as mentioned in embodiments 1, 2 and 3, the waveform issued by the first analog multiplier by multiplying the analog correction data output of the first sample hold circuit and the analog triangular wave output of the first low pass filter, and the waveform issued by the second analog multiplier by multiplying the analog correction data output of second first sample hold circuit and the analog triangular wave output of the second low pass filter are triangular waves in a double period of each sampling clock, and their amplitude depends on the digital correction data output of the digital correction data generator, and by summing up the outputs of the first and second analog multiplies by the analog adder, desired correction data waveform can be obtained at an interval of sampling period T on the basis of the interval between adjusting points on the screen, regardless of the frequency of input synchronizing signal.

Besides, by summing up the waveform issued by the first digital multiplier by multiplying the digital correction data output of the first sample hold circuit and digital triangular wave output of triangular wave generator, and waveform issued by the second digital multiplier by multiplying the digital correction data output of the second sample hold circuit and phase inverted output of the digital triangular wave output of triangular wave generator in the digital adder, and converting the sum by the digital adder into analog correction data in the D/A converter, desired correction data waveform can be obtained at an interval of sampling period T on the basis of the interval between adjusting points on the screen, regardless of the frequency of input synchronizing signal.

Accordingly, in the multiscan compatible color receiver, smooth convergence adjustment is realized depending on various input signal sources differing in the frequency of synchronizing signal, and the correction precision of convergence can be enhanced.

Still more, higher frequency components of thus obtained correction data waveform can be further removed.

Hence, smoother convergence adjustment is realized, and the correction precision of convergence may be further enhanced.

According to the digital convergence apparatus of the invention as mentioned in embodiments 4, 5, 6, 7, and 8, even if a video signal source having a greater number of scanning lines than the maximum number of corresponding scanning lines limited by the memory capacity of the volatile memory is entered from outside, it is possible to handle without increasing the memory capacity of the volatile memory, and the cost performance of the digital convergence apparatus may be enhanced easily.

In the digital convergence apparatus of the invention, to obtain such effects, there is an interpolation circuit controlled by the number of scanning lines of the video signal source entered from outside, but it is possible that discontinuous point of digital convergence correction data occurring in the vertical direction may occur depending on the interpolation operation result in the interpolating circuit.

Hence, as mentioned in embodiment 6, by putting the interpolation operation output of the interpolating circuit into the digital filter circuit, discontinuous point of digital convergence correction data can be easily eliminated, and smooth digital convergence correction is realized.

Figure 39:
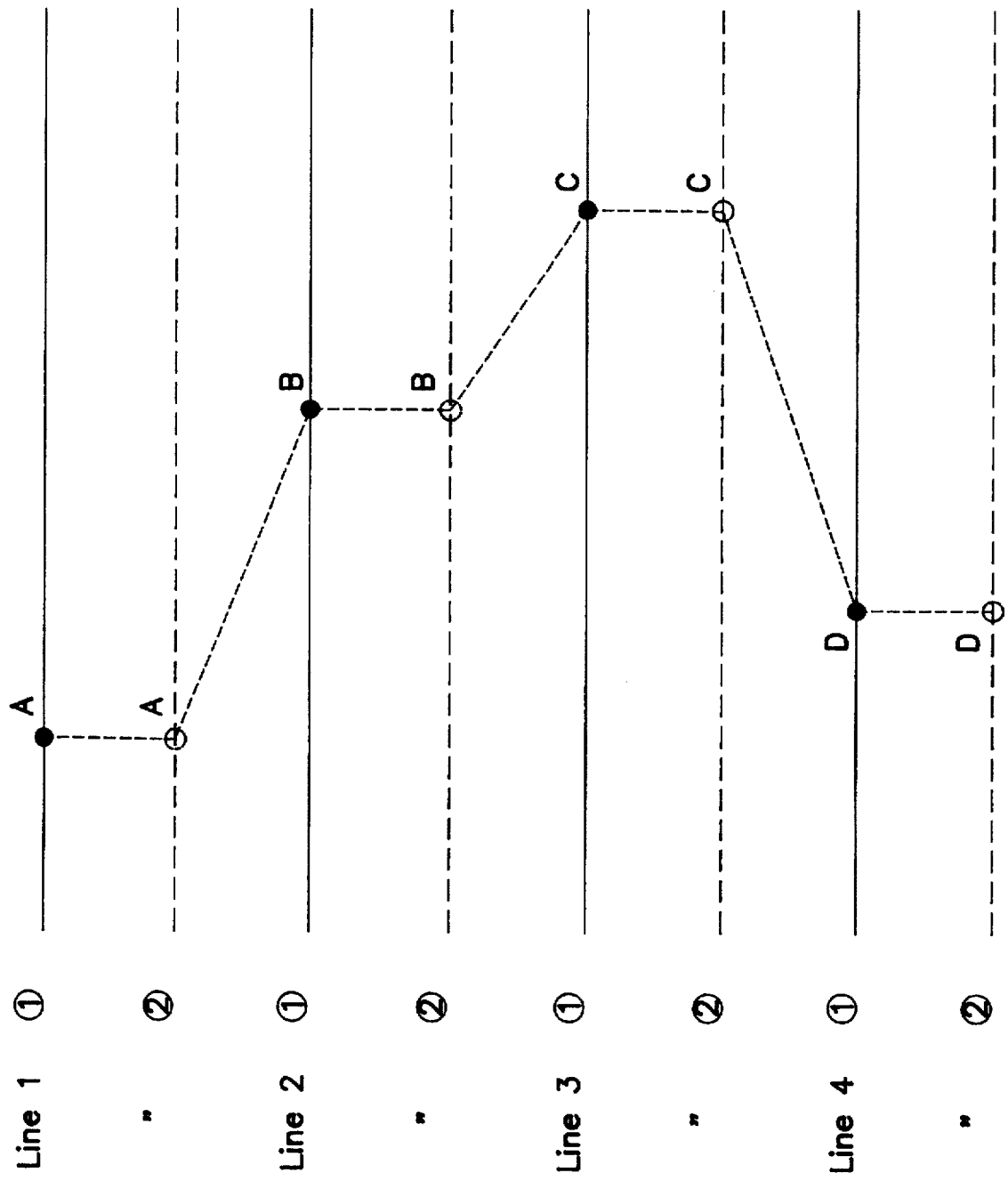
FIG. 39 is a digital convergence correction data correspondence diagram on a screen in interlaced scanning of a digital convergence apparatus in prior art 4.

Moreover, in the conventional digital convergence apparatus, when the video signal source entered from outside is interlaced scanning, the frames of the video signal sources are not distinguished, and the digital convergence correction data stored in the memory is issued from the start position of scanning line, and therefore when the screen is actually observed, as shown in FIG. 39, smooth convergence correction data curve is not obtained, and the digital convergence correction data curve is staircase wave, so that multiple discontinuous points occur.

Accordingly, in the constitution shown in embodiment 7, without increasing the volatile memory of the digital convergence apparatus, even if the video signal source entered from outside is interlaced scanning, when the screen is actually observed, as shown in FIG. 20, smooth convergence correction data curve is obtained.

By adding the constitution of embodiment 8 to the above constitution of the invention, much smoother convergence correction data is obtained, and increase of power consumption of the convergence circuit due to distortion of convergence correction data curve can be suppressed.

In the conventional digital convergence apparatus, although the convergence can be corrected independently in each adjusting point, but since the clock for driving the adjusting pattern generator (cross hatch generator) and the clock for driving the correction data generator are same, the hatch with of the adjusting pattern is thick and the precision of convergence adjustment is poor. Since the hatch width of the adjusting pattern depends on the number of adjusting points, it may be controlled by increasing the number of adjusting points, but in this case, since the number of convergence adjusting points increases, the convergence adjustment time becomes longer. Or, when the digital convergence apparatus is used in multiscan application, in the conventional constitution, since the oscillation frequency range of the VCO is limited, the corresponding frequency range is also limited.

According to the invention mentioned in embodiments 9, 10, and 11, such problems can be easily solved without increasing the number of adjusting points only by installing two kinds of frequency divider in the digital convergence apparatus, and the multiscan application is also realized in a small circuit scale. Still more, the constitution in claim 2 is, as compared with the constitution in claim 17, further enhanced in the precision of convergence adjustment, and in the constitution of claim 19, moreover, the precision between horizontal adjusting points of convergence correction data is easily enhanced together with improvement of adjusting pattern precision.

In the digital convergence apparatus of the invention as mentioned in embodiments 12, 13, and 14, without sacrificing the dynamic range of the convergence correction amount, the direct-current drift component generated in the LPF can be canceled automatically in a simple circuit constitution and at high precision. Furthermore, in the conventional digital convergence apparatus, the output amplifier of large amplitude action and other circuit block are composed of different boards, and in the case of maintenance such as replacement of boards, in the conventional constitution, it was necessary to set again, at the site, the convergence correction data stored in the volatile memory. In the constitution of the invention, by contrast, the state completely free from superposition of direct-current drift component is realized in the input of the output amplifier, the maintainability in replacement of boards is dramatically enhanced. As for the direct-current drift component generated by the output amplifier itself, the output amplifier itself has a circuit for canceling the direct-current drift component in self-completion type, so that static drift appearing on the projection screen can be suppressed.

Furthermore, by feeding the synchronizing signal synchronized with the deflection current period as interrupt signal, fluctuations due to time course changes and temperature changes of the direct-current drift component superposed on the input of the output amplifier can be observed whenever desired, and if the output of the D/A converter fluctuates due to disturbance, it can be corrected within one period of the synchronizing signal, which leads to enhancement of reliability. Still more, by operating to correct in the fly-back period, and issuing the correction operation result in the video period, disturbance of picture can be prevented.

Moreover, by storing the correction operation result of the operator in the memory element, if the output amplifier is present in multiple channels, in the case a series of circuit actions for canceling the direct-current drift component entered in the output amplifier 312 cannot be done in all channels in the fly-back period, it is possible to cope with output fluctuations of the D/A converter. Further, if the fly-back period of the synchronizing signal is short and a series of circuit actions for canceling the direct-current drift component entered in the output amplifier 312 cannot be done in all channels in the fly-back period, it is possible to cope with similarly.

What is claimed is:

1. A digital convergence method for use with a plurality of input signals comprising the steps of:
    (a) generating digital convergence correction data corresponding to the plurality of input signals,
    (b) storing in a memory the digital convergence data of step (a),
    (c) converting the digital convergence data stored in step (b) into an analog signal,
    (d) low pass filtering the analog signal of step (c) into a filtered analog signal,
    (e) detecting a direct current drift of the filtered analog signal of step (d),
    (f) converting the direct current drift of step (e) into a corrected digital signal,
    (g) converting the corrected digital signal value of step (f) into an corrected analog signal, and
    (h) adding the corrected analog signal of step (g) to the filtered analog signal of step (d) thereby canceling the direct current drift.

2. A digital convergence apparatus comprising:
    digital convergence correction data generating circuit for issuing digital convergence correction data on the basis of the synchronizing signal included in an input signal source from outside,
    a first D/A converter for converting the digital convergence correction data issued from the digital convergence correction data generating circuit into analog convergence correction signal,
    a first sample hold circuit for latching the analog convergence correction signal issued from the first D/A converter at a first sampling clock of which period is defined on the basis of the synchronizing signal,
    a second sample hold circuit for latching the analog convergence correction signal issued from the first D/A converter at a second sampling clock which is different from the first sampling clock,
    a triangular wave generating circuit for issuing digital triangular wave data which is a digital signal corresponding to the triangular wave on the basis of the synchronizing signal,
    a second D/A converter for converting the digital triangular wave data issued from the triangular wave generating circuit into an analog signal,
    a first low pass filter (LPF) for removing high frequency components of the analog signal issued from the second D/A converter,
    a third D/A converter for converting the inverted data of each bit of the digital triangular wave data issued from the triangular wave generating circuit into an analog signal,
    a second LPF for removing high frequency components of the analog signal issued from the third D/A converter,
    a first analog multiplier for multiplying the output of the first sample hold circuit and the output of the first LPF,
    a second analog multiplier for multiplying the output of the second sample hold circuit and the output of the second LPF,
    an analog adder for summing the output of the first analog multiplier and the output of the second analog multiplier,
    an output amplifier for amplifying the analog convergence correction data which is the sum of the analog adder, and
    a convergence coil to which an output signal of the output amplifier is applied.

3. A digital convergence apparatus comprising:
    digital convergence correction data generating circuit for issuing digital convergence correction data which is a digital signal for convergence correction, on the basis of the synchronizing signal included in an input signal source from outside,
    a first sample hold circuit or latching the digital convergence correction data issued from the digital convergence correction data generating circuit at a first sampling clock of which period is defined on the basis of the synchronizing signal,
    a second sample hold circuit for latching the digital convergence correction data issued from the digital convergence correction data generating circuit at a second sampling clock which is different from the first sampling clock,
    a triangular wave generating circuit for issuing digital triangular wave data which is a digital signal corresponding to the triangular wave on the basis of the synchronizing signal,
    a first digital multiplier or multiplying the digital triangular wave data issued from the triangular wave generating circuit and the output from the first sample hold circuit, a second digital multiplier for multiplying the inverted data of each bit of the digital triangular wave data issued from the triangular wave generating circuit and the output from the second sample hold circuit, a digital adder for summing up the output of the first digital multiplier and the output of the second digital multiplier, a D/A converter for converting the sum of the digital adder into an analog signal of analog convergence correction data, an output amplifier for amplifying the analog convergence correction data issued from the D/A converter, and a convergence coil to which an output signal of the output amplifier is applied.

4. A digital convergence apparatus of claim 3, further comprising an LPF for removing high frequency components of analog convergence correction data, wherein the output amplifier is designed to amplify the output of the LPF.

5. A digital convergence apparatus of claim 2 or 3, wherein the first sampling clock and second sampling clock are identical in frequency and have a difference of half period from each other.

6. A digital convergence apparatus of claim 2 or 3, wherein the period of the first sampling clock and second sampling clock, and the period of triangular wave and inverted triangular wave are all identical, and the triangular wave is in a form of rising linearly in a first half and falling in a second half, and the inverted triangular wave is in a form of falling linearly in a first half and rising in a second half.

7. A digital convergence apparatus comprising:

memory means for storing digital convergence correction data corresponding to plural video signal sources each having a respective number of scanning lines, scanning line detecting means for detecting the number of scanning lines of a respective one of said plural video signal sources, and comparison means for
 a) comparing an amount of data associated with the number of scanning lines of the respective one of said plural video signal sources and a memory capacity of the memory means, and
 b) correcting convergence by preparing secondary convergence correction data further from the digital convergence correction data in a unit of $2^n$ times (n=1, 2, 3, ...) of the digital convergence correction data if the amount of data associated with the number of scanning lines of the respective one of said plural video signal sources is larger than the memory capacity of the memory means.

8. A digital convergence apparatus comprising:

memory means for storing digital convergence correction data corresponding to plural video signal sources having different number of scanning lines, and scanning line detecting means for detecting different numbers of scanning lines, wherein the data quantity of the number of scanning lines of input video signal source and the memory capacity of the memory means are compared, and when the data quantity of the number of scanning lines of the input video signal source is larger than the memory capacity of the memory means, convergence is corrected by preparing secondary convergence correction data further from the digital convergence correction data in the unit of n times (n=1, 2, 3, ...) of the digital convergence correction data.

9. A digital convergence apparatus of claim 7 or 8, wherein discontinuous points in the vertical direction of the digital convergence correction data stored in the memory means are smoothed.

10. A digital convergence apparatus of claim 7 or 8, further comprising means for detecting the scanning method of the video signal source by judging the synchronizing signal of the input image signal, wherein in the case of the scanning method being interlaced scanning, interpolation data corresponding to the second frame is prepared from the digital convergence correction data corresponding to the first frame stored in the input memory means.

11. A digital convergence apparatus of claim 10, wherein in the case of the scanning method of the video signal source being of interlaced scanning by judging the synchronous signal of the video signal source, it is processed so that the correction data in the final scanning line of the video signal source of the digital convergence correction data may not be objective data.

12. A digital convergence apparatus comprising:

a scanning line count detector for receiving a synchronizing signal synchronized with deflection current period on the basis of an input video signal, an address controller for receiving the synchronizing signal to be controlled by the scanning line count detector, a test pattern generating circuit being controlled by the address controller, a video circuit for receiving the output of the test pattern generating circuit, memory means for storing the convergence correction data by using a control panel, a vertical interpolation operator for operating the vertical interpolation on the basis of the address controller output and the convergence correction data stored in the memory means, a volatile memory for temporarily holding the data interpolated by the vertical interpolating operator, a one-horizontal period delay circuit for receiving the digital convergence correction data stored in the volatile memory, an operating circuit for receiving the convergence correction data stored in the volatile memory as one input and receiving the output of the one-horizontal period delay circuit as other input, so as to be controlled by the scanning line count detector, a D/A converter for converting the digital convergence correction data output of the operating circuit into analog quantity, an LPF for receiving the output of the D/A converter, an output amplifier for receiving the output of the LPF, and a convergence coil being driven by the output amplifier.

13. A digital convergence apparatus of claim 12, further comprising:

a coefficient operator being controlled by a control signal from the scanning line count detector, a subtracter for receiving the digital convergence correction data stored in the volatile memory, and the output of the one-horizontal period delay circuit, a multiplier for receiving the output of the subtracter and the output of the coefficient operator, an adder for receiving the output of the multiplier and the digital convergence correction data stored in the volatile memory, and means for converting the digital convergence correction data output of the adder into analog quantity by putting into a D/A converter.

14. A digital convergence apparatus of claim 12, further comprising:
   an interpolating circuit for receiving the digital convergence correction data stored in the volatile memory,
   a serial-parallel converter (S/P converter) for separating the output of the interpolating circuit into convergence correction data in horizontal direction and convergence correction data in vertical direction,
   a D/A converter for receiving the digital convergence correction data output in the horizontal direction at the output of the S/P converter,
   a digital filter for receiving the digital convergence correction data output in the vertical direction at the output of the S/P converter, and
   means for converting the output of the digital filter into analog quantity by putting into a D/A converter.

15. A digital convergence apparatus of claim 12, further comprising:
   a frame judging circuit for receiving a synchronizing signal synchronized with deflection current period,
   a bit shift circuit for converting the digital convergence correction data value stored in the volatile memory into data value of ½,
   a one-horizontal period delay circuit for receiving the output of the bit shift circuit,
   an adder for receiving the output of the bit shift circuit and the output of the one-horizontal period delay circuit,
   a multiplexer for receiving the digital convergence correction data stored in the volatile memory and the output of the adder so as to be controlled by the frame judging circuit, and
   means for converting the digital convergence correction data output of the multiplexer into analog quantity by putting into a D/A converter.

16. A digital convergence apparatus of claim 15, further comprising:
   a frame judging circuit for receiving a synchronizing signal synchronized with deflection current period,
   a vertical interpolation operator controlled by the address controller,
   a volatile memory for receiving the output of the vertical interpolation operator,
   a bit shift circuit for converting the digital convergence correction data value stored in the volatile memory into data value of ½,
   a one-horizontal period delay circuit for receiving the output of the bit shift circuit,
   an adder for receiving the output of the bit shift circuit and the output of the one-horizontal period delay circuit,
   a multiplexer for of three inputs for controlling by the frame judging circuit for receiving the digital convergence correction data stored in the volatile memory, the output of the adder, and the convergence control data on the final scanning line of the video signal source of the digital convergence correction data to be controlled by the vertical interpolation operator, and
   means for converting the digital convergence correction data output of the multiplexer into analog quantity by putting into a D/A converter.

17. A digital convergence apparatus comprising:
   a frequency automatic detector for detecting the frequency of synchronizing signals included in an external input signal source,
   a phase comparator for receiving one of the synchronizing signals,
   an LPF for receiving the output of the phase comparator,
   a voltage control oscillator (VCO) for receiving the output smoothed by the LPF,
   a 1/N frequency divider for dividing the output of the VCO into 1/N so as to be controlled by the frequency automatic detector,
   a 1/N frequency divider for dividing the output of the 1/N frequency divider into 1/M,
   an adjusting pattern generator for feeding the synchronizing signal reproduced in the 1/M frequency divider into other end of the phase comparator, receiving thus reproduced synchronizing signal, and using the oscillation signal of the VCO-as input clock,
   a convergence correction data generator for receiving the reproduced synchronizing signal, and using the divided output of the 1/N frequency divider as input clock, and
   a D/A converter for receiving the output of the convergence correction data generator.

18. A digital convergence apparatus comprising:
   a frequency automatic detector for detecting the frequency of synchronizing signals included in an external input signal source,
   a phase comparator for receiving one of the synchronizing signals,
   an LPF for receiving the output of the phase comparator,
   a VCO for receiving the output smoothed by the LPF,
   a 1/N frequency divider for dividing the output of the into 1/N so as to be controlled by the frequency automatic detector,
   a 1/M frequency divider for dividing the output of the 1/N frequency divider into 1/M,
   an adjusting pattern generator for feeding the synchronizing signal reproduced in the 1/M frequency divider into other end of the phase comparator, receiving thus reproduced synchronizing signal, and using the oscillation signal of the VCO and the output signal of a delay element receiving this oscillation signal respectively as input clocks,
   a convergence correction data generator for receiving the reproduced synchronizing signal, and using the divided output of the 1/N frequency divider as input clock, and
   a D/A converter for receiving the output of the convergence correction data generator.

19. A digital convergence apparatus comprising:
   a frequency automatic detector for detecting the frequency of synchronizing signals included in an external input signal source,
   a phase comparator for receiving one of the synchronizing signals,
   an LPF for receiving the output of the phase comparator,
   a VCO for receiving the output smoothed by the LPF,
   a 1/N frequency divider for dividing the output of the VCO into 1/N so as to be controlled by the frequency automatic detector,
   a 1/M frequency divider for dividing the output of the 1/N frequency divider into 1/M,
   an adjusting pattern generator for feeding the synchronizing signal reproduced in the 1/M frequency divider into other end of the phase comparator, receiving thus reproduced synchronizing signal, and using the oscillation signal of the VCO as input clock, a convergence correction data generator for receiving the reproduced synchronizing signal, and using the divided output of the 1/N frequency divider as input clock, a digital filter for receiving the output of the convergence correction data generator, and using the oscillation signal of the VCO as input clock, and a D/A converter for receiving the output of the digital filter.

20. A digital convergence apparatus comprising:

digital convergence correction data operating means for calculating the digital convergence correction data corresponding to an input signal entered from outside, memory means for storing the digital convergence correction data from the correction data operating means, D/A converting means for converting the digital convergence correction data stored in the memory means into analog quantity, an LPF for receiving the analog convergence correction data, A/D converting means for detecting direct-current drift component from the output of the LPF, correction operating means for calculating the correction value for canceling the direct-current drift component detected by the A/D converting means, and adding means for converting the correction value calculated by the correction operating means to an output of the LPF, wherein the direct-current drift component generated by the LPF is automatically canceled.

21. A digital convergence apparatus of claim 20, wherein the synchronizing signal synchronized with the deflection current period is put into the correction operating means as an interrupt signal, and the direct-current drift component generated by the LPF is automatically detected only in the input period of the interrupt signal, thereby canceling it.

22. A digital convergence apparatus of claim 20, wherein the correction operation result of the correction operating means is stored in the memory means, and only in the period when the synchronizing signal synchronized with the deflection current period is put into the correction operating means as an interrupt signal, the operating means reads the correction operation result stored in the memory means, and the correction operation result is added to the output of the LPF.

23. A digital convergence apparatus comprising:

a scanning line count detector for receiving a synchronizing signal synchronized with deflection current period, an address controller for receiving the synchronizing signal to be controlled by the scanning line count detector, a test pattern generating circuit being controlled by the address controller, a video circuit for receiving the output of the test pattern generating circuit, a memory element for storing the convergence correction data, a vertical interpolation operator for operating the vertical interpolation on the basis of the convergence correction data stored in the memory element, being controlled by the address controller, memory means for storing the data interpolated by the vertical interpolation operating, a D/A converter for converting the data of the memory means into an analog signal, an LPF for-receiving the output of the D/A converter, an adder for receiving one of the outputs of the LPF, an output amplifier for receiving the output of the adder, a convergence coil being driven by the output amplifier, an A/D converter for converting the output of the adder into a digital signal, a comparator for receiving the output of the A/D converter as one input and receiving the comparative voltage expressed in a digital value as other input, and comparing the two, an operating unit being controlled by the result of comparison by the comparator, and a D/A converter for converting the result of operation of the operating unit into an analog quantity, and receiving as the other input of the adder.

24. A digital convergence apparatus of claim 23, wherein the operating unit comprises means for calculating the correction only in the input period of the synchronizing signal synchronized with the deflection current period.

25. A digital convergence apparatus of claim 23, further comprising a memory element having means for storing the correction operation result of the operating unit, wherein the operating unit comprises means for reading in the correction operation result stored in the memory means only in the input period of the synchronizing signal synchronized with the deflection current period, and writing the operation result into the D/A converter.

26. A digital convergence method for use with a display for displaying a plurality of input signals, each input signal having a respective synchronizing signal formed of a horizontal synchronization signal and a vertical synchronization signal, comprising the steps of:

(a) detecting a frequency of a synchronization signal included in a respective one of the input signals, (b) generating digital convergence correction data for said display corresponding to the frequency detected in step (a), using one of said horizontal synchronization signal and said vertical synchronization signal of the respective synchronizing signal, (c) generating a convergence adjusting pattern based on the digital convergence correction data generated in step (b), and (d) correcting the digital convergence of the display by using the convergence adjusting pattern and the digital convergence correction data.

27. A digital convergence method of claim 26 in which step (d) includes converting the digital convergence correction data into an analog signal responsive to the frequency detected in step (a).

28. A digital convergence method for use with a plurality of input video signals each having a different number of scanning lines comprising the steps of:

(a) storing in a memory having a predetermined capacity, a plurality of first digital convergence correction data corresponding to a respective one of the plurality of video signals, (b) detecting said different numbers of scanning lines in the respective one of the plurality of video signals, (c) comparing the number of scanning lines detected in step (b) and the memory capacity of the memory of step (a), and (d) generating, when the comparison in step (c) of the number of scanning lines in the respective one of the plurality of video signals is greater than the memory capacity of the memory, a plurality of second digital convergence correction data at $2^n$ times the plurality of first digital convergence correction data where n is a positive integer.

29. A digital convergence method for use with a plurality of input signals, each input signal having a respective synchronizing signal, comprising the steps of:

(a) detecting a frequency of a synchronizing signal included in a respective one of the input signals;

(b) comparing the phase of the synchronizing signal of step (a) with a reproduced synchronization signal of step (f), (c) filtering the phase comparison of step (b) and producing a filtered output signal, (d) generating an oscillation signal based on the filtered output signal of step (c), (e) dividing the oscillation signal of step (d) by N, (f) generating a reproduced synchronization signal by dividing the output of step (e) by M, (g) generating a convergence adjusting pattern from the reproduced synchronization signal of step (f) based on the oscillation signal of step (d), and (h) generating conversion correction data based on the reproduced synchronization signal of step (f) and the oscillation signal of step (e).

* * * * *

UNITED STATES PATENT AND TRADE MARK OFFICE
CERTIFICATE OF CORRECTION

PATENT NO. : 5,734,233
DATED : March 31, 1998
INVENTOR(S) : Masumoto et al.

It is certified that error appears in the above-identified patent and that said Letters Patent is hereby corrected as shown below:

Column 42, line 10, first occurrence, delete " 1/N" and insert --1/M--.

Column 42, line 31, between "the" and "into" insert --VCO--.

Column 44, line 1, delete the hyphen "-" between the words "for" and "receiving".

Signed and Sealed this

Thirteenth Day of October 1998

*Attest:*

BRUCE LEHMAN

*Attesting Officer*    Commissioner of Patents and Trademarks